US008824550B2

(12) United States Patent
Kobayashi

(10) Patent No.: US 8,824,550 B2
(45) Date of Patent: Sep. 2, 2014

(54) IMAGE CAPTURE APPARATUS

(71) Applicant: Canon Kabushiki Kaisha, Tokyo (JP)

(72) Inventor: Satoru Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/772,485

(22) Filed: Feb. 21, 2013

(65) Prior Publication Data

US 2013/0163665 A1 Jun. 27, 2013

Related U.S. Application Data

(63) Continuation of application No. 12/810,347, filed as application No. PCT/JP2009/054002 on Feb. 25, 2009, now Pat. No. 8,437,395.

(30) Foreign Application Priority Data

Feb. 26, 2008 (JP) ................. 2008-044921
Jun. 30, 2008 (JP) ................. 2008-169788

(51) Int. Cl.
| | |
|---|---|
| *H04B 1/66* | (2006.01) |
| *H04N 7/36* | (2006.01) |
| *H04N 7/50* | (2006.01) |
| *H04N 7/12* | (2006.01) |
| *H04N 7/26* | (2006.01) |

(52) U.S. Cl.
CPC .... *H04N 19/00733* (2013.01); *H04N 19/00187* (2013.01); *H04N 19/00781* (2013.01); *H04N 19/00545* (2013.01); *H04N 19/0006* (2013.01)
USPC .................. 375/240.12; 348/416.1

(58) Field of Classification Search
USPC .......... 348/402.12, 400, 416, 416.1; 382/232, 382/233, 236, 239, 250; 375/240.01–240.28
See application file for complete search history.

(56) References Cited

U.S. PATENT DOCUMENTS

| | | | | |
|---|---|---|---|---|
| 5,164,827 | A * | 11/1992 | Paff ............................. | 348/143 |
| 7,990,422 | B2 * | 8/2011 | Ahiska et al. ................ | 348/218.1 |
| 8,437,395 | B2 * | 5/2013 | Kobayashi .................. | 375/240.12 |
| 2011/0249747 | A1 * | 10/2011 | Endo ........................ | 375/240.16 |

FOREIGN PATENT DOCUMENTS

JP    2007-329787    * 12/2007 ............... H04N 7/26

* cited by examiner

*Primary Examiner* — Behrooz Senfi
(74) *Attorney, Agent, or Firm* — Cowan, Liebowitz & Latman, P.C.

(57) ABSTRACT

There is provided a moving image encoding apparatus comprising: an encoding unit which encodes moving image data using inter-frame prediction, the moving image data being input by an image pickup unit which captures an object image, and generates an encoded bitstream; a setting unit which performs settings for an encoding process performed by the encoding unit; a transmitting unit which transmits setting information created by the setting unit to an external moving image encoding apparatus; a receiving unit which receives setting information for an encoding process transmitted by the external moving image encoding apparatus; and an encoding control unit which controls the encoding process performed by the encoding unit in accordance with a first setting made by the setting unit and a second setting based on the setting information received by the receiving unit.

38 Claims, 40 Drawing Sheets

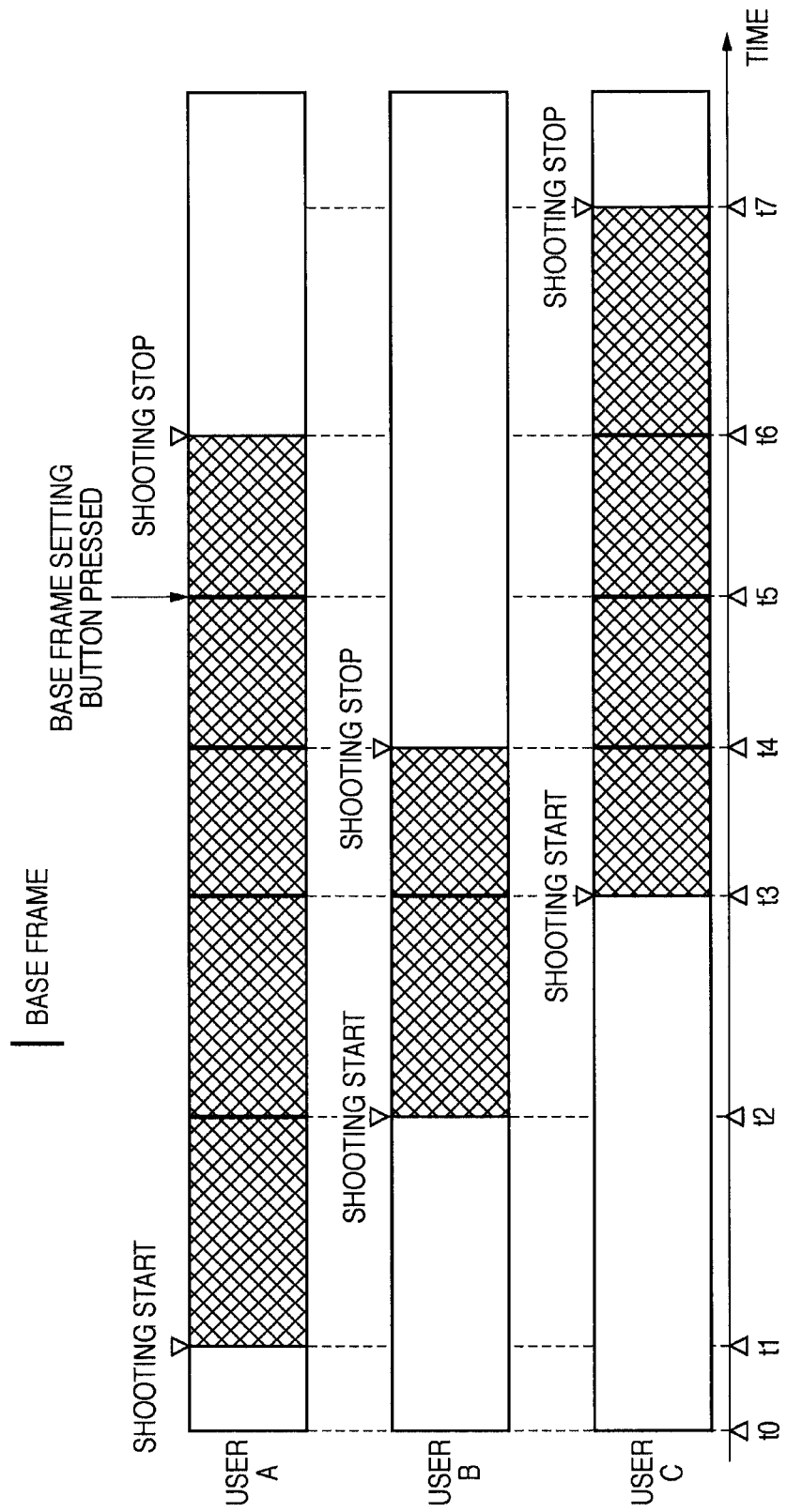

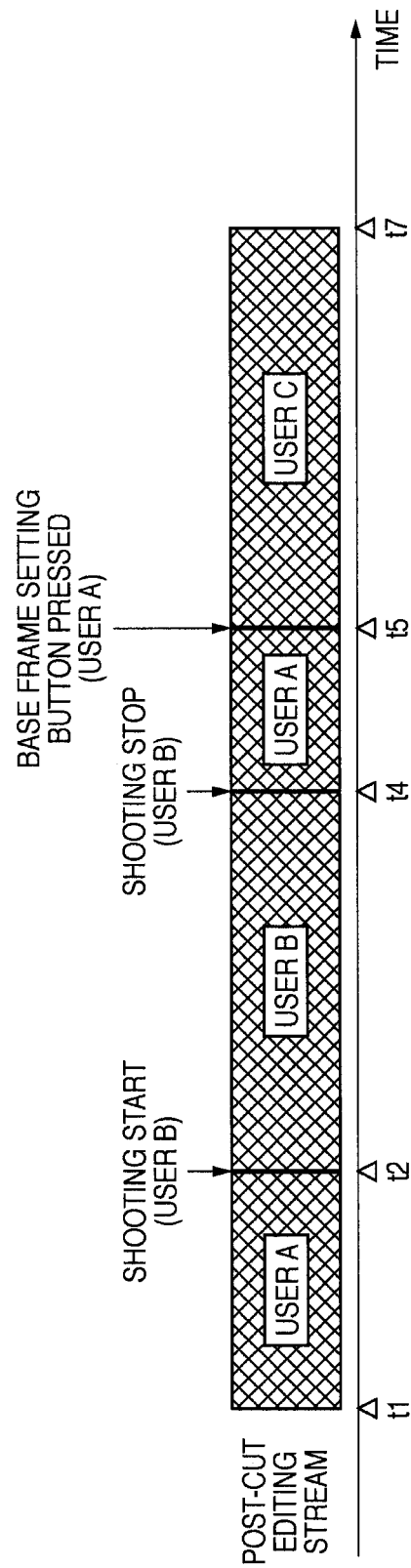

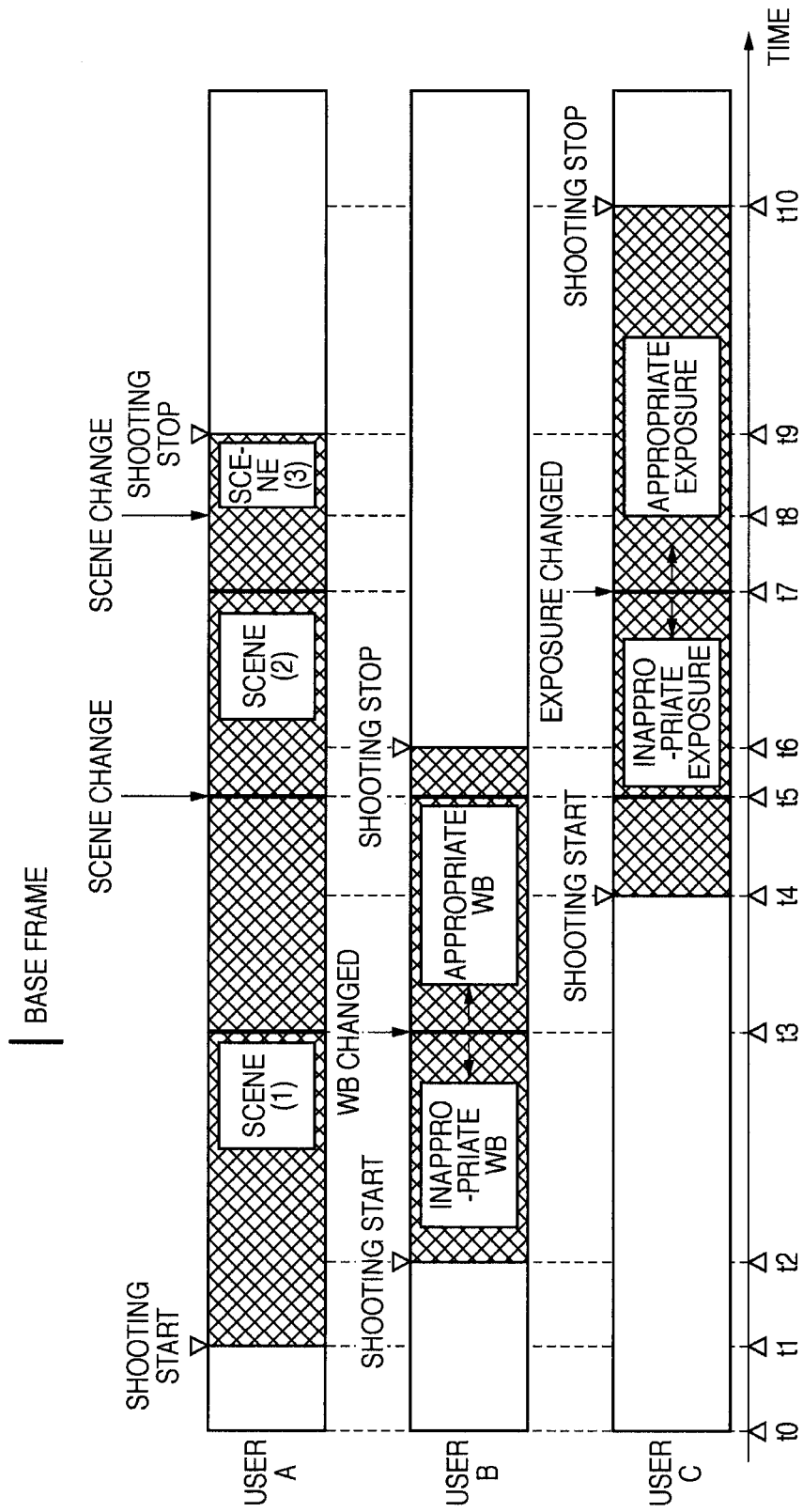

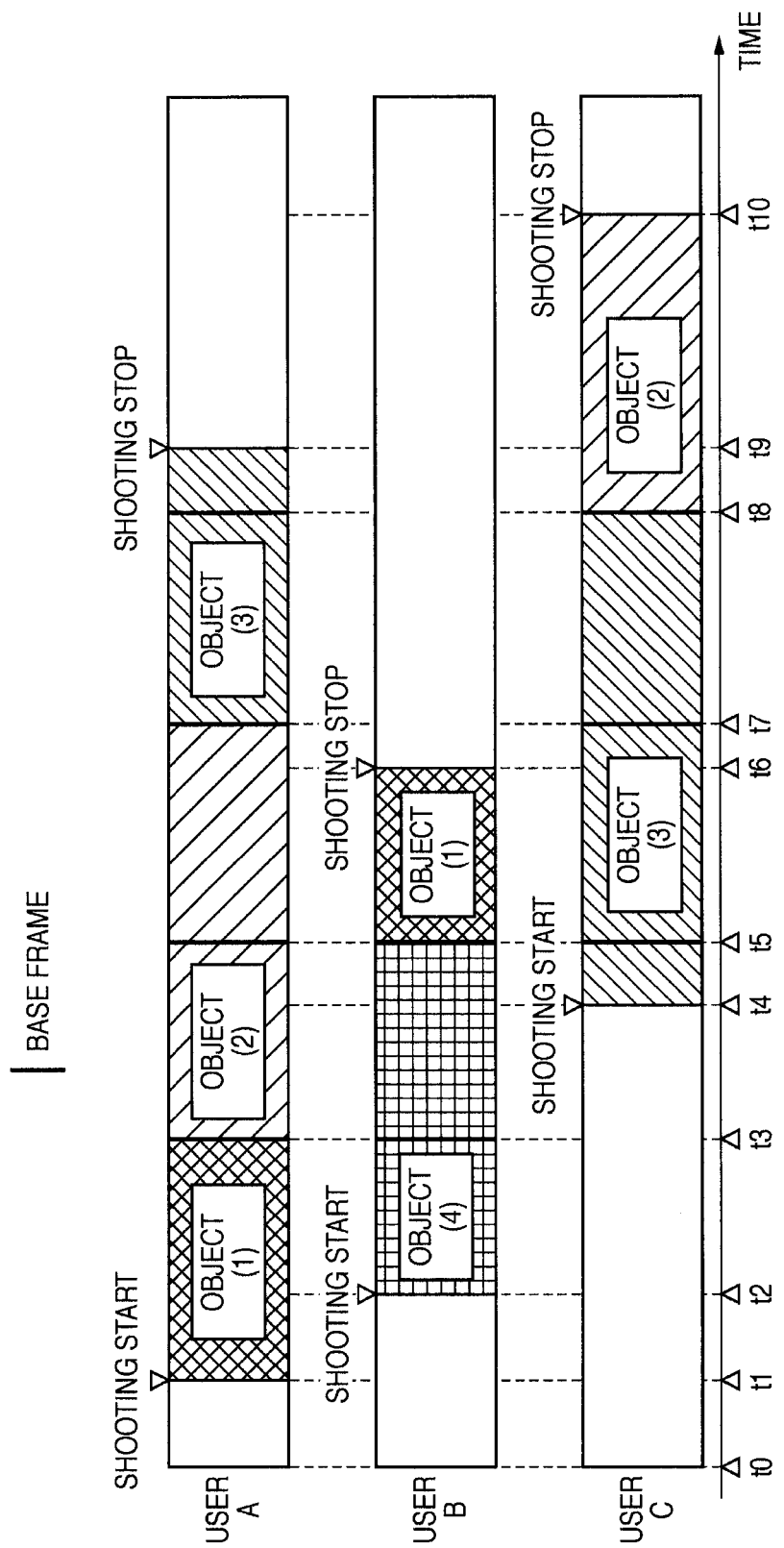

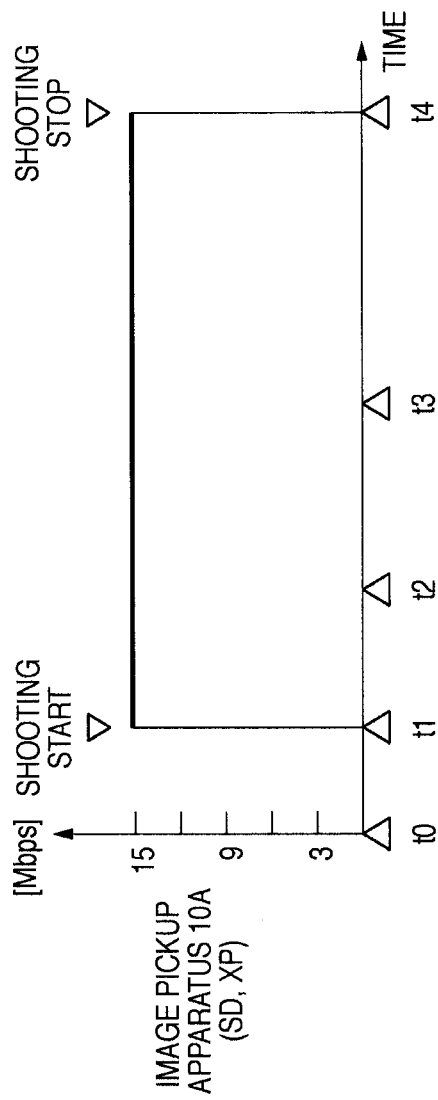

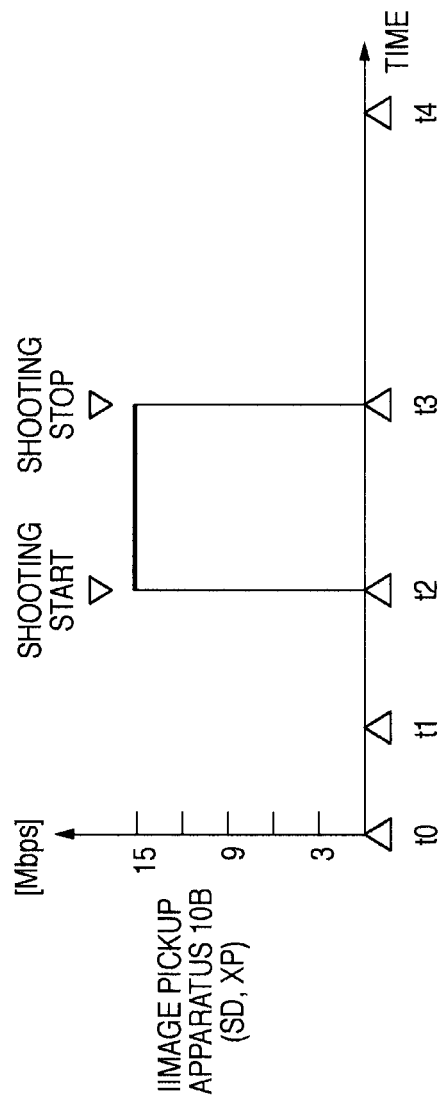

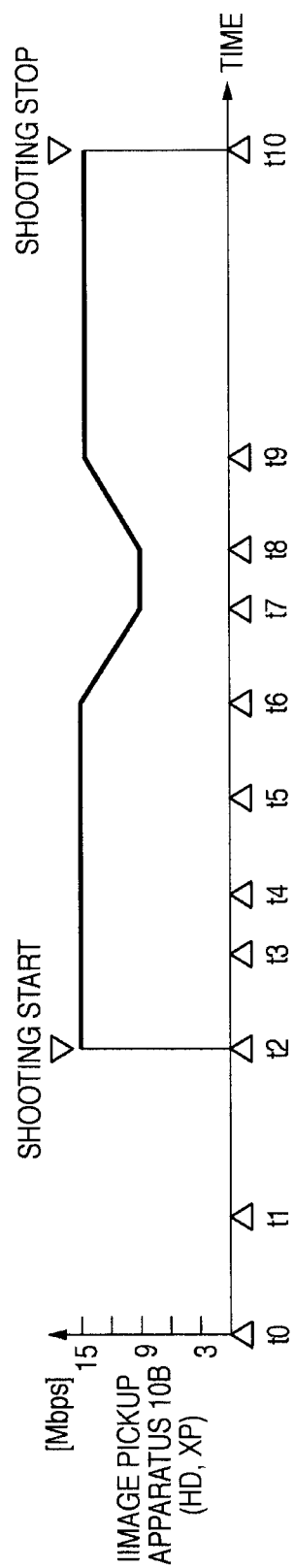

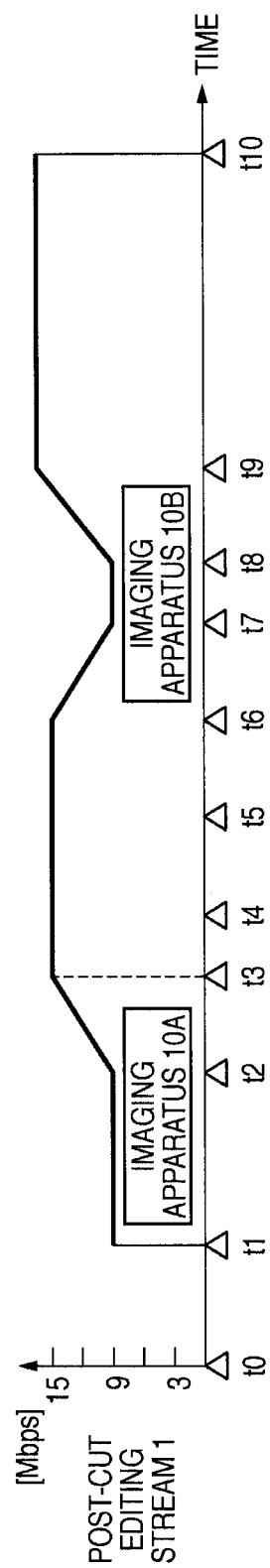

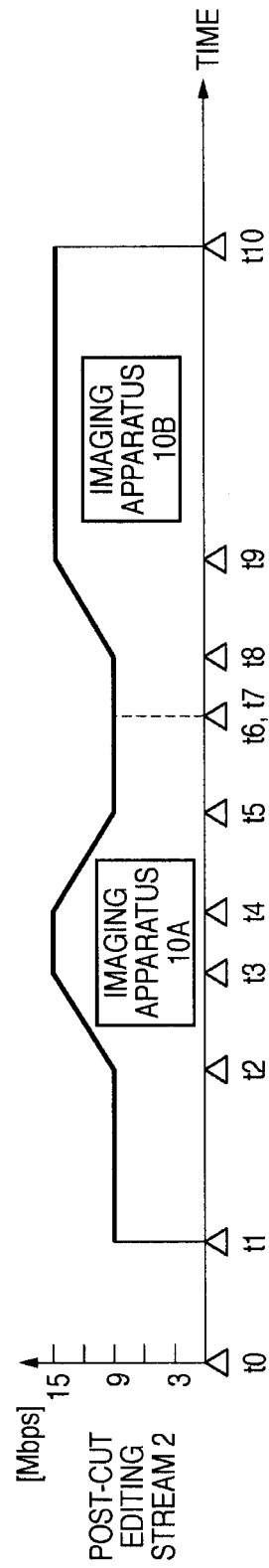

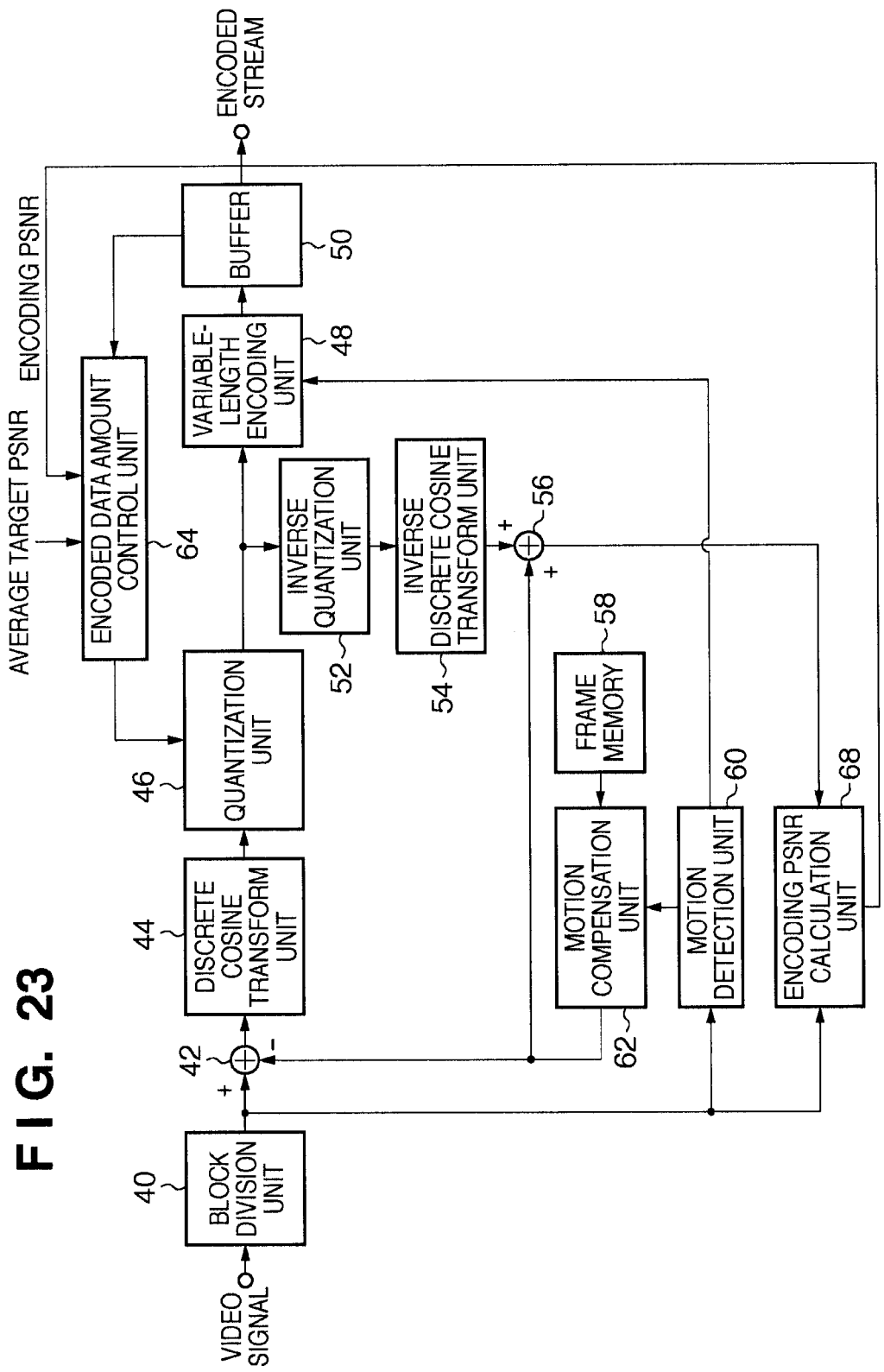

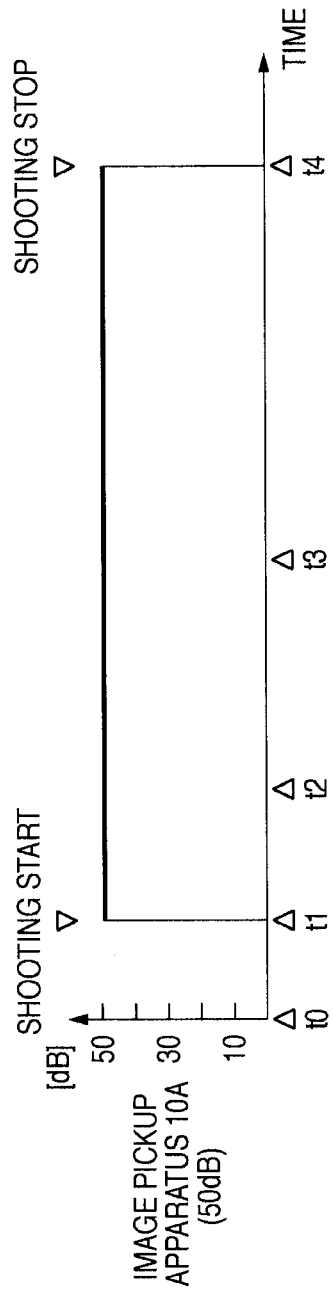

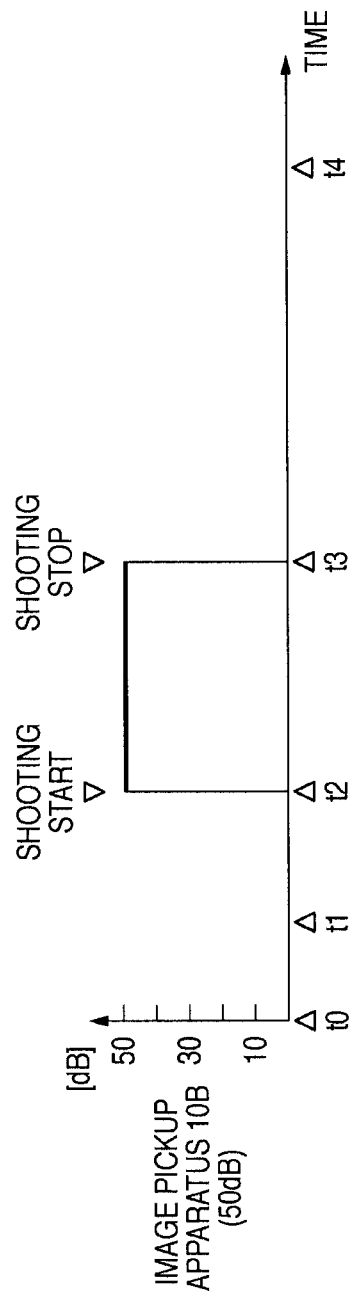

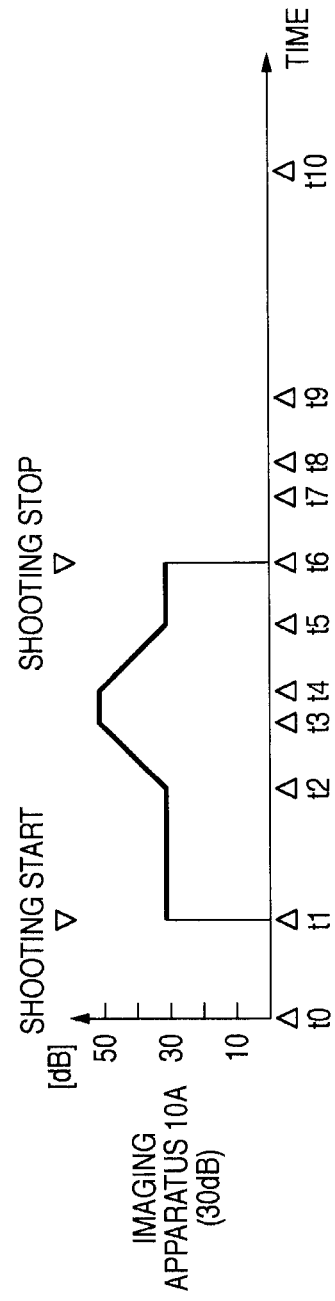

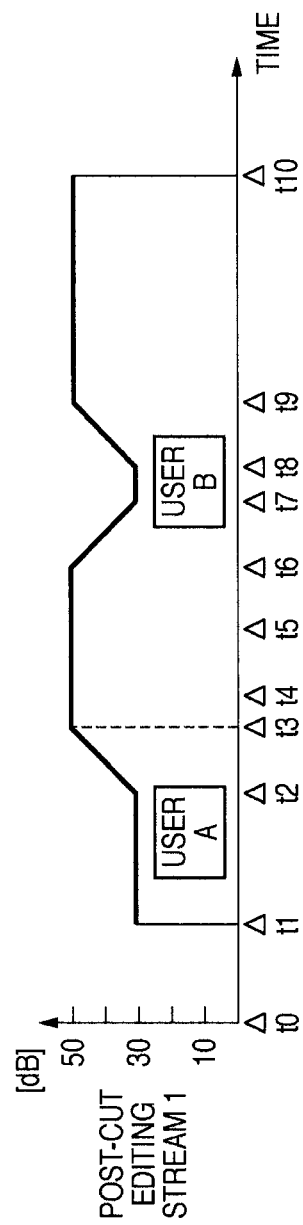

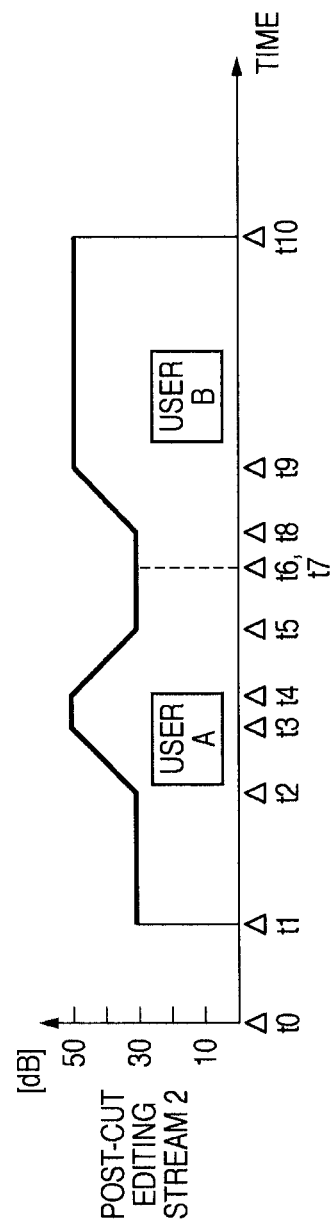

IMAGE CAPTURE APPARATUS

CROSS-REFERENCE TO RELATED APPLICATION

This application is a continuation of application Ser. No. 12/810,347, filed Jun. 24, 2010, which is a national stage entry under 37 CFR 371 of International Application No. PCT/JP2009/054002, filed Feb. 25, 2009, the entire disclosures of which are hereby incorporated by reference.

TECHNICAL FIELD

The present invention relates to a moving image encoding apparatus and method, and particularly relates to a favorable technique used for recording, playing back, and editing an encoded bitstream.

BACKGROUND ART

The JPEG standard, which compresses and encodes still images, and the MPEG1 and MPEG2 standards, which compress and encode moving images using inter-image motion prediction/motion compensation techniques, have been established as highly-efficient techniques for encoding image data. Various makers have developed and put into production image pickup apparatuses such as digital cameras and digital video cameras, DVD recorders, and the like that are capable of recording image data to a storage medium using such encoding techniques.

Among such products, there are some in which still image data that has been shot can be shared among multiple image pickup apparatuses in real time, by transmitting/receiving that image data between the apparatuses using a system such as wireless communication. A user can use such an apparatus to shoot and record an object of his/her preference.

Meanwhile, among such products, there are also apparatuses provided with functions for editing moving images captured by the image pickup apparatus, such as cutting out a desired section of the moving image, combining a moving image with another moving image, and so on. For example, by using moving images captured by multiple image pickup apparatuses as material to be edited, the moving images recorded by different image pickup apparatuses can be combined and a new moving image created.

By the way, digitized moving image data is very large in size. Accordingly, moving image data encoding standards designed to achieve an even higher rate of compression that the previously mentioned MPEG1, MPEG2, and the like continue to be researched. Recently, an encoding scheme called H.264/MPEG-4 Part 10 (called simply "H.264" hereinafter) has been standardized by the ITU-T (International Telecommunication Union-Telecommunication Standardization Sector) and the ISO (International Organization for Standardization).

The structure of data encoded using the H.264 standard shall be described hereinafter with reference to FIGS. 11A to 11C and 12A to 12B.

Note that FIGS. 11A to 11C and 12A to 12B illustrate picture groups indicating encoded moving image data (an image sequence) and picture types for each picture. In these diagrams, the upper level indicates the display order (displayed in order from the left), whereas the lower level indicates the encoding order (encoded in order from the left).

The picture types in image frames according to the H.264 standard include I pictures, which are encoded from only data within the same frame, and P pictures, which are encoded using the difference between that frame and the frame temporally previous. Furthermore, there are also B pictures, which can use the difference between that frame and the frame temporally following, in addition to the difference between that frame and the frame temporally previous.

For example, FIG. 11A illustrates that a picture P8 is a P picture frame that is displayed ninth. The arrow in FIG. 11A indicates a reference relationship, showing, in the example shown in FIG. 11A, that the picture P8 refers to a picture B0. Meanwhile, in the example shown in FIG. 11B, the picture B0 refers to pictures P2 and B7.

In the H.264 standard, it is possible, when performing inter-frame prediction, to use arbitrary frames and picture types within an image sequence as reference images. For example, as shown in FIG. 11A, the picture P8, which is a P picture, can refer not only to I pictures but can also skip I pictures and refer to other frames. Similarly, as shown in FIG. 11B, the picture B0, which is a B picture, can also refer not only to I pictures but can also skip I pictures and refer to other frames.

In this manner, the H.264 standard permits such flexible reference images. Therefore, the H.264 standard can improve the accuracy of inter-frame prediction and the encoding efficiency beyond that of standards such as MPEG2, in which a P picture can refer only to the I picture immediately previous thereto or to another P picture.

However, because the H.264 standard permits such flexible reference images as mentioned earlier, there are cases where random access cannot be performed quickly in the H.264 standard. As an example, FIG. 11C illustrates a case in which an image sequence is played back from a frame partway through, or a picture I5, using random access.

When starting playback from the picture I5 in the image sequence, the picture P8 is decoded thereafter, and because the picture P8 refers to the picture B0, it is necessary to decode the picture B0 in advance. Furthermore, because the picture B0 refers to the pictures P2 and B7, it is also necessary to decode the pictures P2 and B7 in advance in order to decode the picture B0. Similarly, although not shown in FIG. 11C, the pictures P2 and B7 each refer to other pictures, and thus it is also necessary to decode those other pictures in advance in order to decode the pictures P2 and B7.

Thus, even if playback is started from the picture I5, references that skip the picture I5 are allowed, and therefore it is necessary to go back and start the decoding process from data prior to the picture I5, making it difficult to quickly start playback from the picture I5. Furthermore, even if a user wishes to cut edit the encoded bitstream using the picture I5 as the cut frame, references that skip the picture I5 are permitted, and thus it is necessary to go back and start the decoding process from data prior to the picture I5. It is therefore difficult to perform cut edits where the bitstream is cut using the picture I5 as the cut frame.

Accordingly, Japanese Patent Laid-Open No. 2003-199112, for example, proposes a method that provides a periodical limitation on I pictures in order to eliminate this problem and enable quick random access. This limited I picture is called an "IDR picture" in the H.264 standard. The IDR picture shall now be described with reference to FIGS. 12A and 12B. Note that the image sequences illustrated in FIGS. 12A and 12B indicate the same image sequences as those shown in FIGS. 11A and 11B, but in which an IDR picture has been set for the picture I5.

When an IDR picture has been set for the picture I5, the frame memory into which the reference images of the moving image are being recorded is cleared of those reference images when the IDR picture is encoded. Therefore, pictures encoded after the IDR picture cannot refer to pictures encoded before that IDR picture. Likewise, pictures encoded before the IDR picture cannot refer to pictures encoded after that IDR picture.

In the example shown in FIG. 12A, the P pictures and B pictures encoded after the IDR picture, or the picture IDR5, cannot refer to the P pictures and B pictures encoded before that IDR picture. To be more specific, pictures such as the pictures P8 and B7, which are encoded after the picture IDR5, cannot refer to pictures such as the pictures P2 and B0, which are encoded before the picture IDR5.

Conversely, in the example shown in FIG. 12B, the P pictures and B pictures encoded before the IDR picture, or the picture IDR5, cannot refer to the P pictures and B pictures encoded after that IDR picture. To be more specific, pictures such as the pictures P2 and B0, which are encoded before the picture IDR5, cannot refer to pictures such as the pictures P8 and B7, which are encoded after the picture IDR5.

Accordingly, with the H.264 standard, when starting playback of encoded data from an IDR picture, it is not necessary to go back and decode image data from before the IDR picture, making it possible to implement playback with quick random access. Furthermore, because skipping the IDR picture and referring to other pictures is prohibited, editing that uses the IDR picture as the cut frame is also possible.

Next, control of the encoded data amount in the H.264 standard shall be described. The variable bitrate (VBR) scheme is one technique for controlling the encoded data amount. Hereinafter, encoded data amount control according to the VBR scheme shall be briefly described.

The VBR scheme is a scheme for controlling the encoded data amount that varies the target encoding bitrate based on the local properties of the video, while attempting to bring the encoding bitrate as close as possible to an average target encoding bitrate. Because this scheme encodes the video signal using a target encoding bitrate based on the properties of the video, it has a characteristic that there is little fluctuation in the image quality. In other words, frames that are difficult to encode and will thus suffer from low image quality are encoded at a higher target encoding bitrate, whereas frames that are easy to encode and will thus have sufficiently high image quality are encoded at a lower target encoding bitrate.

Recent digital video cameras are provided with multiple recording modes (encoding modes) that use encoded data amount control techniques to enable high image quality recording or extended time recording. For example, there are video cameras that have three recording modes, which encode data in accordance with an average target encoding bitrate: an LP (Long Play) mode, an SP (Standard Play) mode, and an XP (Excellent Play) mode. The VBR scheme is typically used in all recording modes. The average target encoding bitrate is lowest in the LP mode, whereas the average target encoding bitrate is highest in the XP mode. The average target encoding bitrate in the SP mode is between that of the LP mode and the XP mode.

In LP mode, the encoding bitrate is low, leading to a drop in image quality; however, the resulting file is small, and thus a larger amount of video can be recorded. On the other hand, in XP mode, the encoding bitrate is high, leading to an increase in image quality; however, the resulting file is large, and thus only a small amount of video can be recorded. A user can shoot video using the recording mode s/he prefers in light of the image quality of the recorded video, the space remaining in the storage medium, and so on.

Japanese Patent Laid-Open No. 2001-346201 describes an image encoding apparatus that uses the VBR scheme. This document describes a case where an input image is divided into low-resolution images and encoded using multiple image encoding apparatuses; in such a case, encoded data amounts are then allocated to each of the encoding apparatuses so that the image quality of the low-resolution images is the same for each of the image encoding apparatuses.

With the aforementioned H.264 standard, using the IDR picture, which limits the reference relationships in interframe prediction, enables quick random access, easy editing, and so on. For this reason, it is necessary to set an IDR picture at an appropriate location in order to enable quick playback from an arbitrary location in the encoded bitstream, easy editing using the encoded bitstream as materials, and so on.

However, because the reference relationships are limited in the described manner by setting an IDR picture, setting many IDR pictures has the potential to reduce the encoding efficiency. In other words, if priority is to be placed on encoding efficiency, it is desirable to set as few IDR pictures as possible. A method that sets IDR pictures periodically, such as the background art, has a problem that IDR pictures are also set for frames that are not necessary for random access, editing, and so on, which leads to a drop in the encoding efficiency.

In addition, in the case where multiple users are to edit multiple moving images (encoded bitstreams) shot using their respective image pickup apparatuses, there are many cases where the intervals and times at which the IDR pictures are set in the respective encoded bitstreams differ from one another. For this reason, reducing the number of set IDR pictures in order to prevent a drop in the encoding efficiency makes it difficult to splice together desired sections of video when editing multiple encoded bitstreams from different users.

Furthermore, maintaining uniform image quality among the videos is an important issue in the above-mentioned situation where multiple moving images (encoded bitstreams) recorded using different apparatuses are to be edited. If the individual encoded bitstreams are of differing image qualities, editing the video will result in a difference in image quality that is visibly apparent in the areas at which streams have been spliced together.

FIGS. 21A to 21C illustrate examples in which a user A has recorded a scene A at a target encoding bitrate based on the SP mode, whereas a user B has recorded a scene B at a target encoding bitrate based on the XP mode. FIG. 21A indicates the change in the average target encoding bitrate in the recording of the scene A by the user A, and shows that the user A starts shooting the scene A at time t2 and stops shooting the scene A at time t3. FIG. 21B, meanwhile, indicates the change in the average target encoding bitrate in the recording of the scene B by the user B, and shows that the user B starts shooting the scene B at time t1 and stops shooting the scene B at time t2. FIG. 21C then shows the change in the average target encoding bitrate of the encoded bitstream in the case where the scenes A and B have been spliced together through a cut edit.

In FIG. 21C, the encoding bitrate drops suddenly at the splice between the scenes B and A at time t2, due to the difference in the average target encoding bitrates between the SP and XP modes. In other words, in FIG. 21C, the image quality appears to be suddenly dropping in the section after time t2, as compared to the section before time t2. For this reason, a viewer who plays back the video of such an encoded bitstream will feel a sense of unnaturalness immediately following time t2.

DISCLOSURE OF INVENTION

Aspects of the present invention relate to generating encoded image data appropriate for editing when encoding moving image data using multiple apparatuses.

According to the first aspect of the present invention, there is provided a moving image encoding apparatus comprising: an encoding unit which encodes moving image data using inter-frame prediction, the moving image data being input by an image pickup unit which captures an object image, and generates an encoded bitstream; a setting unit which performs settings for an encoding process performed by the encoding unit; a transmitting unit which transmits setting information created by the setting unit to an external moving image encoding apparatus; a receiving unit which receives setting information for an encoding process transmitted by the external moving image encoding apparatus; and an encoding control unit which controls the encoding process performed by the encoding unit in accordance with a first setting made by the setting unit and a second setting based on the setting information received by the receiving unit.

According to the second aspect of the present invention, there is provided a moving image encoding apparatus comprising: an encoding unit which encodes moving image data using inter-frame prediction, the moving image data being input by an image pickup unit which captures an object image, and generates an encoded bitstream; a transmitting/receiving unit which transmits/receives encoding setting information to/from an external moving image encoding apparatus with which the moving image encoding apparatus has been grouped via a network; and an encoding control unit which performs control so that a base frame is set in the encoded bitstream generated by the encoding unit in accordance with a setting of a base frame performed by the external moving image encoding apparatus, based on the encoding setting information transmitted/received by the transmitting/receiving unit.

According to the third aspect of the present invention, there is provided a moving image encoding apparatus comprising: an encoding unit which encodes moving image data using inter-frame prediction, the moving image data being input by an image pickup unit which captures an object image, and generates an encoded bitstream; a transmitting/receiving unit which transmits/receives encoding setting information to/from an external moving image encoding apparatus with which the moving image encoding apparatus has been grouped via a network; and an encoding control unit which adjusts image quality of the encoded bitstream generated by the encoding unit in accordance with image quality set in the external moving image encoding apparatus, based on the encoding setting information transmitted/received by the transmitting/receiving unit.

According to the fourth aspect of the present invention, there is provided a moving image encoding method for a moving image encoding apparatus, the method comprises the steps of: encoding moving image data using inter-frame prediction, the moving image data being input by an image pickup unit which captures an object image, and generating an encoded bitstream; performing settings for an encoding process performed in the encoding; transmitting setting information created in the performing settings to an external moving image encoding apparatus; receiving setting information for an encoding process transmitted by the external moving image encoding apparatus; and controlling the encoding process performed in the encoding in accordance with a first setting made in the performing settings and a second setting based on the setting information received in the receiving.

According to the fifth aspect of the present invention, there is provided a moving image encoding method for a moving image encoding apparatus, the method comprises the steps of: encoding moving image data using inter-frame prediction, the moving image data being input by an image pickup unit which captures an object image, and generating an encoded bitstream; transmitting/receiving encoding setting information to/from an external moving image encoding apparatus with which the moving image encoding apparatus has been grouped via a network; and performing control so that a base frame is set in the encoded bitstream generated in the encoding in accordance with a setting of a base frame performed by the external moving image encoding apparatus, based on the encoding setting information transmitted/received, in the transmitting/receiving.

According to the sixth aspect of the present invention, there is provided a moving image encoding method for a moving image encoding apparatus, the method comprises the steps of: encoding moving image data using inter-frame prediction, the moving image data being input by an image pickup unit which captures an object image, and generating an encoded bitstream; transmitting/receiving encoding setting information to/from an external moving image encoding apparatus with which the moving image encoding apparatus has been grouped via a network; and adjusting image quality of the encoded bitstream generated in the encoding in accordance with image quality set in the external moving image encoding apparatus, based on the encoding setting information transmitted/received in the transmitting/receiving.

According to the seventh aspect of the present invention, there is provided a computer-readable storage medium containing computer-executable instructions for causing a computer of a moving image encoding apparatus to function as: an encoding unit which encodes moving image data using inter-frame prediction, the moving image data being input by an image pickup unit which captures an object image, and generates an encoded bitstream; a setting unit which performs settings for an encoding process performed by the encoding unit; a transmitting unit which transmits setting information created by the setting unit to an external moving image encoding apparatus; a receiving unit which receives setting information for an encoding process transmitted by the external moving image encoding apparatus; and an encoding control unit which controls the encoding process performed by the encoding unit in accordance with a first setting made by the setting unit and a second setting based on the setting information received by the receiving unit.

According to the eighth aspect of the present invention, there is provided a computer-readable storage medium containing computer-executable instructions for causing a computer of a moving image encoding apparatus to function as: an encoding unit which encodes moving image data using inter-frame prediction, the moving image data being input by an image pickup unit which captures an object image, and generates an encoded bitstream; a transmitting/receiving unit which transmits/receives encoding setting information to/from an external moving image encoding apparatus with which the moving image encoding apparatus has been grouped via a network; and an encoding control unit which performs control so that a base frame is set in the encoded bitstream generated by the encoding unit in accordance with a setting of a base frame performed by the external moving image encoding apparatus, based on the encoding setting information transmitted/received by the transmitting/receiving unit.

According to the ninth aspect of the present invention, there is provided a computer-readable storage medium containing computer-executable instructions for causing a computer of a moving image encoding apparatus to function as: an encoding unit which encodes moving image data using interframe prediction, the moving image data being input by an image pickup unit which captures an object image, and generates an encoded bitstream; a transmitting/receiving unit which transmits/receives encoding setting information to/from an external moving image encoding apparatus with which the moving image encoding apparatus has been grouped via a network; and an encoding control unit which adjusts image quality of the encoded bitstream generated by the encoding unit in accordance with image quality set in the external moving image encoding apparatus, based on the encoding setting information transmitted/received by the transmitting/receiving unit.

Further features of the present invention will become apparent from the following description of exemplary embodiments (with reference to the attached drawings).

BRIEF DESCRIPTION OF DRAWINGS

FIGS. 6A and 6B are diagrams illustrating an example of the start and end of shooting and the setting of a base frame by pressing a base frame setting button.

FIGS. 7A and 7B are diagrams illustrating an example of setting a base frame in accordance with camera control information and scene changes.

FIGS. 9A and 9B are diagrams illustrating an example of the setting of a base frame in accordance with object information.

FIGS. 18A to 18C are diagrams illustrating an example of the change in average target encoding bitrate with shot scenes and cut edits in a preset mode.

FIGS. 19A to 19D are diagrams illustrating an example of the change in average target encoding bitrate with shot scenes and cut edits in a dynamic setting mode.

FIG. 23 is a block diagram illustrating an exemplary configuration of an encoding unit in an image pickup apparatus according to the third embodiment of the present invention.

FIGS. 25A to 25C are diagrams illustrating an example of the change in the average target PSNR with shot scenes and cut edits in a preset mode.

FIGS. 26A to 26D are diagrams illustrating an example of the change in the average target PSNR with shot scenes and cut edits in a dynamic setting mode.

BEST MODE FOR CARRYING OUT THE INVENTION

First Embodiment

Hereinafter, preferred embodiments of the present invention shall be described with reference to the diagrams.

Figure 1:
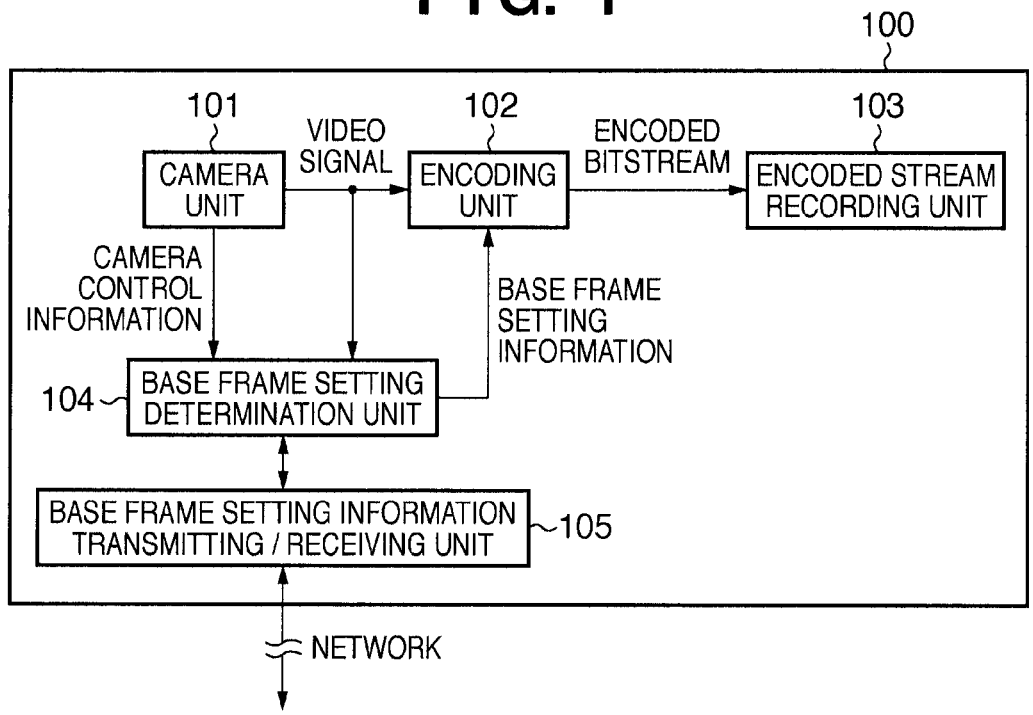
FIG. 1 is a block diagram illustrating an exemplary configuration of an image pickup apparatus according to a first embodiment of the present invention.

FIG. 1 is a block diagram illustrating, as a first embodiment, an exemplary functional configuration of an image pickup apparatus to which a moving image encoding apparatus embodying the present invention has been applied. The image pickup apparatus according to the present embodiment is an apparatus that encodes using a picture type to serve as a base frame, in accordance with camera control information, scene changes, object information, the pressing of a base frame setting button, and so on. This exemplary configuration of the image pickup apparatus according to the present embodiment shall be described hereinafter with reference to FIG. 1.

An image pickup apparatus 100 according to the present embodiment includes a camera unit 101, an encoding unit 102, an encoded stream recording unit 103, a base frame setting determination unit 104, and a base frame setting information transmitting/receiving unit 105.

The camera unit 101 captures the light from an object and outputs a video signal and camera control information. The encoding unit 102 compresses and encodes the video signal output by the camera unit 101, and outputs an encoded bitstream to the encoded stream recording unit 103. The encoded stream recording unit 103 records the encoded bitstream output by the encoding unit 102 into a storage medium (not shown).

Note that the encoding standard used here is an encoding standard that employs an inter-frame prediction scheme, such as the H.264 standard; thus, the following descriptions shall use the H.264 standard as an example. Although more detailed descriptions shall be provided later, in the case where it has been determined that a frame encoded by the encoding unit 102 is to be encoded as a base frame, the base frame setting determination unit 104 outputs base frame setting information to the encoding unit 102 and the base frame setting information transmitting/receiving unit 105. Here, "base frame" refers to a frame that is set to a picture type that enables quick random access by prohibiting references that skip that base frame. In the H.264 encoding standard, "base frame" refers to an IDR picture frame.

The base frame setting information transmitting/receiving unit 105 transmits and receives the aforementioned base frame setting information to and from other image pickup apparatuses (external apparatuses) provided with the same functionality as the image pickup apparatus 100 of the present embodiment. To be more specific, the base frame setting information transmitting/receiving unit 105 functions as a transmitting unit, transmitting the base frame setting information output by the base frame setting determination unit 104 to the other image pickup apparatuses. The base frame setting information transmitting/receiving unit 105 also functions as a receiving unit, receiving the base frame setting information transmitted by another external image pickup apparatus and outputting that information to the base frame setting determination unit 104.

Note that the image pickup apparatus 100 is provided with a shooting start/stop button (not shown), and a user can instruct the start and stop of image pickup by pressing this image pickup start/stop button. Furthermore, the shooting start/stop information is assumed to be included in the aforementioned camera control information.

Next, the configurations of the camera unit 101, the encoding unit 102, and the base frame setting determination unit 104 shall be described in detail.

[Camera Unit 101]

Figure 2:
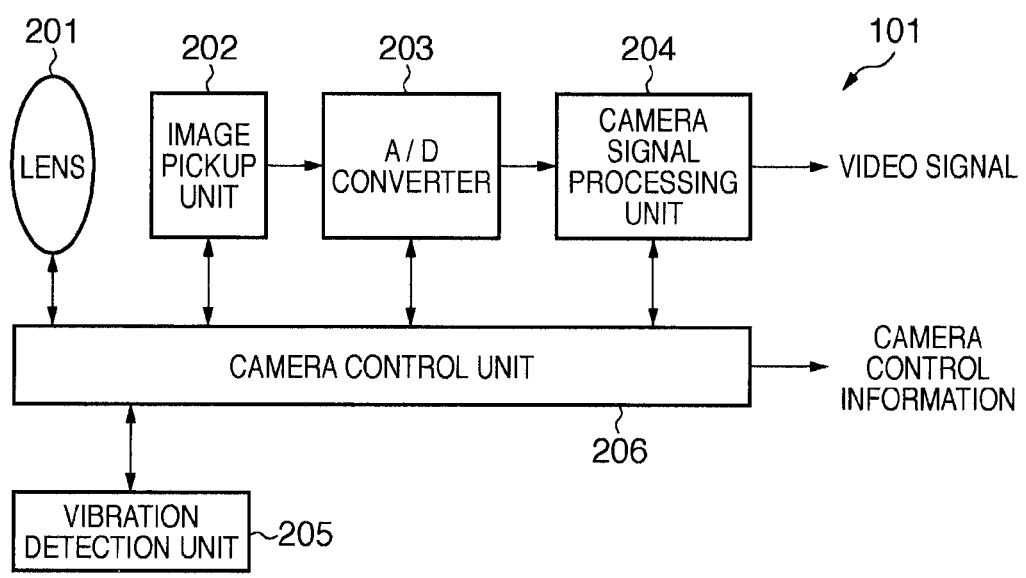
FIG. 2 is a block diagram illustrating an exemplary configuration of a camera unit in an image pickup apparatus according to the first embodiment of the present invention.

First, an exemplary configuration of the camera unit 101 shall be described in detail with reference to FIG. 2. FIG. 2 is a block diagram illustrating an exemplary configuration of the camera unit 101.

As shown in FIG. 2, the camera unit 101 includes a lens 201, an image pickup unit 202, an A/D (analog-to-digital) converter 203, a camera signal processing unit 204, a vibration detector 205, and a camera control unit 206. As described earlier, the camera unit 101 captures the light from an object and outputs a video signal and camera control information.

Next, operations performed by the camera unit 101 shall be described.

In FIG. 2, the lens 201 conducts the light from an object into the image pickup unit 202. The lens 201 also performs zooming operations, focusing operations, and so on in accordance with control signals output by the camera control unit 206, described later. The image pickup unit 202 captures an object using a CCD, CMOS, or the like, converts the obtained object image into an electrical signal, and outputs the signal to the A/D converter 203. The A/D converter 203 converts the analog signal into a digital signal.

The camera signal processing unit 204 performs processing such as γ correction, white balance correction, and the like on the digital signal output by the A/D converter 203, and outputs the resulting video signal to the encoding unit 102. The vibration detector 205 detects vibrations in the image pickup apparatus 100 by employing a known system that uses gyro sensors or the like, thereby detecting motion blur as well as the pan/tilt of the image pickup apparatus 100 as a whole. The camera control unit 206 controls the overall camera unit 101, and outputs camera control information to the base frame setting determination unit 104. This camera control information includes control data for the modules of which the aforementioned camera unit 101 is configured. Note that the motion blur and pan/tilt of the image pickup apparatus 100 as a whole may be detected by the camera signal processing unit 204 evaluating a pixel difference value between a specific frame and the frame immediately previous thereto.

[Encoding Unit 102]

Figure 3:
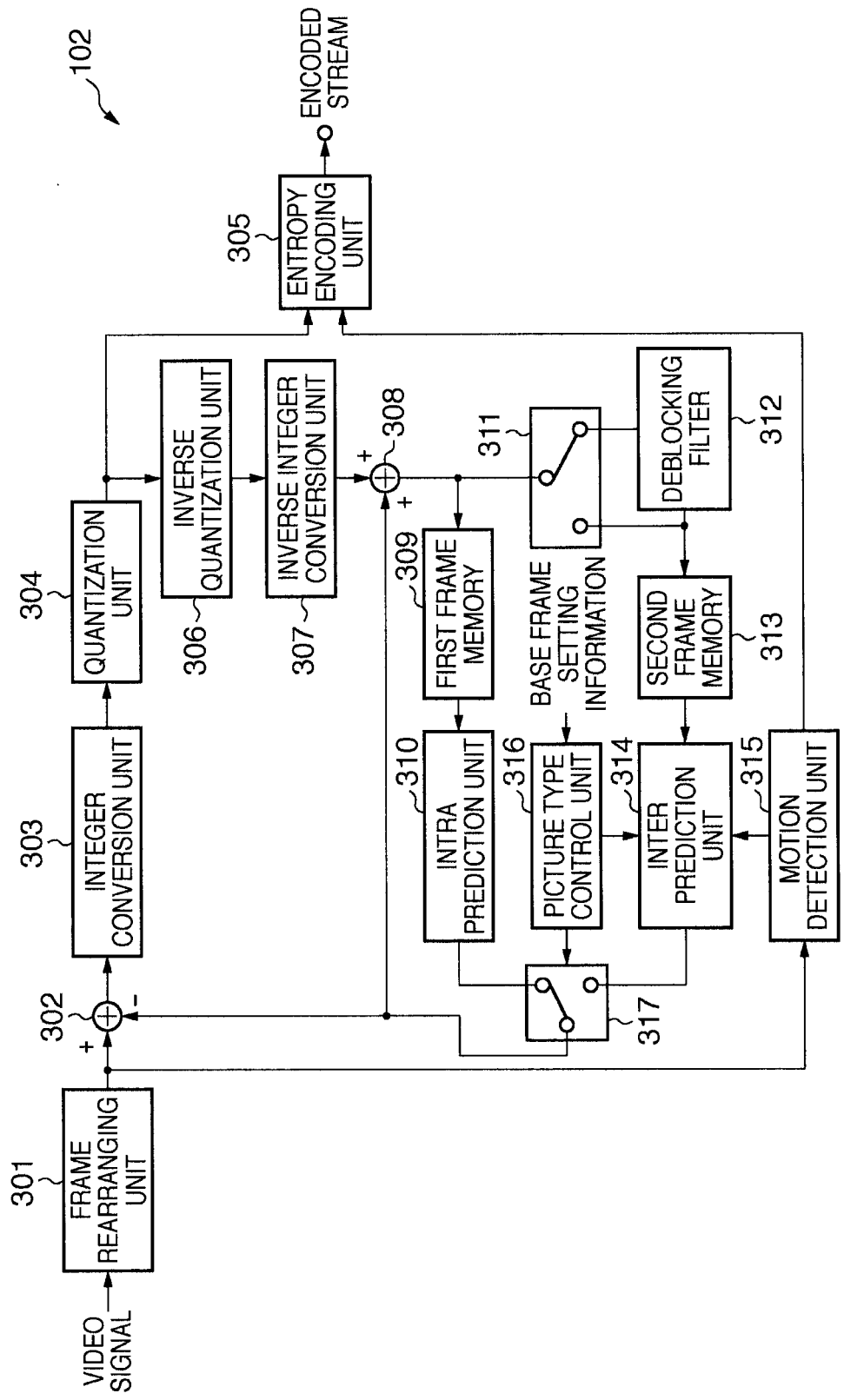
FIG. 3 is a block diagram illustrating an exemplary configuration of an encoding unit in an image pickup apparatus according to the first embodiment of the present invention.

Next, an exemplary configuration of the encoding unit 102 shall be described in detail with reference to FIG. 3. FIG. 3 is a block diagram illustrating an exemplary configuration of the encoding unit 102.

As shown in FIG. 3, the encoding unit 102 includes a frame rearranging unit 301, a subtractor 302, an integer conversion unit 303, a quantization unit 304, an entropy encoding unit 305, an inverse quantization unit 306, an inverse integer conversion unit 307, and an adder 308. The encoding unit 102 also includes a first frame memory 309, a second frame memory 313, an intra-prediction unit 310, a first switch 311, and a second switch 317. In addition, the encoding unit 102 also includes a deblocking filter 312, an inter-prediction unit 314, a motion detection unit 315, and a picture type control unit 316. The encoding unit 102 creates blocks by dividing an input video signal, performs an encoding process on a block-by-block basis, and outputs the resulting encoded bitstream to the encoded stream recording unit 103.

Next, the encoding process performed by the encoding unit 102 shall be described.

In FIG. 3, the frame rearranging unit 301 rearranges the video signal input in display order into encoding order. The subtractor 302 subtracts predicted image data from the input image data, and outputs the resulting residual image data to the integer conversion unit 303. The generation of the predicted image data shall be described later.

The integer conversion unit 303 performs an orthogonal transform on the residual image data output by the subtractor 302 and outputs the resulting conversion coefficient to the quantization unit 304. The quantization unit 304 quantizes the conversion coefficient output by the integer conversion unit 303 using preset quantization parameters. The entropy encoding unit 305 takes the conversion coefficient quantized by the quantization unit 304, performs entropy encoding thereupon, and outputs the resultant as an encoded bitstream.

The conversion coefficient quantized by the quantization unit 304 is used in the generation of the aforementioned predicted image data. The inverse quantization unit 306 inverse-quantizes the conversion coefficient quantized by the quantization unit 304. The inverse integer conversion unit 307 performs an inverse integer conversion on the conversion coefficient inverse-quantized by the inverse quantization unit 306 and outputs the resultant to the adder 308 as decoded residual image data. The adder 308 adds the decoded residual image data output by the inverse integer conversion unit 307 with the predicted image data, and outputs the resulting restructured image data.

The restructured image data output by the adder 308 is recorded into the first frame memory 309. Meanwhile, in the case where a deblocking filtering process is to be performed on the restructured image data, the restructured image data is recorded into the second frame memory 313 via the deblocking filter 312. However, in the case where a deblocking filtering is not to be performed, the restructured image data is recorded into the second frame memory 313 without passing through the deblocking filter 312.

The first switch 311 functions as a selection unit that selects whether or not to perform a deblocking filtering process on the restructured image data output by the adder 308. Data in the restructured image data that has a chance of being referred to in predictions thereafter is saved for a temporary period in the first frame memory 309 or the second frame memory 313.

The intra-prediction unit 310 uses the restructured image data recorded in the first frame memory 309 to perform an intra-frame prediction process, thereby generating predicted image data. Meanwhile, the inter-prediction unit 314 uses the restructured image data recorded in the second frame memory 313 to perform an inter-frame prediction process based on motion vector information estimated by the motion detection unit 315, thereby generating predicted image data. Here, the motion detection unit 315 estimates motion vectors in the input image data, and outputs information of the estimated motion vectors to the entropy encoding unit 305 and the inter-prediction unit 314, respectively.

The picture type control unit 316 functions as an information obtaining unit, obtaining base frame setting information in the case where the base frame setting determination unit 104 has determined to set an encoded frame as a base frame, which shall be described later. The picture type of the frame is then set as the IDR picture in accordance with instructions included in frame setting information. However, in other cases, the picture type of the frame is set to a picture type in accordance with the encoding standard (an I picture, a P picture, or a B picture).

Note that in the case where the encoded frame has been determined to be a base frame, the picture type control unit 316 may add a base frame flag to that frame and set the picture type of that frame to a picture type in accordance with the encoding standard. Furthermore, in the case where the encoded frame has been determined to be a base frame, the picture type of that frame may be set to an I picture, and a skipping reference prohibition flag may be added to that frame. A reference relationship that prevents the inter-prediction unit 314 from skipping that I picture may then be set.

The second switch 317 is a switch for selecting whether to use the predicted image data generated by the intra-prediction unit 310 or the predicted image data generated by the inter-prediction unit 314 as the predicted image data. In other words, the second switch 317 functions as a selection unit for selecting whether to use intra prediction or inter prediction. The picture type control unit 316 controls the second switch 317 in accordance with the set picture type, thereby selecting the output from the intra-prediction unit 310 or the output from the inter-prediction unit 314. The selected predicted image data is then output to the subtractor 302 and the adder 308.

[Base Frame Setting Determination Unit 104]

Figure 4:
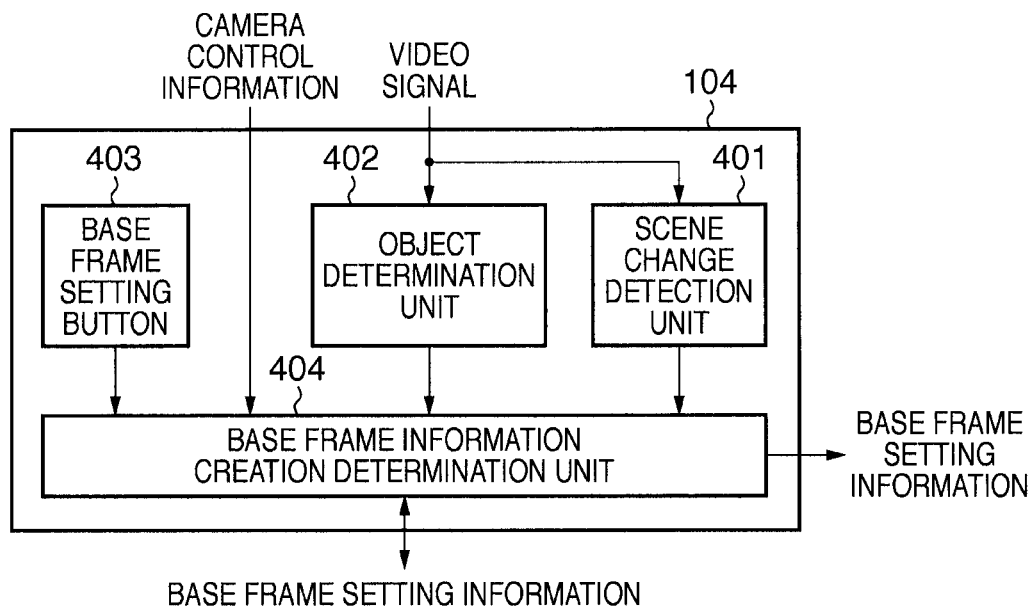
FIG. 4 is a block diagram illustrating an exemplary configuration of a base frame setting determination unit in an image pickup apparatus according to an embodiment of the present invention.

Next, an exemplary configuration of the base frame setting determination unit 104 shall be described in detail with reference to FIG. 4. As shown in FIG. 4, the base frame setting determination unit 104 includes a scene change detection unit 401, an object determination unit 402, a base frame setting button 403, and a base frame information creation determination unit 404. The base frame setting determination unit 104 outputs skipping reference prohibition information (base frame setting information) that prohibits motion references that skip frames in accordance with, for example, information such as (1) through (7) below:
(1) the start and stop of shooting (recording);
(2) the start and stop of movement of the image pickup apparatus itself (motion blur, pan, tilt);
(3) changes in the shooting conditions (white balance, exposure, focus, zoom ratio);
(4) scene changes;
(5) changes in object information;
(6) the pressing of the base frame setting button 403; and
(7) whether or not base frame setting information has been received by the base frame setting information transmitting/receiving unit 105.

The scene change detection unit 401 detects scene changes by determining inter-frame correlations in the video signal output by the camera unit 101. The results of the detection are sent to the base frame information creation determination unit 404. The inter-frame correlation is determined based on, for example, pixel difference values between frames. The object determination unit 402 identifies an object included in the video signal output by the camera unit 101 through image recognition. The results of this analysis are sent to the base frame information creation determination unit 404. Image recognition identifies an object using a known method such as shape recognition; detail descriptions thereof shall be omitted here. The scene change detection unit 401 and the object determination unit 402 function, in the manner described thus far, as an image analysis unit.

The base frame setting button 403 is a button for setting a base frame at a time preferred by a user, performed by the user pressing the base frame setting button 403 to set the base frame, described later. The base frame information creation determination unit 404 determines whether or not to set a base frame, and in the case where it has been determined that a base frame is to be set, creates base frame setting information for encoding a frame encoded by the encoding unit 102 as a base frame. The base frame setting information is then output to the encoding unit 102 and the base frame setting information transmitting/receiving unit 105.

Figure 5:
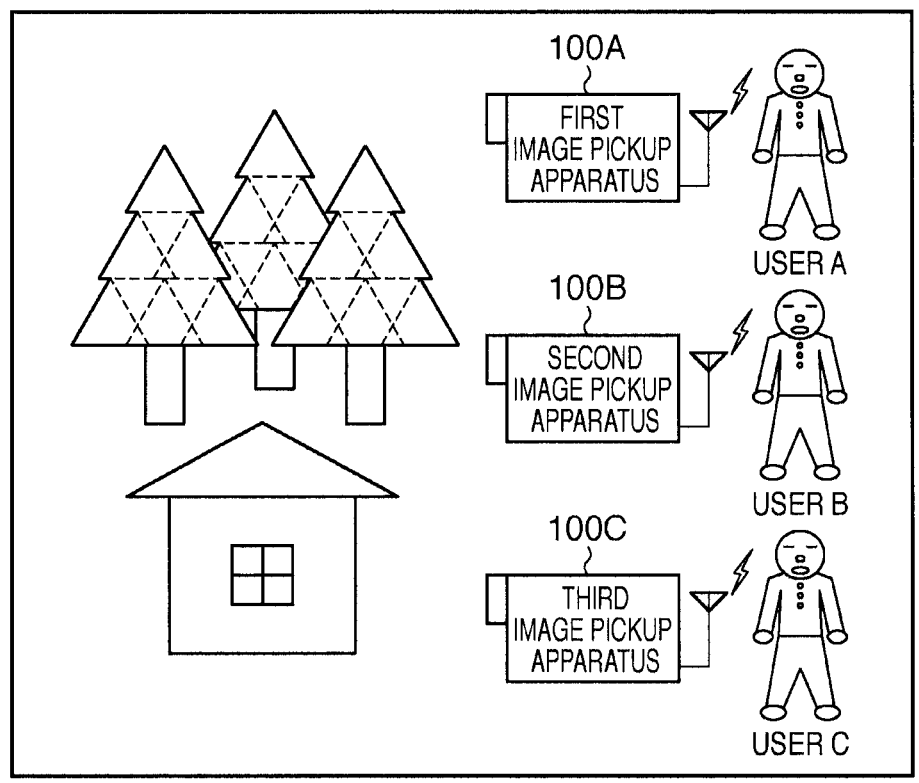
FIG. 5 is a diagram illustrating an example of group shooting.

Next, operations of the base frame setting determination unit 104 shall be described in detail with reference to FIGS. 5 through 9B. FIG. 5 is a diagram illustrating a state in which group shooting is being carried out by three users each using the image pickup apparatus 100 of the present embodiment.

In FIG. 5, one of the users, or user A, shoots using a first image pickup apparatus 100A, whereas user B shoots using a second image pickup apparatus 100B, and user C shoots using a third image pickup apparatus 100C. The first image pickup apparatus 100A, second image pickup apparatus 100B, and third image pickup apparatus 100C each transmit/receive base frame setting information via a wireless communication network based on, for example, the IEEE 802.11g standard, using their respective base frame setting information transmitting/receiving units 105.

FIGS. 6A to 9B are diagrams illustrating base frame settings performed in the case where group shooting is being carried out as shown in FIG. 5. First, an example where a base frame is set in accordance with shooting start and end control information from the other image pickup apparatuses during group shooting shall be described with reference to FIGS. 6A and 6B. Note that the start of shooting may be determined based on the start of recording.

In the example shown in FIGS. 6A and 6B, the first image pickup apparatus 100A of the user A starts shooting at time t1 and stops shooting at time t6. Meanwhile, the second image pickup apparatus 100B of the user B starts shooting at time t2 and stops shooting at time t4. Finally, the third image pickup apparatus 100C of the user C starts shooting at time t3 and stops shooting at time t7. Furthermore, the base frame setting button 403 of the first image pickup apparatus 100A of the user A is pressed at time t5.

First, an example in which the encoding unit 102 of the first image pickup apparatus 100A of the user A sets a base frame at time t2 shall be described with reference to FIG. 6A.

When at time t2, the user B starts shooting by pressing the shooting start/stop button, the base frame information creation determination unit 404 in the second image pickup apparatus 100B of the user B determines to set a base frame based on the pressing of the shooting start/stop button. Then, base frame setting information is output to the base frame setting information transmitting/receiving unit 105 of the second image pickup apparatus 100B.

Then, the base frame setting information transmitting/receiving unit 105 transmits the base frame setting information to the first image pickup apparatus 100A of the user A and the third image pickup apparatus 100C of the user C. At time t2, the first image pickup apparatus 100A of the user A, which is currently shooting, receives, via its own base frame setting information transmitting/receiving unit 105, the base frame setting information transmitted by the second image pickup apparatus 100B of the user B.

Then, the base frame information creation determination unit 404 of the first image pickup apparatus 100A of the user A determines to set the base frame through input of the received base frame setting information performed by that base frame information creation determination unit 404. The base frame setting information is then output to the encoding unit 102 of the first image pickup apparatus 100A. Upon doing so, the encoding unit 102 of the first image pickup apparatus 100A of the user A sets the picture type to IDR picture, thereby setting the base frame.

Meanwhile, when at time t4, the user B stops shooting by pressing the shooting start/stop button, the base frame information creation determination unit 404 in the second image pickup apparatus 100B of the user B determines to set a base frame based on the pressing of the shooting start/stop button. Then, base frame setting information is output to the base frame setting information transmitting/receiving unit 105 of the second image pickup apparatus 100B.

The base frame setting information transmitting/receiving unit 105 then transmits the base frame setting information to the first image pickup apparatus 100A of the user A and the third image pickup apparatus 100C of the user C. Meanwhile, at time t4, the first image pickup apparatus 100A of the user A and the third image pickup apparatus 100C of the user C, which are currently shooting, receive, via their respective base frame setting information transmitting/receiving units 105, the base frame setting information transmitted by the second image pickup apparatus 100B of the user B.

Then, the base frame information creation determination units 404 of the first image pickup apparatus 100A of the user A and the third image pickup apparatus 100C of the user C determine to set the base frame through input of the received base frame setting information performed by those base frame information creation determination units 404. The base frame setting information is then output to the respective encoding units 102. Upon doing so, the encoding units 102 of the first image pickup apparatus 100A of the user A and the third image pickup apparatus 100C of the user C set the picture type to IDR picture, thereby setting the base frame.

Similarly, when at time t3, the third image pickup apparatus 100C of the user C starts shooting, the encoding units 102 of the first image pickup apparatus 100A of the user A and the second image pickup apparatus 100B of the user B, which are currently shooting at time t3, set base frames. In addition, when at time t6, the first image pickup apparatus 100A of the user A stops shooting, the encoding unit 102 of the third image pickup apparatus C of the user C, which is currently shooting at time t6, sets a base frame.

Next, an example in which the encoding units 102 of the first image pickup apparatus 100A of the user A and the third image pickup apparatus 100C of the user C set base frames at time t5 shall be described with reference to FIG. 6A.

The base frame information creation determination unit 404 of the first image pickup apparatus 100A of the user A determines to set a base frame at time t5 based on the base frame setting button 403 being pressed. Base frame setting information is then output. Upon doing so, the encoding unit 102 of the first image pickup apparatus 100A of the user A sets the picture type to IDR picture, thereby setting the base frame.

At the same time, the base frame setting information transmitting/receiving unit 105 of the first image pickup apparatus 100A of the user A transmits base frame setting information to the second image pickup apparatus 100B of the user B and the third image pickup apparatus 100C of the user C. Meanwhile, at time t5, the third image pickup apparatus 100C of the user C, which is currently shooting, receives, via its own base frame setting information transmitting/receiving unit 105, the base frame setting information transmitted by the first image pickup apparatus 100A of the user A.

The base frame information creation determination unit 404 of the third image pickup apparatus 100C of the user C then determines to set the base frame by inputting the received base frame setting information. Then, the base frame setting information is output to the encoding unit 102 of the third image pickup apparatus 100C. Upon doing so, the encoding unit 102 of the third image pickup apparatus 100C of the user C sets the picture type to IDR picture, thereby setting the base frame.

As described thus far, setting a base frame when another image pickup apparatus starts shooting (starts recording) or stops shooting (stops recording), when the base frame setting button 403 is pressed, or the like makes it possible to start playback quickly from the base frame, perform cut edits using the base frame as the cut frame, and so on.

Next, cut editing shall be described with reference to FIG. 6B. The example shown in FIG. 6B shows an encoded bitstream obtained after editing by the users A, B, and C performing group shooting using their respective image pickup apparatuses, and the base frames in the three encoded bitstreams being used as cut frames for the editing.

The edited encoded bitstream shown in FIG. 6B is a stream in which the video shot by the user A from times t1 to t2, the video shot be the user B from times t2 to t4, the video shot by the user A from times t4 to t5, and the video shot by the user C from times t5 to t7, shown in FIG. 6A, are spliced together. This kind of cut editing makes it possible to create a stream that switches to the video of another user when, for example, shooting starts or stops. In addition, by pressing the base frame setting button 403, the user can create a stream that switches to the video from another user at his/her preferred timing.

Next, an example in which a base frame is set in accordance with camera control information and a scene change during group shooting shall be described with reference to FIGS. 7A and 7B and FIGS. 8A and 8B. In the examples shown in FIGS. 7A and 8A, the first image pickup apparatus 100A of the user A starts shooting at time t1 and stops shooting at time t9. Meanwhile, the second image pickup apparatus 100B of the user B starts shooting at time t2 and stops shooting at time t6. Finally, the third image pickup apparatus 100C of the user C starts shooting at time t4 and stops shooting at time t10.

Furthermore, in the example shown in FIG. 7A, in the first image pickup apparatus 100A of the user A, a scene change occurs at times t5 and t8, and in the second image pickup apparatus 100B of the user B, a white balance setting value is changed at time t3. In the third image pickup apparatus 100C of the user C, an exposure setting value is changed at time t7. Meanwhile, in the example shown in FIG. 8A, in the first image pickup apparatus 100A of the user A, the focus is adjusted during the period from times t3 to t5. In the third image pickup apparatus 100C of the user C, a panning operation that changes the direction of the third image pickup apparatus 100C in order to change the photographic composition is carried out from times t7 to t8. Note that focus adjustment control information, zoom operation control information, image processing control information such as white balance and exposure setting values, movement information such as pan/tilt operations, vibration information related to motion blur, and the like are included in the camera control information.

First, an example in which the encoding units 102 of the first image pickup apparatus 100A of the user A and the second image pickup apparatus 100B of the user B set base frames at time t3 shall be described with reference to FIG. 7A.

When a white balance setting value is changed in the second image pickup apparatus 100B of the user B at time t3, the base frame information creation determination unit 404 of the second image pickup apparatus 100B determines to set a base frame based on the change in the white balance setting value. Then, the encoding unit 102 of the second image pickup apparatus 100B of the user B sets the picture type to IDR picture, thereby setting the base frame.

Furthermore, the base frame setting information transmitting/receiving unit 105 of the second image pickup apparatus 100B of the user B transmits base frame setting information to the first image pickup apparatus 100A of the user A and the third image pickup apparatus 100C of the user C. Meanwhile, at time t3, the first image pickup apparatus 100A of the user A, which is currently shooting, receives, via its own base frame setting information transmitting/receiving unit 105, the base frame setting information transmitted by the second image pickup apparatus 100B of the user B.

Then, the base frame information creation determination unit 404 of the first image pickup apparatus 100A of the user A determines to set the base frame through input of the received base frame setting information performed by that base frame information creation determination unit 404. The base frame setting information is then output to the encoding unit 102 of the first image pickup apparatus 100A. Upon doing so, the encoding unit 102 of the first image pickup apparatus 100A of the user A sets the picture type to IDR picture, thereby setting the base frame.

Through a similar procedure, the third image pickup apparatus 100C of the user C changes an exposure setting value at time t7, and as a result, the third image pickup apparatus 100C of the user C and the first image pickup apparatus 100A of the user A, which is currently shooting at time t7, set base frames.

Next, an example in which the encoding units 102 of the first image pickup apparatus 100A of the user A, the second image pickup apparatus 100B of the user B, and the third image pickup apparatus 100C of the user C set base frames at time t5 shall be described with reference to FIG. 7A.

First, the scene change detection unit 401 of the first image pickup apparatus 100A of the user A detects a scene change at time t5. Through this, the base frame information creation determination unit 404 of the first image pickup apparatus 100A of the user A determines to set a base frame based on the detection of the scene change. The encoding unit 102 of the first image pickup apparatus 100A of the user A then sets the picture type to IDR picture, thereby setting the base frame.

Furthermore, the base frame setting information transmitting/receiving unit 105 of the first image pickup apparatus 100A of the user A transmits base frame setting information to the second image pickup apparatus 100B of the user B and the third image pickup apparatus C of the user C. Meanwhile, the second image pickup apparatus 100B of the user B and the third image pickup apparatus 100C of the user C, which are currently shooting at time t5, receive, via their own base frame setting information transmitting/receiving units 105, the base frame setting information transmitted by the first image pickup apparatus 100A of the user A.

Then, the base frame information creation determination units 404 of the second image pickup apparatus 100B of the user B and the third image pickup apparatus 100C of the user C determine to set the base frame by inputting the received base frame setting information. The base frame setting information is then output to the respective encoding units 102. Upon doing so, the encoding units 102 of the second image pickup apparatus 100B of the user B and the third image pickup apparatus 100C of the user C set the picture type to IDR picture, thereby setting the base frame.

Note that by setting the base frame (IDR picture), referring to other pictures by skipping the base frame is prohibited, and thus there are cases where the encoding efficiency drops as a result. For this reason, there is the possibility that setting many base frames will lead to a drop in image quality. Accordingly, setting base frames during a predetermined period following the setting of a base frame may be prohibited.

For example, the scene change detection unit 401 of the first image pickup apparatus 100A of the user A detects a scene change at time t8. However, the base frame information creation determination unit 404 of the first image pickup apparatus 100A of the user A determines not to set a base frame because a predetermined amount of time has not passed since the previous base frame was set in time t7. Accordingly, the encoding unit 102 of the first image pickup apparatus 100A of the user A performs encoding based on a picture type compliant with the encoding standard. Furthermore, the base frame setting information transmitting/receiving unit 105 of the first image pickup apparatus 100A of the user A is caused not to transmit base frame setting information.

As described thus far, setting a base frame in accordance with a change in shooting conditions or the detection of a scene change makes it possible to start playback quickly from the base frame, perform cut edits using the base frame as the cut frame, and so on.

Figure 7B:
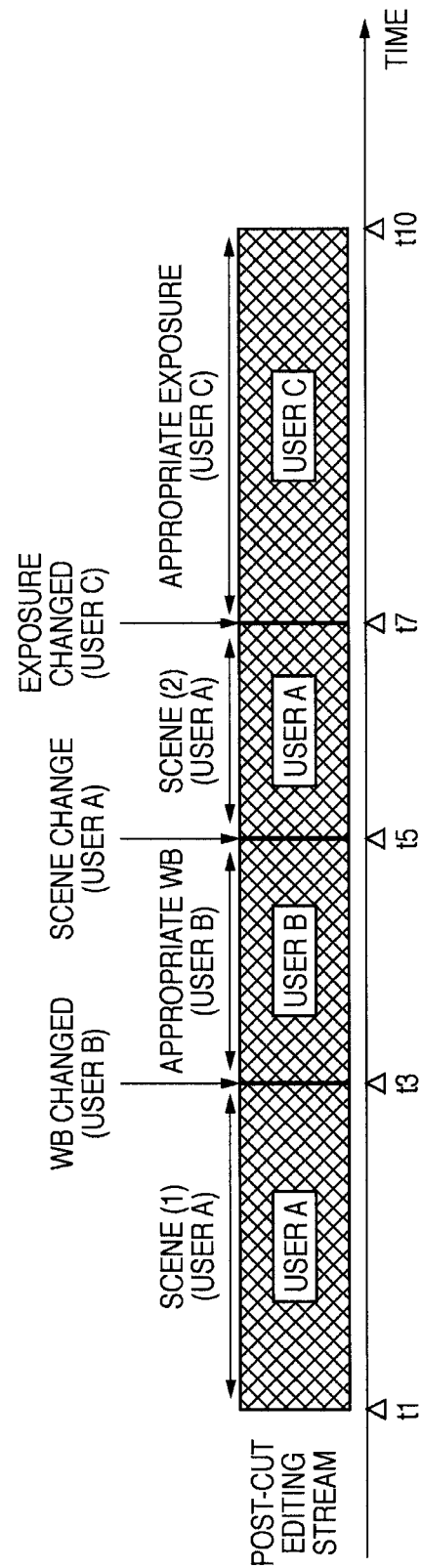

Next, cut editing shall be described with reference to FIG. 7B. The example shown in FIG. 7B shows an encoded bitstream obtained after editing by the users A, B, and C performing group shooting using their respective image pickup apparatuses, and the base frames in the three encoded bitstreams being used as cut frames for the editing.

For example, it is assumed that an improper white balance value had been set in the second image pickup apparatus 100B of the user B prior to time t3, but that the white balance value was changed to a proper setting value at time t3. By taking the base frame set at time t3 as the cut frame, cut editing that uses only the portions of the video that have proper white balance, as shown in FIG. 7B, can be performed.

Similarly, for example, it is assumed that an improper exposure value had been set in the third image pickup apparatus 100C of the user C prior to time t7, but that the exposure setting value was changed to a proper setting value at time t7. By taking the base frame set at time t7 as the cut frame, cut editing that uses only the portions of the video that have proper exposure, as shown in FIG. 7B, can be performed.

In addition, a base frame set by the first image pickup apparatus 100A of the user A due to a scene change at time t5 can be taken as a cut frame. Through this, a scene (shot video scene (2)) that is different from a shot video scene (1) shot by the first image pickup apparatus 100A of the user A from times t1 to t3 in FIG. 7B can be spliced in from times t5 to t7 in FIG. 7B.

Next, an example in which the encoding units 102 of the first image pickup apparatus 100A of the user A, the second image pickup apparatus 100B of the user B, and the third image pickup apparatus 100C of the user C set base frames at times t3 and t5 shall be described with reference to FIG. 8A.

When focus adjustment is started by the first image pickup apparatus 100A of the user A at time t3, the base frame information creation determination unit 404 of the first image pickup apparatus 100A determines to set a base frame based on the start of the focus adjustment. The encoding unit 102 of the first image pickup apparatus 100A of the user A then sets the picture type to IDR picture, thereby setting the base frame.

Furthermore, the base frame setting information transmitting/receiving unit 105 of the first image pickup apparatus 100A of the user A transmits base frame setting information to the second image pickup apparatus 100B of the user B and the third image pickup apparatus 100C of the user C. Meanwhile, at time t3, the second image pickup apparatus 100B of the user B, which is currently shooting, receives, via its own base frame setting information transmitting/receiving unit 105, the base frame setting information transmitted by the first image pickup apparatus 100A of the user A.

The base frame information creation determination unit 404 of the second image pickup apparatus 100B of the user B then determines to set the base frame by inputting the received base frame setting information. The base frame setting information is then output to the encoding unit 102 of the second image pickup apparatus 100B. Upon doing so, the encoding unit 102 of the second image pickup apparatus 100B of the user B sets the picture type to IDR picture, thereby setting the base frame.

Meanwhile, when focus adjustment is completed by the first image pickup apparatus 100A of the user A at time t5, the base frame information creation determination unit 404 of the first image pickup apparatus 100A of the user A determines to set a base frame based on the completion of the focus adjustment. The encoding unit 102 of the first image pickup apparatus 100A of the user A then sets the picture type to IDR picture, thereby setting the base frame.

Furthermore, the base frame setting information transmitting/receiving unit 105 of the first image pickup apparatus 100A of the user A transmits base frame setting information to the second image pickup apparatus 100B of the user B and the third image pickup apparatus 100C of the user C. Meanwhile, the second image pickup apparatus 100B of the user B and the third image pickup apparatus 100C of the user C, which are currently shooting at time t5, receive, via their own base frame setting information transmitting/receiving units 105, the base frame setting information transmitted by the first image pickup apparatus 100A of the user A.

Then, the base frame information creation determination units 404 of the second image pickup apparatus 100B of the user B and the third image pickup apparatus 100C of the user C determine to set the base frame by inputting the received base frame setting information. The base frame setting information is then output to the respective encoding units 102. Upon doing so, the encoding units 102 of the second image pickup apparatus 100B of the user B and the third image pickup apparatus 100C of the user C set the picture type to IDR picture, thereby setting the base frame.

Through a similar procedure, the third image pickup apparatus 100C of the user C starts a pan operation at time t7, and as a result, the third image pickup apparatus 100C of the user C and the first image pickup apparatus 100A of the user A, which is currently shooting at time t7, set base frames. Furthermore, the third image pickup apparatus 100C of the user C completes the pan operation at time t8, and as a result, the third image pickup apparatus 100C of the user C and the first image pickup apparatus 100A of the user A, which is currently shooting at time t8, set base frames.

Note that although the examples described thus far discuss focus adjustment and pan operations, the same descriptions hold true not only for focus adjustment and pan operations but also for zoom operations, tilt operations and motion blur detected by the vibration detector 205, and so on. Furthermore, it is acceptable for the base frame information creation determination unit 404 to determine to set the base frame only in the case where the speed of panning and tilting and the zoom speed are greater than a certain threshold.

As described thus far, setting a base frame in accordance with camera control information and scene changes makes it possible to start playback quickly from the base frame, perform cut edits using the base frame as the cut frame, and so on.

Next, cut editing shall be described with reference to FIG. 8B. The example shown in FIG. 8B shows an encoded bitstream obtained after editing by the users A, B, and C performing group shooting using their respective image pickup apparatuses, and the base frames in the three encoded bitstreams being used as cut frames for the editing.

Figure 8A:
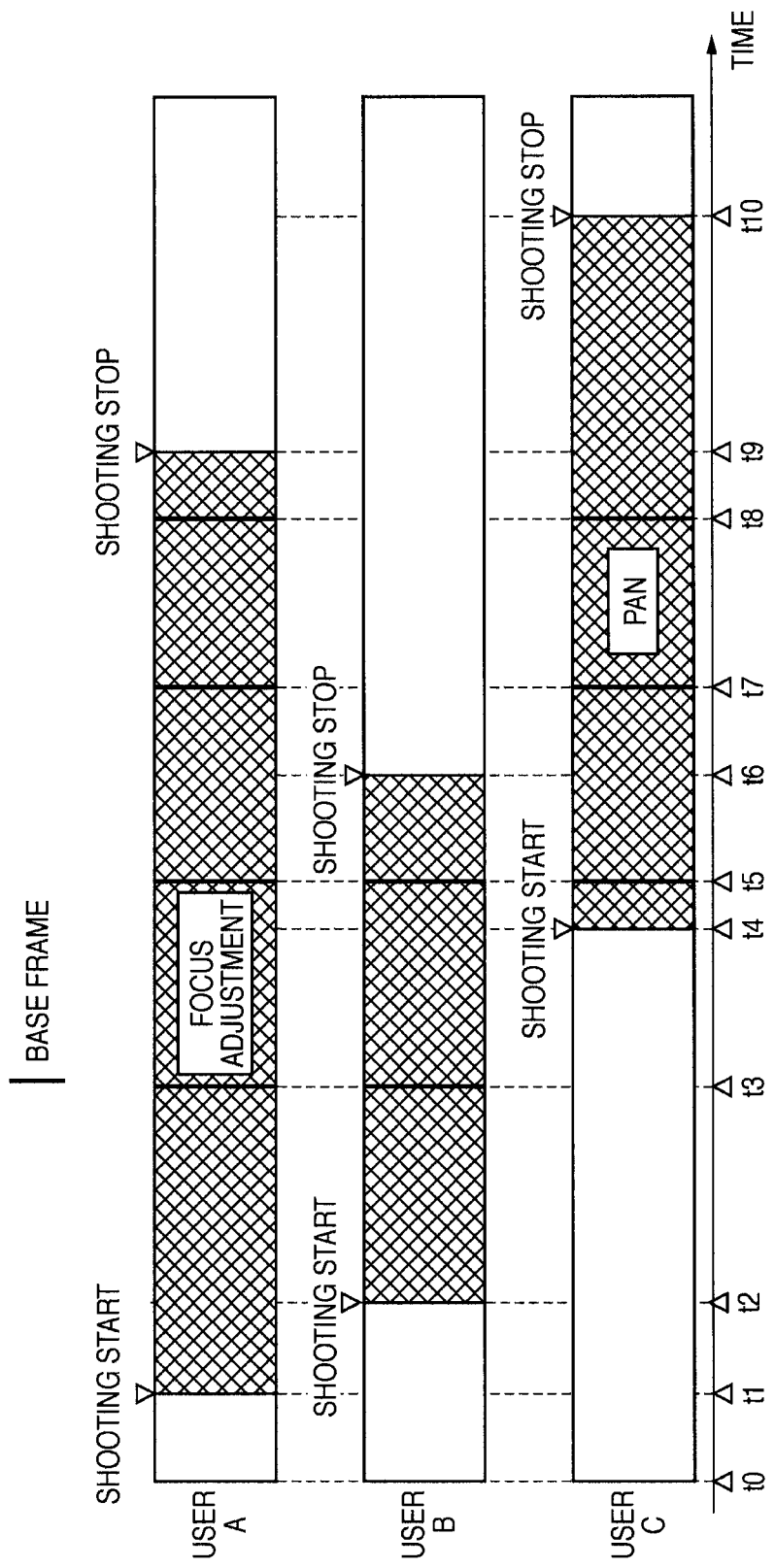
FIGS. 8A and 8B are diagrams illustrating another example of setting a base frame in accordance with camera control information and scene changes.
Figure 8B:
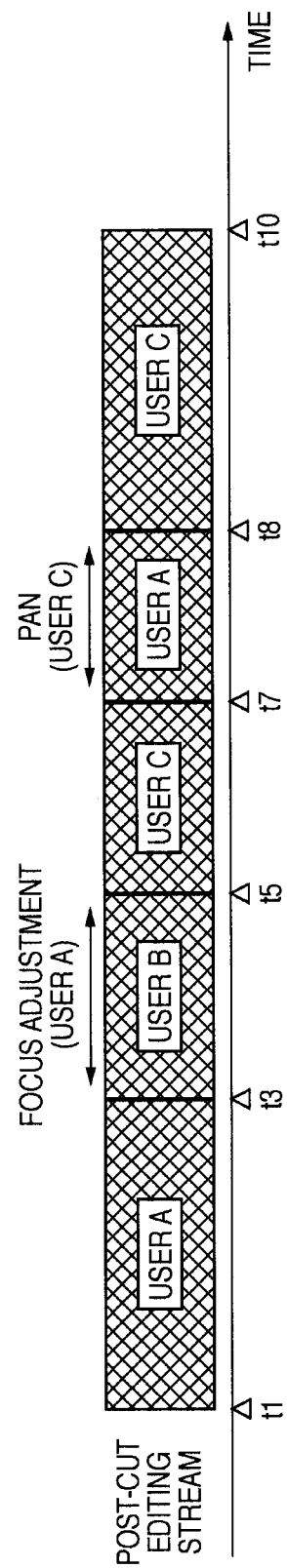

In the period from times t2 to t3 in FIG. 8A, the first image pickup apparatus 100A of the user A is performing a focus adjustment, and thus the video shot by the first image pickup apparatus 100A of the user A during the period from times t2 to t3 is unfocused and blurry. Accordingly, the base frames set for the times t3 and t5 in FIG. 8A are taken as cut frames. Doing so makes it possible to splice a video different from the blurry video shot by the first image pickup apparatus 100A of the user A (for example, a video from the user B) into the period from times t3 to t5 shown in FIG. 8B.

Similarly, in the period from times t7 to t8 in FIG. 8A, the third image pickup apparatus 100C of the user C is performing a pan operation. If this pan operation has a high speed, the shot video experiences irregularities, resulting in a video in which it is difficult for the viewer to recognize the object. Accordingly, the base frames set for the times t7 and t8 in FIG. 8A are taken as cut frames. Doing so makes it possible to splice a video different from the irregular video shot by the third image pickup apparatus 100C of the user C (for example, a video from the user A) into the period from times t7 to t8 shown in FIG. 8B.

Next, an example where a base frame is set in accordance with object information during group shooting shall be described with reference to FIGS. 9A and 9B. In the example shown in FIG. 9A, the first image pickup apparatus 100A of the user A starts shooting at time t1 and stops shooting at time t9. Meanwhile, the second image pickup apparatus 100B of the user B starts shooting at time t2 and stops shooting at time t6. Finally, the third image pickup apparatus 100C of the user C starts shooting at time t4 and stops shooting at time t10.

Furthermore, the first image pickup apparatus 100A of the user A shoots an object (1) during the period from times t1 to t3, an object (2) during the period from times t3 to t7, and an object (3) during the period from times t7 to t9. The second image pickup apparatus 100B of the user B shoots an object (4) during the period from times t2 to t5 and the object (1) during the period from times t5 to t6. Finally, the third image pickup apparatus 100C of the user C shoots the object (3) during the period from times t4 to t8 and the object (2) during the period from times t8 to t10. Note that the determination of these objects is carried out by the object determination units 402 of the respective image pickup apparatuses.

First, an example in which the encoding units 102 of the first image pickup apparatus 100A of the user A and the second image pickup apparatus 100B of the user B set base frames at time t3 shall be described with reference to FIG. 9A.

At time t3, when the object shot by the first image pickup apparatus 100A of the user A changes from the object (1) to the object (2), the base frame information creation determination unit 404 of the first image pickup apparatus 100A determines to set a base frame based on a change in the object information. The encoding unit 102 of the first image pickup apparatus 100A of the user A then sets the picture type to IDR picture, thereby setting the base frame.

Furthermore, the base frame setting information transmitting/receiving unit 105 of the first image pickup apparatus 100A of the user A transmits base frame setting information to the second image pickup apparatus 100B of the user B and the third image pickup apparatus C of the user C. Meanwhile, at time t3, the second image pickup apparatus 100B of the user B, which is currently shooting, receives, via its own base frame setting information transmitting/receiving unit 105, the base frame setting information transmitted by the first image pickup apparatus 100A of the user A.

The base frame information creation determination unit 404 of the second image pickup apparatus 100B of the user B then determines to set the base frame by inputting the received base frame setting information. The base frame setting information is then output to the encoding unit 102 of the second image pickup apparatus 100B. Upon doing so, the encoding unit 102 of the second image pickup apparatus 100B of the user B sets the picture type to IDR picture, thereby setting the base frame.

The same applies to the case where the object shot by the second image pickup apparatus 100B of the user B changes from the object (4) to the object (1) at time t5. In this case, the second image pickup apparatus 100B of the user B, and the first image pickup apparatus 100A of the user A and the third image pickup apparatus 100C of the user C, which are currently shooting at time t5, set base frames.

Furthermore, at time t7, when the object shot by the first image pickup apparatus 100A of the user A changes from the object (2) to the object (3), the first image pickup apparatus 100A of the user A and the third image pickup apparatus 100C of the user C, which is currently shooting, set base frames. When the object shot by the third image pickup apparatus 100C of the user C changes from the object (3) to the object (2) at time t8, the third image pickup apparatus 100C of the user C and the first image pickup apparatus 100A of the user, which is currently shooting, set base frames.

As described thus far, setting a base frame in accordance with a change in the object information makes it possible to start playback quickly from the base frame, perform cut edits using the base frame as the cut frame, and so on.

Next, cut editing shall be described with reference to FIG. 9B. The example shown in FIG. 9B shows an encoded bitstream obtained after editing by the users A, B, and C performing group shooting using their respective image pickup apparatuses, and the base frames in the three encoded bitstreams being used as cut frames for the editing.

Figure 9B:
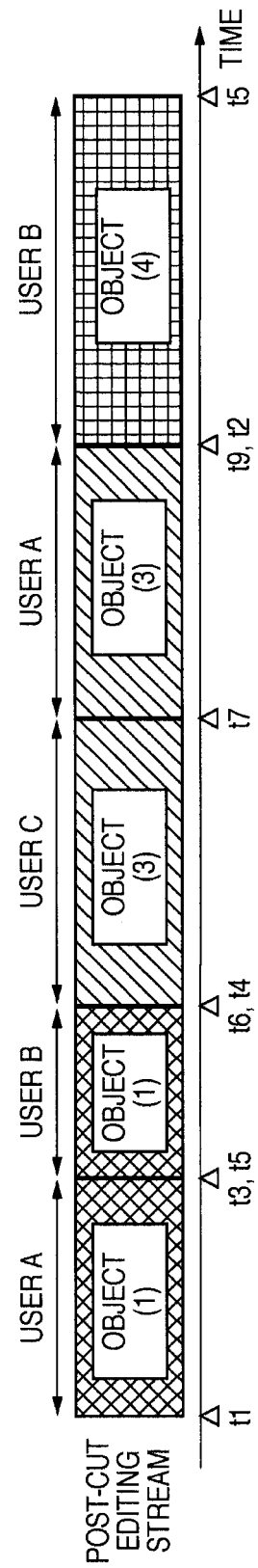

The edited encoded bitstream shown in FIG. 9B uses base frames set in accordance with changes in object information as cut frames. In the example shown in FIG. 9B, the user A's video from times t1 to t3, the user B's video from times t5 to t6, the user C's video from times t4 to t7, the user A's video from times t7 to t9, and the user B's video from times t2 to t5 are spliced together. Through this kind of cut editing, it is possible to create an encoded bitstream in which, for example, a video of a single object shot from different angles is chronologically continuous.

Figure 10:
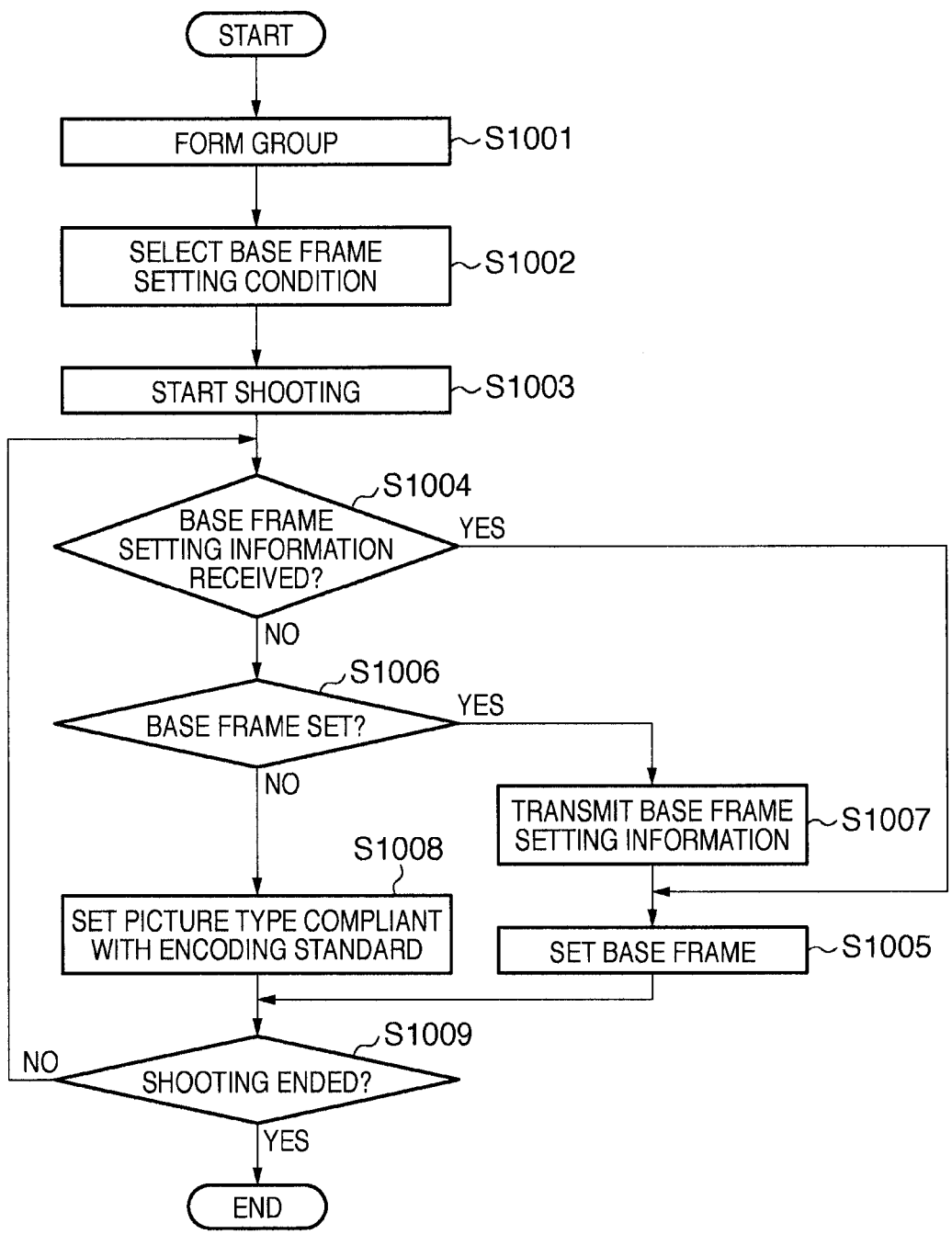
FIG. 10 is a flowchart illustrating an example of the operational procedure by which an image pickup apparatus sets a base frame according to the first embodiment of the present invention.
Figure 11A:
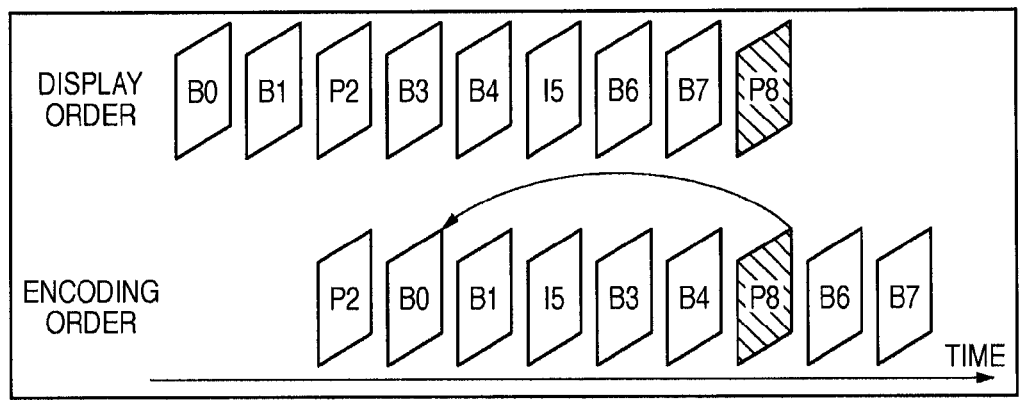
FIGS. 11A to 11C are diagrams illustrating examples of selecting reference images.
Figure 11B:
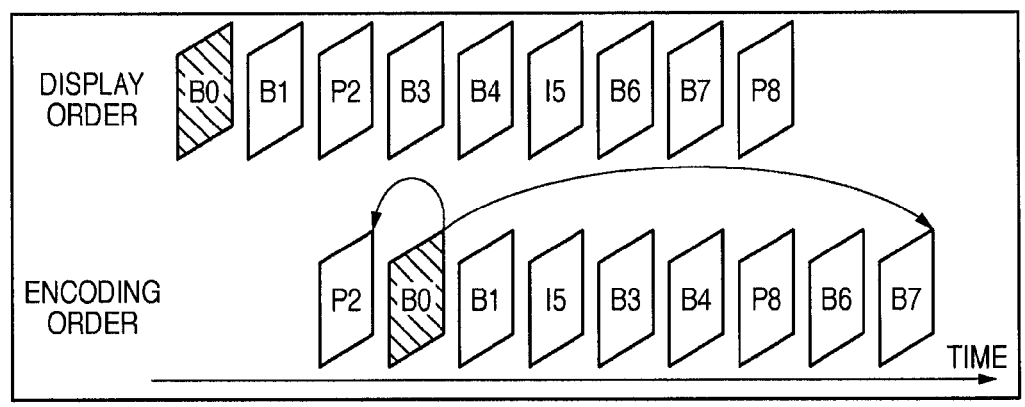
Figure 11C:
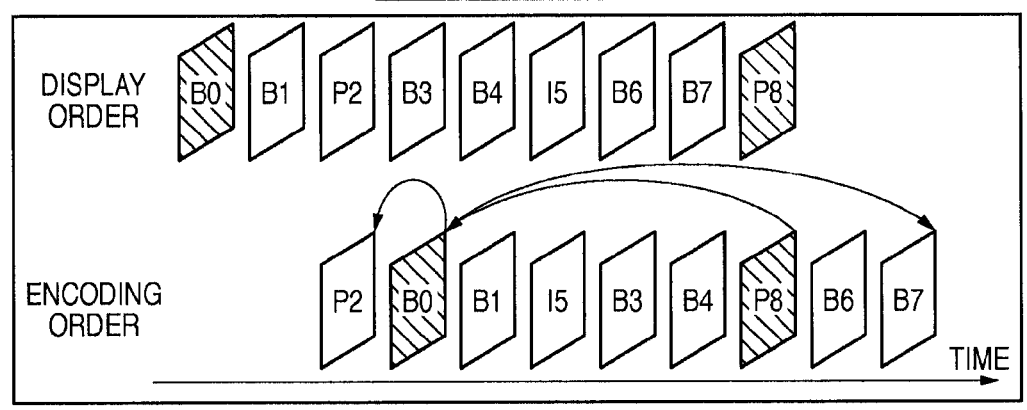
Figure 12A:
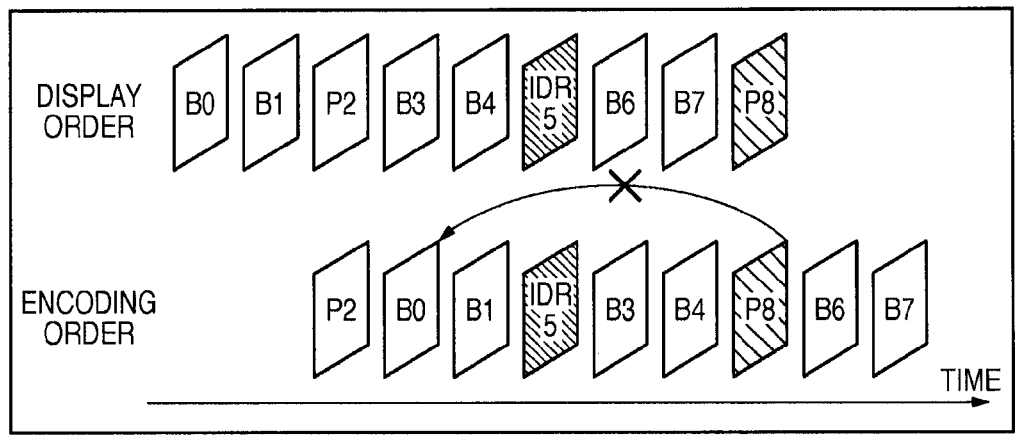
FIGS. 12A and 12B are diagrams illustrating an IDR picture.
Figure 12B:
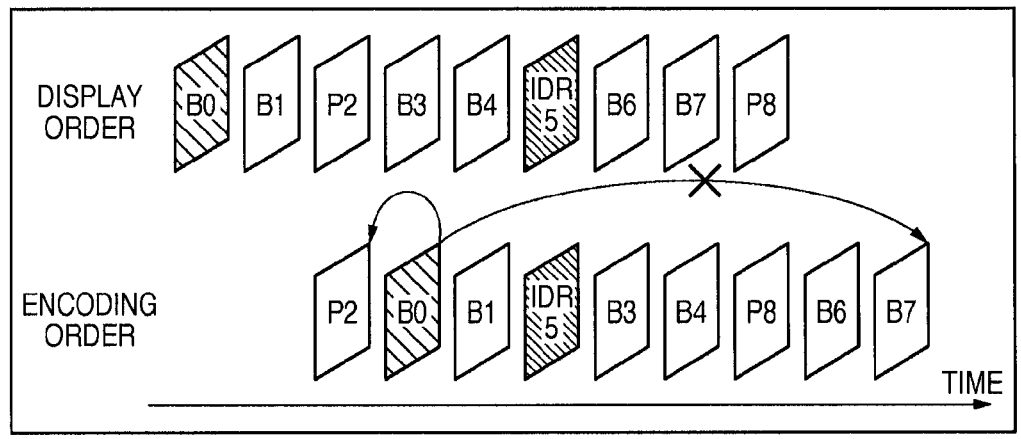

Next, a process for setting a base frame during group shooting shall be described with reference to the flowchart of FIG. 10. FIG. 10 is a flowchart illustrating an example of a process by which an image pickup apparatus 100 of the present embodiment sets a base frame.

First, in step S1001, the base frame setting determination unit 104 registers other image pickup apparatuses that are to participate in the group shooting in the shooting group in response to an operation performed by a user via an operational member (not shown), thereby forming a group. The group is formed by, for example, sharing a group ID among multiple image pickup apparatuses.

Next, in step S1002, the base frame setting determination unit 104 determines at least one base frame setting condition for the shooting group formed in step S1001 in response to an operation performed by a user via the operational member (not shown). Here, the "base frame setting condition" refers to a condition used by the base frame setting determination unit 104 in order to determine whether or not to set a base frame. This may be, for example, a condition specifying that a base frame is to be set in response to another image pickup apparatus starting or stopping shooting, a condition specifying that a base frame is to be set in response to the base frame setting button 403 being pressed, or the like.

Note that although it is preferable for the selected base frame setting conditions to be identical throughout the multiple image pickup apparatuses 100 participating in the shooting group, different base frame setting conditions may be selected by different image pickup apparatuses. Furthermore, in the case where the base frame setting conditions are identical throughout the multiple image pickup apparatuses participating in the group, a base frame setting condition may be set in a single image pickup apparatus and then transmitted to the other image pickup apparatuses.

Next, in step S1003, the camera unit 101 starts shooting in response to the shooting start/stop button being pressed by the user. Note that the times at which the multiple image pickup apparatuses participating in the group shooting start and stop shooting may be identical, or may be different. Then, in step S1004, the base frame setting information transmitting/receiving unit 105 functions as a receiving unit, and determines whether or not base frame setting information has been received from the other image pickup apparatuses. If this determination indicates that base frame setting information has been received (Yes in step S1004), the process advances to step S1005, where the picture type control unit 316 functions as an obtaining unit and obtains the base frame setting information. Then, the encoding unit 102 sets a base frame.

On the other hand, if the determination of step S1004 does not indicate that base frame setting information has been received (No in step S1004), the process advances to step S1006. In step S1006, the base frame information creation determination unit 404 functions as a determination unit, and determines whether or not to set a base frame based on the camera control information, video analysis information, and so on. If this determination results in a base frame being set (Yes in step S1006), the process advances to step S1007, where the base frame information creation determination unit 404 functions as a generating unit and generates base frame setting information. Then, the base frame setting information transmitting/receiving unit 105 functions as a transmitting unit, and transmits the generated base frame setting information to the other image pickup apparatuses. Then, in step S1005, the encoding unit 102 sets a base frame.

On the other hand, if the determination of step S1006 does not result in a base frame not being set (No in step S1006), the process advances to step S1008, where the encoding unit 102 sets a picture type compliant with the encoding standard. Then, in step S1009, the camera unit 101 determines whether or not shooting has ended. If it is determined that shooting has not ended (No in step S1009), the process returns to step S1004, and the aforementioned processes of steps S1004 to S1008 are repeated. However, if it is determined in step S1009 that shooting has ended (Yes in step S1009), the process simply ends.

Furthermore, although not illustrated in the flowchart, if, for example, "end of shooting" is selected as a base frame setting condition, and a determination of "Yes" is made in step S1009, the base frame setting information is generated and transmitted, in the same manner as step S1007.

According to the present embodiment as described thus far, a base frame for prohibiting references that skip frames within an encoded bitstream generated by the apparatus itself and other apparatuses is set in accordance with shooting circumstances, such as shooting/recording operations, camera control, video analysis, and so on. Accordingly, as opposed to the conventional art, it is possible to compress and encode images in a manner that does not greatly reduce the encoding efficiency, and possible to obtain an encoded bitstream suitable for editing.

Second Embodiment

Figure 13:
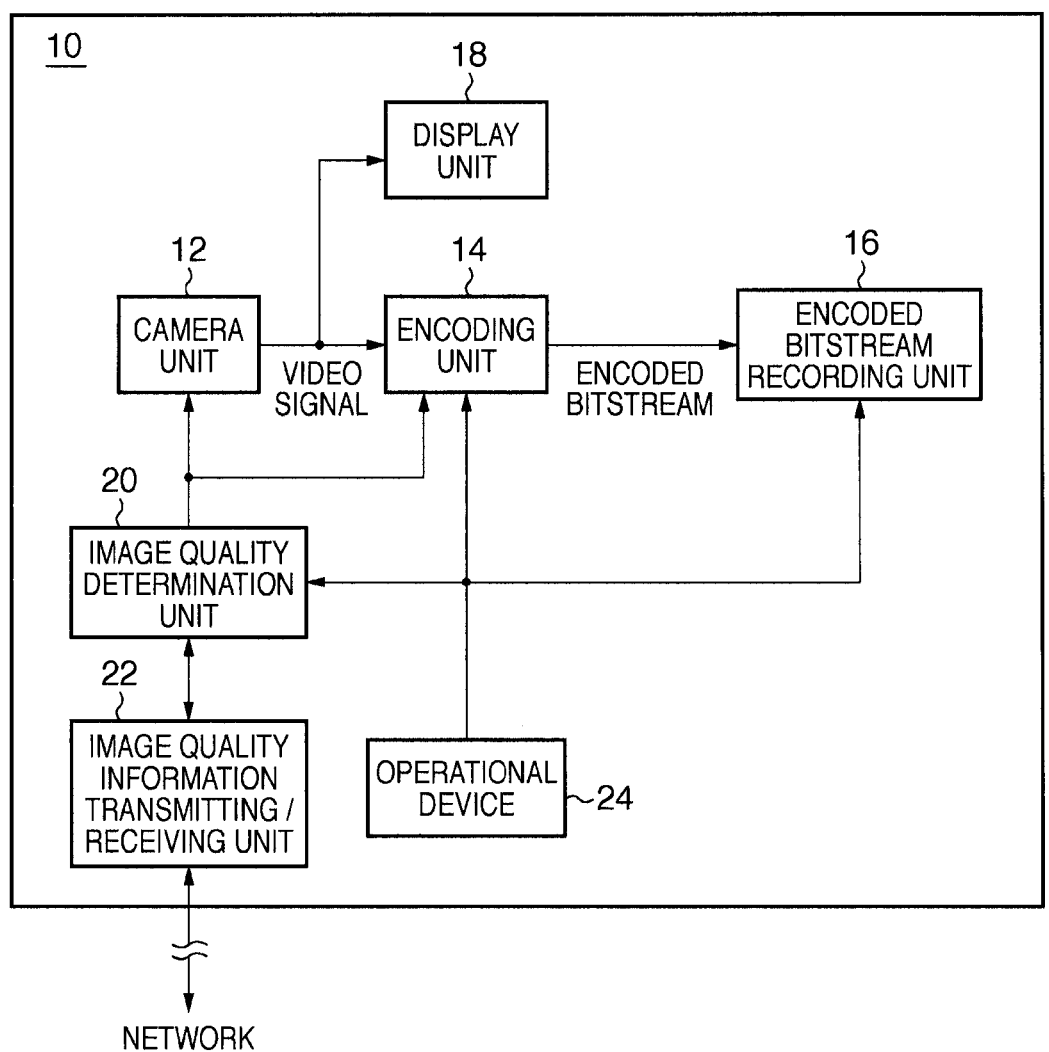
FIG. 13 is a block diagram illustrating an exemplary configuration of an image pickup apparatus according to a second embodiment of the present invention.

FIG. 13 is a block diagram illustrating, as a second embodiment, an exemplary functional configuration of an image pickup apparatus to which a moving image encoding apparatus embodying the present invention has been applied. The image pickup apparatus of the present embodiment can shoot video of a similar image quality to that shot by another image pickup apparatus.

An image pickup apparatus 10 is provided with a camera unit 12, an encoding unit 14, an encoded bitstream recording unit 16, a display unit 18, an image quality determination unit 20, and an image quality information transmitting/receiving unit 22 as its primary elements.

The camera unit 12 shoots an object and outputs a video signal. The encoding unit 14 compresses and encodes the video signal output by the camera unit 12. The encoded bitstream recording unit 16 records the encoded bitstream output by the encoding unit 14 into a storage medium. The display unit 18 displays the video signal output by the camera unit 12, and also displays a menu screen for performing image quality settings and so on.

The image quality determination unit 20 determines the image quality of the encoded bitstream output by the encoding unit 14 in accordance with the image quality settings made through the menu screen and image quality information from the image quality information transmitting/receiving unit 22. The image quality information transmitting/receiving unit 22 transmits and receives image quality information to and from other image pickup apparatuses provided with the same functions. In other words, the image quality information transmitting/receiving unit 22 transmits image quality information output by the image quality determination unit 20 to other image pickup apparatuses, and receives image quality information from other image pickup apparatuses and supplies that information to the image quality determination unit 20.

The image pickup apparatus 10 starts and stops the recording of video each time a shooting start/stop button in an operational device 24 is pressed by a user.

[Camera Unit 12]

Figure 14:
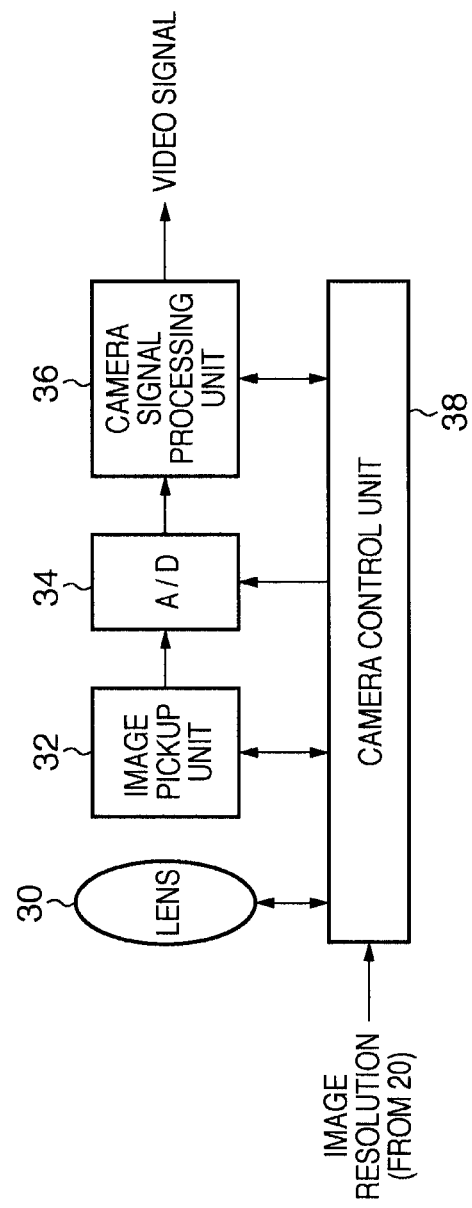
FIG. 14 is a block diagram illustrating an exemplary configuration of a camera unit in an image pickup apparatus according to the second embodiment of the present invention.

FIG. 14 is a block diagram illustrating an outline of the configuration of the camera unit 12. A lens 30 forms an optical image of an object on an image pickup unit 32. The image pickup unit 32 is a solid-state image sensor, such as a CCD or CMOS type, that converts the optical image formed by the lens 30 into an electric image signal. An A/D converter 34 converts the analog image signal output by the image pickup unit 32 into a digital image signal. A camera signal processing unit 36 performs processing such as exposure adjustment, γ correction, white balance correction, resolution conversion, and the like on the image data output by the A/D converter 34, and outputs a digital video signal in a specified format.

A camera control unit 38 controls the image pickup unit 32, the A/D converter 34, and the camera signal processing unit 36 based on information that expresses the image resolution output by the image quality determination unit 20 (resolution information). The camera signal processing unit 36 converts the resolution of the video signal based on the resolution information from the camera control unit 38. For example, if the resolution information indicates that the image is in high definition (HD, or a resolution of 1920×1080), the camera signal processing unit 36 outputs an video signal at HD resolution.

The camera control unit 38 also controls the zoom of the lens 30, and controls the focus of the lens 30 based on the video signal obtained by the camera signal processing unit 36.

[Encoding Unit 14]

Figure 15:
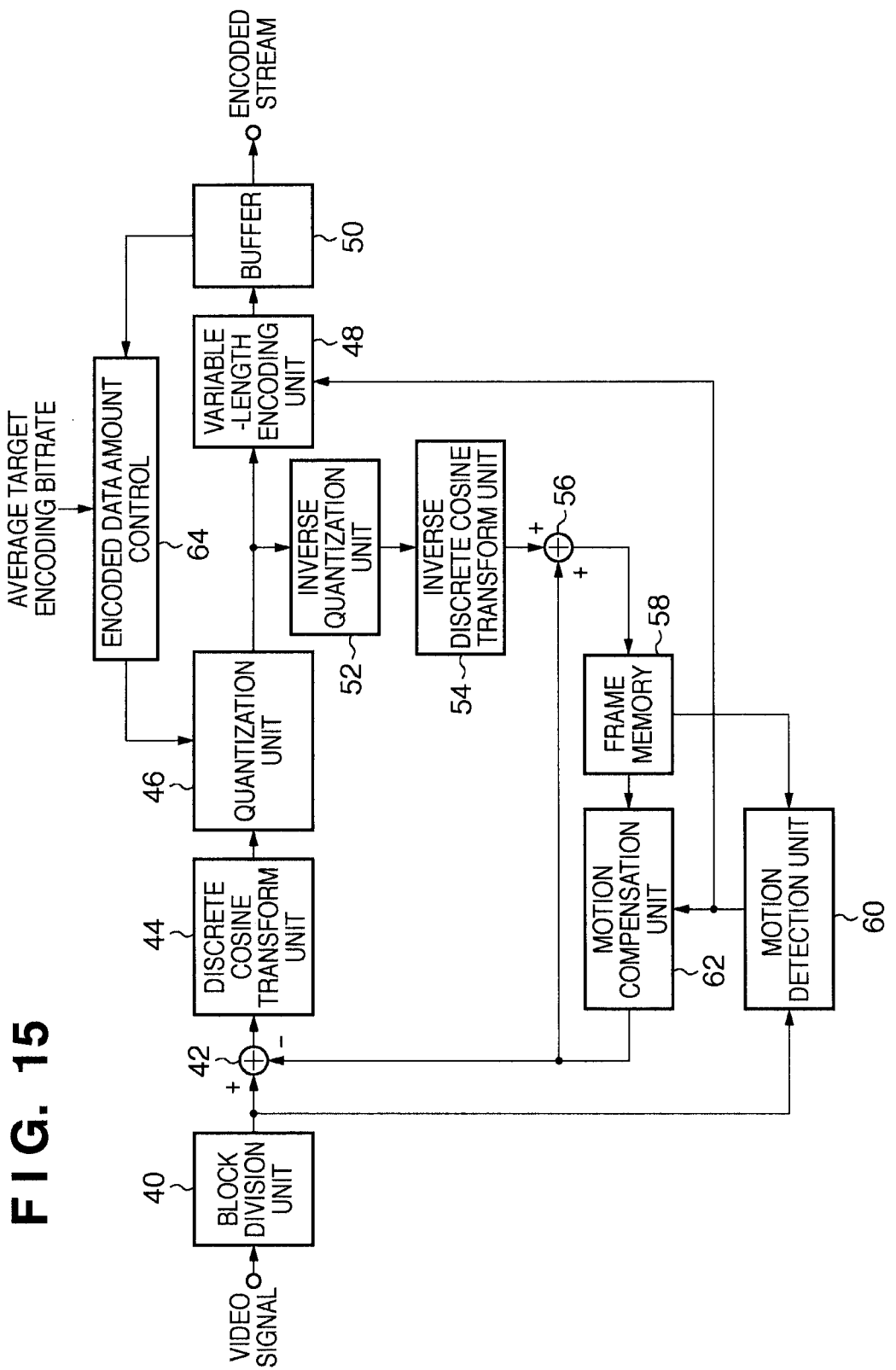
FIG. 15 is a block diagram illustrating an exemplary configuration of an encoding unit in an image pickup apparatus according to the second embodiment of the present invention.

FIG. 15 is a block diagram illustrating an outline of the configuration of the encoding unit 14. Here, the MPEG standard, the H.264 standard, and so on are used as the encoding standard. The encoding unit 14 is capable of encoding two types of video signals of differing resolutions, such as, for example, high definition (HD, or a resolution of 1920×1080) and standard definition (SD, or a resolution of 720×480). Furthermore, in the case where the unit is provided with functionality for both the H.264 encoding standard and the MPEG encoding standard, the encoding standard used may be changed depending on the resolution, whereby, for example, HD video is encoded using the H.264 encoding standard, whereas SD video is encoded using the MPEG encoding standard.

Next, the configuration and operations of the encoding unit 14 shown in FIG. 15 shall be described. A block division unit 40 divides the video signal from the camera unit 12 into blocks of a predetermined size on a frame-by-frame (screen-by-screen) basis, and outputs the image data on a block-by-block basis. A subtractor 42 outputs image data output by the block division unit 40 as-is for blocks that are not to undergo predictive encoding; however, for blocks that are to undergo predictive encoding, the subtractor 42 subtracts a prediction value (predicted image data) from the image data output by the block division unit 40 and outputs the residual data. The generation of the predicted image data shall be described later.

A discrete cosine transform unit 44 performs a discrete cosine transform (orthogonal transform) on the data output by the subtractor 42, and outputs a conversion coefficient. A quantization unit 46 quantizes the conversion coefficient from the discrete cosine transform unit 44 based on a quantization scale. Changing the quantization scale significantly changes the post-quantization conversion coefficient value, thereby changing the resulting encoded data amount. In other words, the compression rate can be controlled by changing the quantization scale. The quantized conversion coefficient output by the quantization unit 46 is supplied to a variable-length encoding unit 48 and an inverse quantization unit 52.

The quantized conversion coefficient output by the quantization unit 46 is used in the generation of the predicted image data. The inverse quantization unit 52 inverse-quantizes the quantized conversion coefficient from the quantization unit 46, and outputs a conversion coefficient representative value. An inverse discrete cosine transform unit 54 performs an inverse discrete cosine transform on the conversion coefficient representative value from the inverse quantization unit 52. The data output by the inverse discrete cosine transform unit 54 is image data for blocks that are not to undergo predictive encoding, and is residual data from the predicted image data for blocks that are to undergo predictive encoding. An adder 56 outputs data output by the inverse discrete cosine transform unit 54 as-is for blocks that are not to undergo predictive encoding. However, for blocks that are to undergo predictive encoding, the adder 56 adds the same predicted image data that was subtracted by the subtractor 42 to the data output by the inverse discrete cosine transform unit 54. The data output by the adder 56 is image data that has been locally decoded, and is called restructured image data.

A frame memory 58 is capable of storing several frames worth of image data, and temporarily stores the restructured image data output by the adder 56 that has a chance of being referred to in subsequent predictions. A motion detection unit 60 contrasts current image data to be encoded that has been output by the block division unit 40 with reference image data stored in the frame memory 58, thereby estimating a motion vector in the current image data. The motion detection unit 60 supplies information of the estimated motion vector to a motion compensation unit 62 and the variable-length encoding unit 48. The motion compensation unit 62 performs motion compensation on the reference image data in the frame memory 58 based on the motion vector estimated by the motion detection unit 60, and supplies the resulting predicted image data to the subtractor 42 and the adder 56.

The variable-length encoding unit 48 performs variable-length encoding on the quantized conversion coefficient from the quantization unit 46, and generates an encoded bitstream along with the motion vector information from the motion detection unit 60. The encoded bitstream is temporarily held in an output buffer 50 in order to control the encoded data amount, and is then output to the encoded bitstream recording unit 16. The encoded bitstream recording unit 16 records the encoded bitstream from the output buffer 50 into a storage medium.

An encoded data amount control unit 64 controls the quantization scale of the quantization unit 46, based on an average target encoding bitrate from the image quality determination unit 20 and the encoded data amount information from the output buffer 50, so that the encoding bitrate approaches the average target encoding bitrate. In the present embodiment, the encoded data amount control scheme is described as being the variable bitrate (VBR) scheme, in which the image quality fluctuates little; however, the encoded data amount control scheme is not limited thereto. The CBR, or constant bitrate, scheme may be used as well.

Operations of the image quality determination unit 20 shall be described hereinafter in detail with reference to FIGS. 16, 17A to 17C, 18A to 18C, 19A to 19D, and 20.

Figure 16:
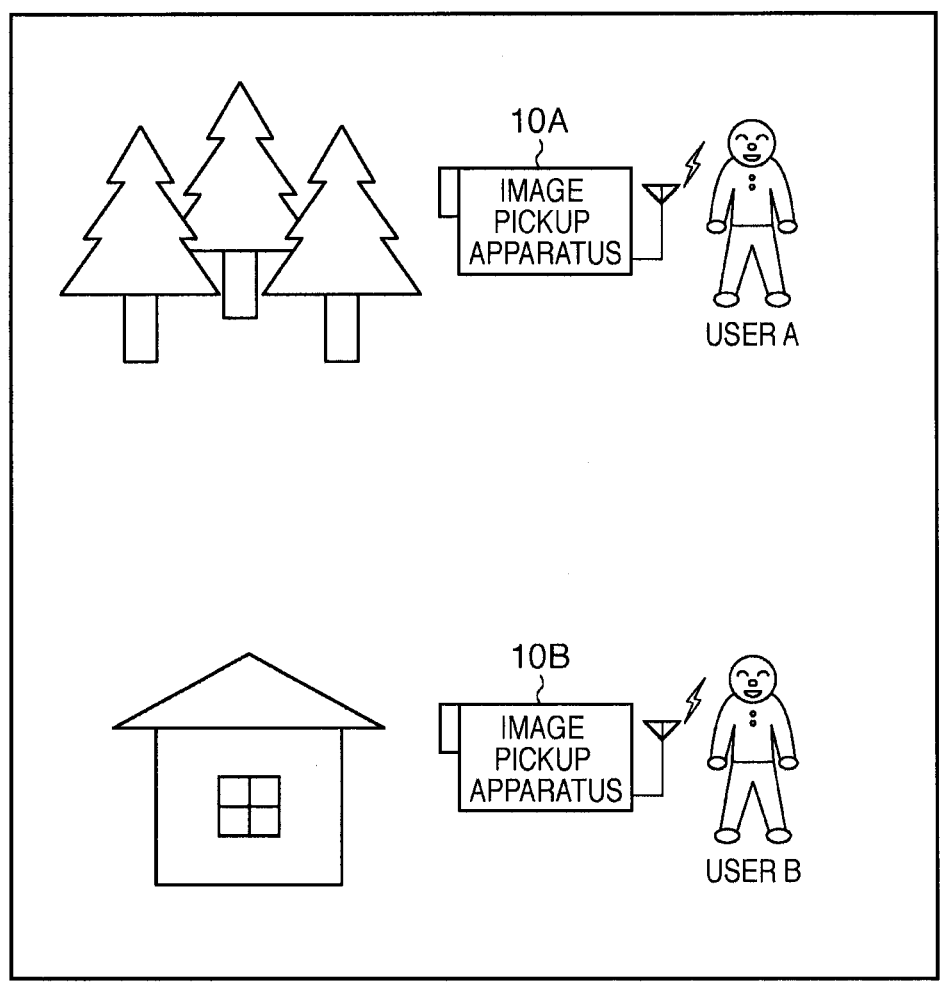
FIG. 16 is a diagram illustrating an example of group shooting.

As shown in FIG. 16, it is assumed that a user A has recorded a scene A in SP mode using an image pickup apparatus 10A, whereas a user B has recorded a scene B in XP mode using an image pickup apparatus 10B. The image pickup apparatuses 10A and B have the same configuration as that of the image pickup apparatus 10. The image pickup apparatuses 10A and B transmit and receive image quality information via a wireless communication network based on, for example, the IEEE 802.11g standard, through their respective image quality information transmitting/receiving units 22. Although in the present embodiment, the image quality information includes the resolution of the video signal output by the camera unit 12 and the average target encoding bitrate used by the encoded data amount control unit 64 of the encoding unit 14, the image quality information is not limited to such a combination. For example, white balance information specifying the tone of the video, or an exposure adjustment specifying the brightness of the video, obtained through processing performed by the camera signal processing unit 36, may be used, or alternatively, the image quality information may include all of these items.

Figure 17A:
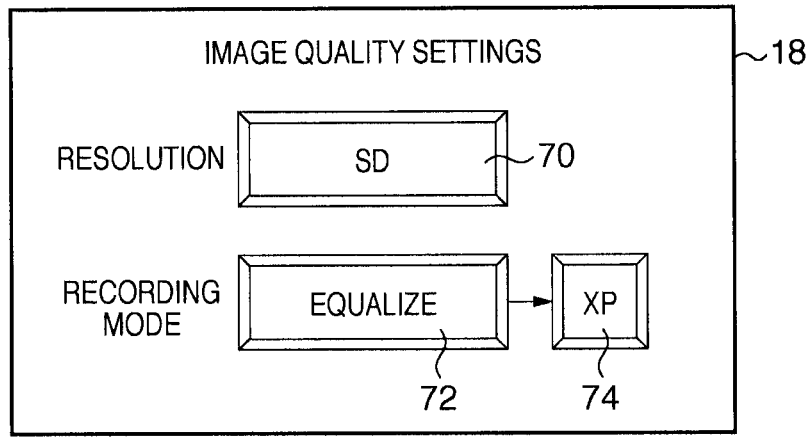
FIGS. 17A to 17C are diagrams illustrating examples of image quality settings.
Figure 17B:
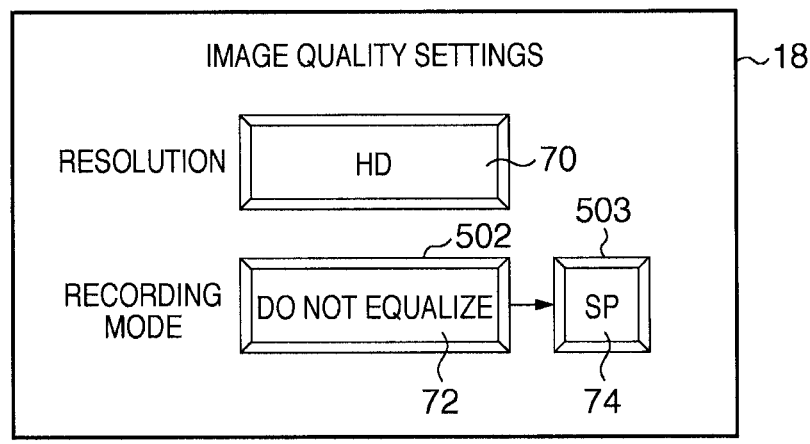
Figure 17C:
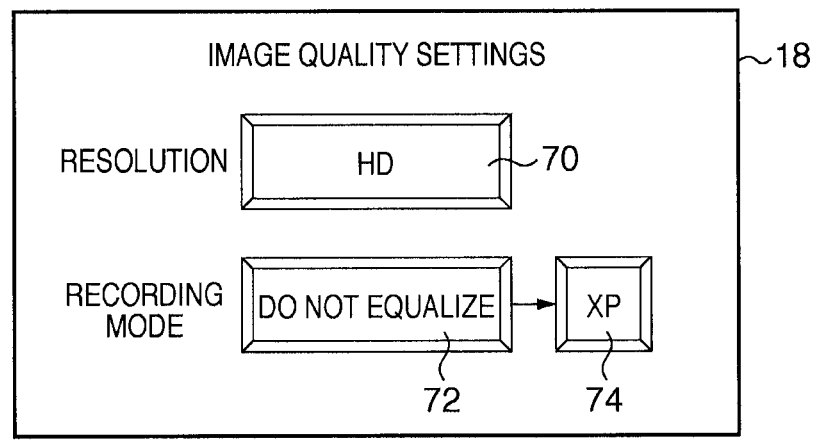

FIGS. 17A to 17C illustrate an example of an image quality setting menu screen displayed in the display unit 18. Prior to the start of group shooting, the users A and B first set the image quality (resolution and average target encoding bitrate) using a menu screen such as that illustrated in FIGS. 17A to 17C. In the present embodiment, the image quality is the same for each image pickup apparatus during group shooting, but it is possible to select one of two operational modes, or a preset mode or dynamic setting mode, by selecting at what point in time to set a certain item to be the same (equalize).

In the present mode, the resolutions of all image pickup apparatuses belonging to the group and the average target encoding bitrate are forced to the same setting in advance.

Meanwhile, in the dynamic setting mode, while the resolutions of all image pickup apparatuses belonging to the group are forced to the same setting in advance, the average target encoding bitrate can be freely set. However, the average target encoding bitrate of each image pickup apparatus is dynamically set to the average target encoding bitrate of another image pickup apparatus for a set period based on the start of shooting (start of recording) and end of shooting (end of recording) of another image pickup apparatus belonging to the group. For example, when a certain image pickup apparatus has already started shooting and another image pickup apparatus starts shooting thereafter, the average target encoding bitrate of the image pickup apparatus that started shooting first is set to the average target encoding bitrate of the other image pickup apparatus for a set period. Furthermore, when the other image pickup apparatus stops shooting, the image quality of the image pickup apparatus that remains shooting is set to the image quality of the image pickup apparatus that stopped shooting for a set period.

The resolution is set using a resolution setting menu 70. The camera unit 12 outputs the video signal in the resolution that has been set. HD resolution and SD resolution are examples of resolution setting values. In the example shown in FIG. 17A, SD is set as the resolution. However, in the examples shown in FIGS. 17B and 17C, HD is set as the resolution.

Whether or not to equalize the video information with other image pickup apparatuses participating in the group shooting is set using an equalization setting menu 72. This selects between the preset mode and the dynamic setting mode. The compression rate for the encoding process performed by the encoding unit 14 is set using a recording mode setting menu 74. In the present embodiment, XP, SP, or LP modes can be set, where XP has the lowest compression rate and LP has the highest.

Meanwhile, in the case where the recording mode has been equalized using the equalization setting menu 72, the preset mode is set. For example, one of the image pickup apparatuses participating in the group shooting acts as the primary apparatus, after which the other image pickup apparatuses receive the image quality information of that primary image pickup apparatus and set image quality information identical to that image quality information. In this manner, all image pickup apparatuses participating in the group shooting can have the same image quality conditions set in advance. With respect to the time at which to equalize the image quality information, the equalization may occur when all image pickup apparatuses that are to participate in the group shooting have come together prior to the start of shooting, or, if a communication path can be secured, the equalization may occur individually for each image pickup apparatus prior to the start of shooting.

On the other hand, in the case where the recording mode has not been equalized using the equalization setting menu 72, the dynamic setting mode is set. In other words, the multiple image pickup apparatuses that participate in the group shooting can shoot using individually-set and generally different image quality information (in the present embodiment, the average target encoding bitrates differ). However, as described above, the average target encoding bitrates of the other image pickup apparatuses that are shooting are adjusted for a set period in response to the starting or stopping of shooting by an arbitrary image pickup apparatus within the group so as to dynamically match the average target encoding bitrate of the image pickup apparatus that starts or stops shooting.

In the example shown in FIG. 17A, the recording mode is equalized throughout the shooting group, and is set to XP mode. However, in the example shown in FIG. 17B, the recording mode is not equalized, and is set to SP mode. Finally, in the example shown in FIG. 17C, the recording mode is not equalized, and is set to XP mode. In the examples described in the present embodiment, the average target encoding bitrate when the recording mode is XP mode is assumed to be 15 Mbps. The average target encoding bitrate when the recording mode is SP mode is assumed to be 9 Mbps. Finally, the average target encoding bitrate when the recording mode is LP mode is assumed to be 3 Mbps.

With the preset mode, which equalizes the recording mode, the image quality determination unit 20 determines the average target encoding bitrate based on the equalized recording mode. The encoding unit 14 controls the encoding bitrate based on the average target encoding bitrate. However, with the dynamic setting mode, in which the recording mode is not equalized, the image quality determination unit 20 determines the average target encoding bitrate based on the recording mode set on an image pickup apparatus-by-image pickup apparatus basis, and the encoding unit 14 controls the encoding bitrate based on that average target encoding bitrate.

Operations performed for making the image quality the same among the image pickup apparatuses in the case where the preset mode has been selected shall now be described in detail. This refers to the preset mode being set in the example illustrated in FIG. 17A.

The image quality determination units 20 of the image pickup apparatuses that belong to the same shooting group each determine, prior to the start of shooting, whether or not the same value as is set for the image quality of their own image pickup apparatus is set for the other image pickup apparatuses in the shooting group. To be more specific, it is determined whether the settings regarding the resolution and recording mode made in advance through the setting screen are the same as those of the image quality information of the other image pickup apparatuses (resolution and recording mode) received by the image quality information transmitting/receiving unit 22.

If resolution or recording mode settings differ among the image pickup apparatuses participating in the group shooting, a warning message warning that the image quality settings differ is displayed in the display unit 18, prompting the user to change the image quality settings. At this time, it is favorable for the image quality settings of the shooting group to be displayed in the display unit 18 at the same time. For example in the case where one of the multiple image pickup apparatuses participating in the group shooting is set to SD resolution, and the other image pickup apparatuses are set to HD resolution, the stated warning message and a prompt to set the resolution to HD resolution is displayed in the display unit 18 of the image pickup apparatus whose resolution is set to SD resolution.

Figure 18C:
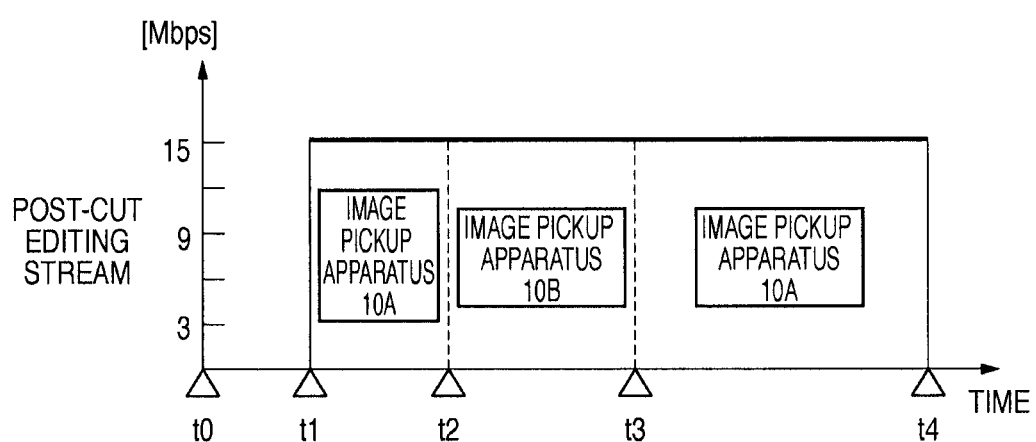

FIGS. 18A to 18C are schematic diagrams illustrating an example of the change in the average target encoding bitrates in scenes shot by the image pickup apparatuses 10A and B, which are in the preset mode, and scenes that have been spliced together. FIG. 18A indicates the shooting state of the image pickup apparatus 10A. FIG. 18B, meanwhile, indicates the shooting state of the image pickup apparatus 10B. Finally, FIG. 18C indicates the result of inserting the scene spanning from times t2 to t3, shot by the image pickup apparatus 10B, between the scenes spanning from times t1 to t2 and times t3 to t4, shot by the image pickup apparatus 10A. The horizontal axis represents time, whereas the vertical axis represents the average target encoding bitrate. It is assumed here that, for example, the image pickup apparatuses 10A and B have shot the same object from a different direction or at a different rate of zoom, and those shot scenes are then to be spliced together on the same temporal axis.

Due to the equalization of the image quality information through the preset mode, both the image pickup apparatuses 10A and B are set, in advance, to recording in SD resolution in XP mode. As shown in FIG. 18A, the image pickup apparatus 10A shoots in SD resolution and in XP mode from times t1 to t4. Meanwhile, as shown in FIG. 18B, the image pickup apparatus 10B shoots in SD resolution and in XP mode from times t2 to t3.

Because the resolutions and recording modes (average target encoding bitrate) of the image pickup apparatuses 10A and B have the same settings, the image quality of the video shot by the image pickup apparatuses 10A and B is essentially the same. Therefore, as shown in FIG. 18C, the average target encoding bitrate is flat even after the splice has taken place, and thus there is no apparent change in image quality at the transitions (immediately following times t2 and t4) during playback.

Next, operations performed for equalizing the image qualities in the image pickup apparatuses when setting the dynamic setting mode so as to achieve the settings shown in FIGS. 17B and 17C shall be described.

In the dynamic setting mode, the users of each image pickup apparatus belonging to the shooting group can set his/her preferred recording mode in the image pickup apparatus. However, it is necessary for the image pickup apparatuses that belong to the shooting group to be within communication range of one another, and thus the following example of operations assumes that the image pickup apparatuses 10A and B shown in FIG. 16 are within communication range of each other.

Figure 19A:
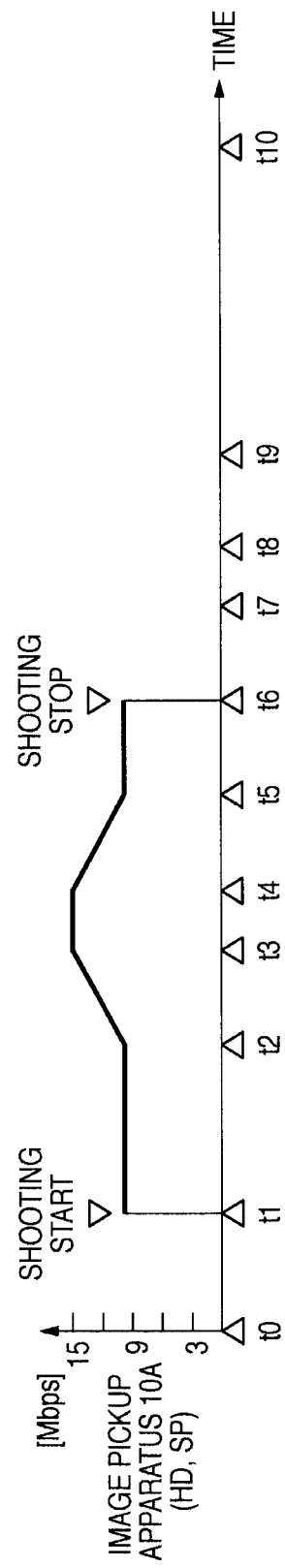

FIGS. 19A to 19D are schematic diagrams illustrating an example of the change in the average target encoding bitrates in scenes shot by the image pickup apparatuses 10A and B, which are in the dynamic setting mode, and scenes that have been spliced together. FIG. 19A indicates the shooting state of the image pickup apparatus 10A. FIG. 19B, meanwhile, indicates the shooting state of the image pickup apparatus 10B. FIG. 19C indicates a first example of cut editing performed on scenes shot by the image pickup apparatuses 10A and B, whereas FIG. 19D indicates a second example thereof. The horizontal axis represents time, whereas the vertical axis represents the average target encoding bitrate.

As shown in FIG. 17B, the image pickup apparatus 10A has its resolution set to HD resolution and its recording mode set to SP mode. Meanwhile, as shown in FIG. 17C, the image pickup apparatus 10B has its resolution set to HD resolution and its recording mode set to XP mode. As shown in FIG. 19A, the image pickup apparatus 10A starts shooting at time t1 and stops shooting at time t6. Meanwhile, as shown in FIG. 19B, the image pickup apparatus 10B starts shooting at time t2 and stops shooting at time t10.

In FIG. 19A, it is assumed that a user A has pressed the shooting start/stop button of the image pickup apparatus 10A at time t1. The image quality determination unit 20 of the image pickup apparatus 10A specifies HD resolution to the camera unit 12 and an average target encoding bitrate of 9 Mbps (that is, SP mode) to the encoding unit 14, after which shooting starts.

In FIG. 19B, it is assumed that a user B has pressed the shooting start/stop button of the image pickup apparatus 10B at time t2. The image quality determination unit 20 of the image pickup apparatus 10B specifies HD resolution to the camera unit 12 and an average target encoding bitrate of 15 Mbps to the encoding unit 14, after which shooting starts. Furthermore, the image quality information transmitting/receiving unit 22 of the image pickup apparatus 10B transmits image quality information indicating an average target encoding bitrate of 15 Mbps to the image pickup apparatuses of the same shooting group, which, in this case, consists of the image pickup apparatus 10A.

The image quality information transmitting/receiving unit 22 of the image pickup apparatus 10A receives the image quality information transmitted by the image pickup apparatus 10B and supplies that information to the image quality determination unit 20 (time t2 in FIG. 19A). The image quality determination unit 20 then gradually increases the average target encoding bitrate from 9 Mbps to 15 Mbps so as to conform to the average target encoding bitrate of the image pickup apparatus 10B. It is assumed that at time t3 in FIG. 19A, the average target encoding bitrate in the image pickup apparatus 10A has reached 15 Mbps. Then, the image pickup apparatus 10A maintains an average target encoding bitrate of 15 Mbps for a predetermined period, or in other words, from times t3 to t4 in FIG. 19A. During the period from times t3 to t4, the image pickup apparatus 10A is shooting at an average target encoding bitrate of 15 Mbps (in XP mode), and thus the image quality of the video shot by the image pickup apparatuses 10A and B is the same.

After the period in which the average target encoding bitrate is maintained (the period from times t3 to t4 in FIG. 19A) ends, the image quality determination unit 20 of the image pickup apparatus 10A gradually returns the average target encoding bitrate to the original average target encoding bitrate. In the example shown in FIG. 19A, the average target encoding bitrate returns to the original average target encoding bitrate of 9 Mbps at time t5. The periods from times t2 to t4 and t4 to t5 are moderation periods for reducing the apparentness of a change in image quality resulting from the change in the average target encoding bitrate.

In FIG. 19A, it is assumed that the user A has pressed the shooting start/stop button of the image pickup apparatus 10A at time t6, thereby stopping shooting. In response to this, the image quality information transmitting/receiving unit 22 of the image pickup apparatus 10A transmits image quality information indicating the set average target encoding bitrate (SP mode) to the image pickup apparatuses of the same shooting group, which, in this case, consists of the image pickup apparatus 10B. At time t6 in FIG. 19B, the image quality information transmitting/receiving unit 22 of the image pickup apparatus 10B receives the image quality information from the image pickup apparatus 10A and supplies that information to the image quality determination unit 20. The image quality determination unit 20 of the image pickup apparatus 10B then gradually reduces the average target encoding bitrate from 15 Mbps to 9 Mbps so as to conform to the image quality of the image pickup apparatus 10A. It is assumed that at time t7 in FIG. 19B, the average target encoding bitrate in the image pickup apparatus 10B has reached 9 Mbps. Then, the image pickup apparatus 10B maintains an average target encoding bitrate of 9 Mbps for a predetermined period, or in other words, from times t7 to t8 in FIG. 19B. During the period from times t7 to t8, the image pickup apparatus 10B is shooting at an average target encoding bitrate of 9 Mbps (in SP mode), and thus the image quality of the video shot by the image pickup apparatuses 10A and B is the same.

After the period in which the average target encoding bitrate is maintained (the period from times t7 to t8 in FIG. 19B) ends, the image quality determination unit 20 of the image pickup apparatus 10B gradually returns the average target encoding bitrate to the original average target encoding bitrate. In the example shown in FIG. 19B, the average target encoding bitrate returns to the original average target encoding bitrate of 15 Mbps at time t9. The periods from times t6 to t7 and t8 to t9 can be called moderation periods for reducing the apparentness of a change in image quality resulting from the change in the average target encoding bitrate, in the same manner as the periods from times t2 to t3 and t4 to t5.

As described thus far, in the present embodiment, when another image pickup apparatus within the shooting group starts/stops shooting (or starts/stops recording), a period in which the average target encoding bitrate is maintained at the same average target encoding bitrate as the other image pickup apparatus, and moderation periods for before and after that period, are provided.

FIG. 19C illustrates a first example of cut editing performed on the shot scenes shown in FIGS. 19A and 19B. The horizontal axis represents time, whereas the vertical axis represents the average target encoding bitrate. In the example shown in FIG. 19C, the scene shot by the image pickup apparatus 10A from times t1 to t3 in FIG. 19A has been spliced together with the scene shot by the image pickup apparatus 10B from times t3 to t10 in FIG. 19B. The image quality in the image pickup apparatuses 10A and B is the same at the transition between the scene shot by the image pickup apparatus 10A and the scene shot by the image pickup apparatus 10B, which occurs at time t3. Therefore, little difference in image quality arises near time t3.

FIG. 19D illustrates a second example of cut editing performed on the shot scenes shown in FIGS. 19A and 19B. The horizontal axis represents time, whereas the vertical axis represents the average target encoding bitrate. In the editing example shown in FIG. 19D, the scene shot by the image pickup apparatus 10A from times t1 to t6 in FIG. 19A has been spliced together with the scene shot by the image pickup apparatus 10B from times t7 to t10 in FIG. 19B. At the transition, or times t6 and t7, between the end of the scene shot by the image pickup apparatus 10A (time t6) and the start of the scene shot by the image pickup apparatus 10B (time t7) the image quality is the same as a result of the image quality equalization operations described earlier. Therefore, little difference in image quality arises at the transition.

In this manner, taking the period from times t3 to t4 or the period from times t7 to t8, where the image quality of the two encoded bitstreams is the same, as the transition for cut editing reduces differences in the image quality at the transition in the edited encoded bitstream. This makes it possible to reduce a sense of unnaturalness on the part of the viewer during playback.

Figure 20:
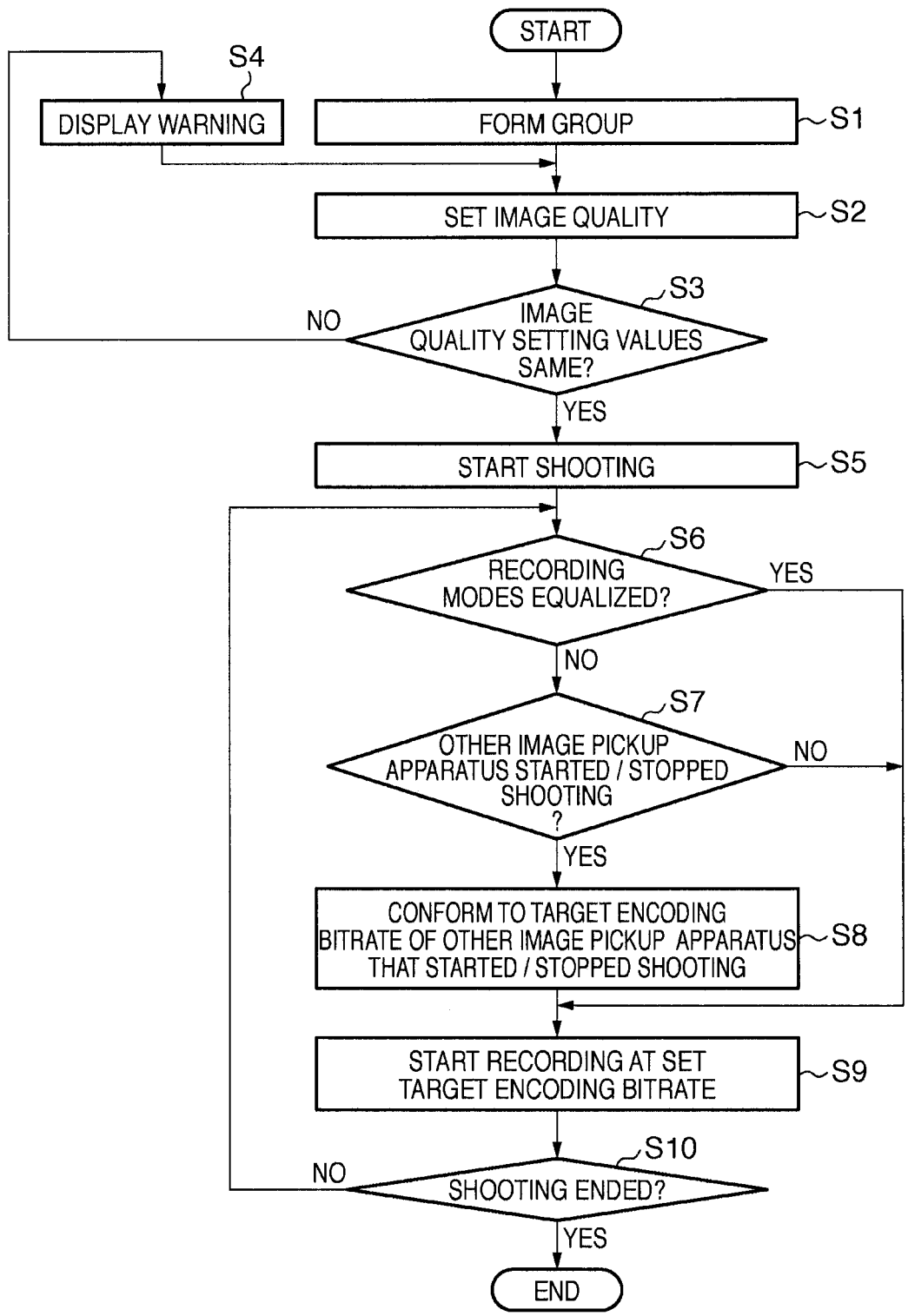
FIG. 20 is a flowchart illustrating an example of the operational procedure by which an image pickup apparatus equalizes the image quality according to the second embodiment of the present invention.
Figure 21A:
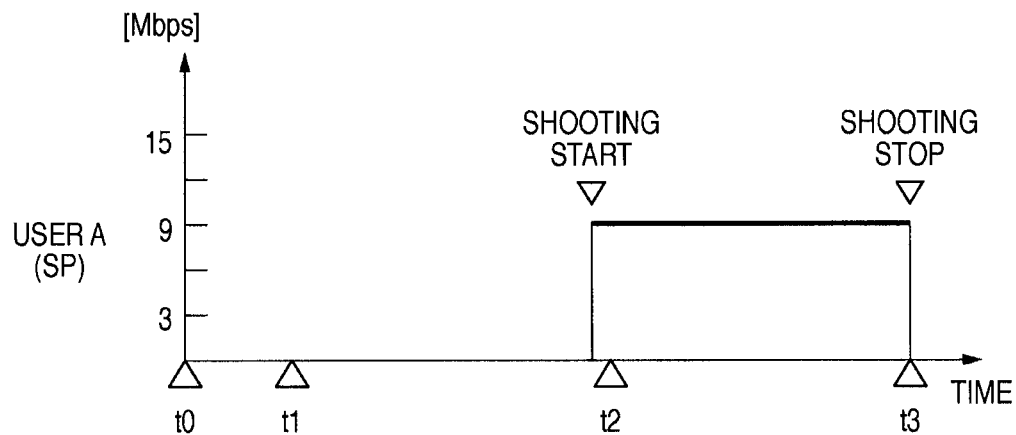
FIGS. 21A to 21C are diagrams illustrating an example of the change in the encoding bitrate of a stream with shot scenes and cut edits.
Figure 21B:
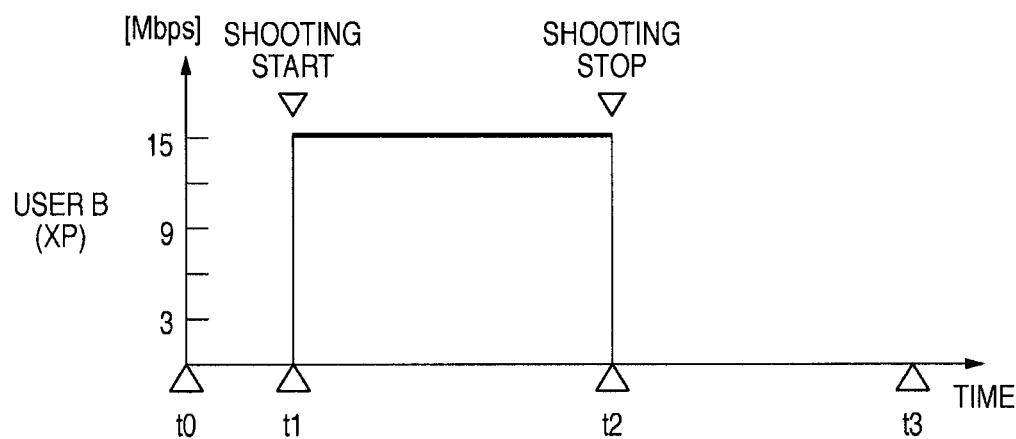
Figure 21C:
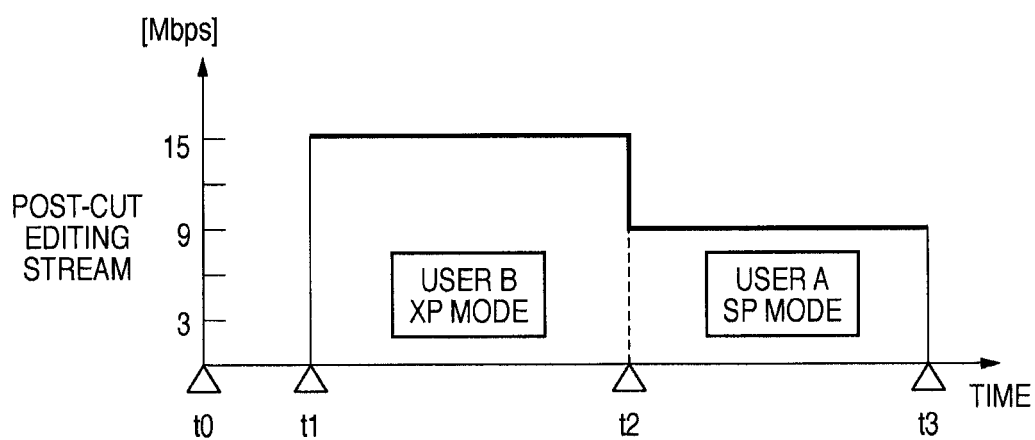

FIG. 20 is a flowchart illustrating an image quality equalization operation according to the present embodiment. In step S1, a shooting group is formed from the multiple image pickup apparatuses, or 10A and B, that are to perform group shooting. The group is formed by, for example, sharing a group ID among the image pickup apparatuses 10A and B. Then, in step S2, the image quality is set in each of the image pickup apparatuses. Next, in step S3, the image quality determination units 20 of the image pickup apparatuses determine whether or not the image quality settings indicate the same values throughout the shooting group formed in step S1. Note, however, that step S3 determines whether or not the setting information, in the image quality settings, that is to be equalized has the same setting values. If it has been determined that the image quality settings differ (No in step S3), a warning indicating the difference is made in step S4, after which the process returns to step s2, where the user is once again prompted to make the settings.

However, in the case where it has been determined that the image quality settings for all image pickup apparatuses are the same value (Yes in step S3), the image pickup apparatuses are, in step S5, in a state in which shooting and recording can be started. After shooting has started, the image quality determination unit 20 determines, in step S6, whether or not the recording modes in the image quality settings have been set to be equalized. The case where the modes have been set to be equalized (Yes in step S6) is equivalent to the preset mode, and thus the image quality settings in the image pickup apparatuses belonging to the shooting group are the same. In this case, the process moves to step S9, where, as described earlier, the various units in the image pickup apparatus 10 start recording video at the average target encoding bitrate set in accordance with the set recording mode.

However, the case where the recording modes in the image quality settings have not been set to be equalized (No in step S6) indicates that the dynamic setting mode has been selected. In this case, in step S7, the image quality determination unit 20 determines whether the other image pickup apparatus belonging to the shooting group has started or stopped shooting. In the case where it has been determined that the other image pickup apparatus belonging to the shooting group has started or stopped shooting (Yes in step S7), in step S8, the image quality determination unit 20 brings the average target encoding bitrate of the encoding unit 14 into conformity with the average target encoding bitrate of the other image pickup apparatus, as described earlier. Of course, moderation periods are provided before and after the period in which the average target encoding bitrate is maintained. Then, in step S9, the various units of the image pickup apparatus 10 start recording video at the average target encoding bitrate set in step S8. Note that if another image pickup apparatus belonging to the shooting group has neither started nor stopped shooting (No in step S7), the moderation periods are removed, and the various units of the image pickup apparatus 10 start recording video at the average target encoding bitrate set in step S2 (step S9).

Then, in step S10, the image quality determination unit 20 determines whether or not shooting has ended. If it is determined that shooting has not ended (No in step S10), the process returns to step S6, and the aforementioned processes of steps S6 to S9 are repeated. However, if it is determined in step S10 that shooting has ended (Yes in step S10), the process simply ends.

According to the present embodiment, the image quality of an encoded bitstream can be equalized with the image quality of another moving image encoding apparatus, without a user having to make manual settings on an individual level. This has the effect of reducing differences in image quality in the periods before and after transitions in the video in the case where cut editing has been performed on the encoded bitstream.

Although the above descriptions discuss setting the resolutions to common values in advance, and setting the recording modes in advance or dynamically, the recording modes may instead be set to the same modes in advance, and the resolutions may be set in advance or dynamically. In other words, one or more elements of image quality information that includes multiple elements may be set to common setting values before shooting, and the remaining elements may be set in advance or dynamically.

Finally, although the descriptions discuss a moving image encoding apparatus that employs the VBR scheme, an image encoding standard using a constant bitrate scheme may be applied in the present embodiment. In such a case, the term "average target encoding bitrate" appearing in the above descriptions may be replaced with "encoding bitrate".

Third Embodiment

Figure 22:
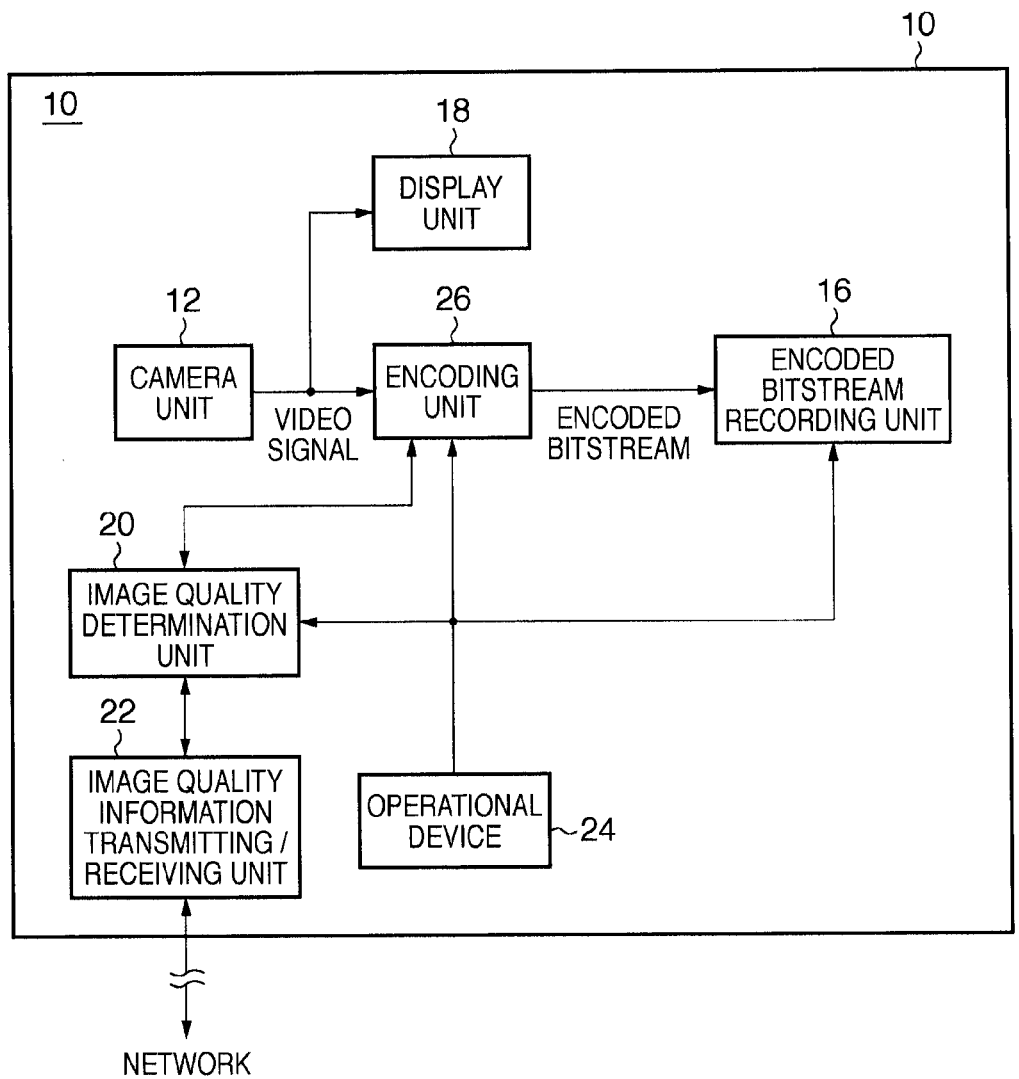
FIG. 22 is a block diagram illustrating an exemplary configuration of an image pickup apparatus according to a third embodiment of the present invention.

FIG. 22 is a block diagram illustrating, as a third embodiment, an exemplary functional configuration of an image pickup apparatus to which a moving image encoding apparatus embodying the present invention has been applied. The image pickup apparatus of the present embodiment can shoot video of a similar image quality to that shot by another image pickup apparatus. In FIG. 22, constituent elements identical to those in FIG. 13 (the second embodiment) are given the same reference numerals, and descriptions thereof shall be omitted. The differences between FIGS. 22 and 13 are that the camera unit 12 and the image quality determination unit 20 are not connected, and the encoding unit 14 has been replaced with an encoding unit 26.

[Encoding Unit 26]

FIG. 23 is a block diagram illustrating an outline of the configuration of the encoding unit 26. Here, the MPEG standard, the H.264 standard, and so on are used as the encoding standard.

Next, the configuration and operations of the encoding unit 26 shown in FIG. 23 shall be described. Note, however, that in FIG. 23, constituent elements identical to those in FIG. 15 (the encoding unit 14 in the second embodiment) are given the same reference numerals, and descriptions thereof shall be omitted.

In the third embodiment, the encoding unit 26 changes the quantization scale of the quantization unit 46, thereby changing the degree of image degradation caused by quantization error. For this reason, the value of the encoding PSNR, described later, changes. The quantized conversion coefficient output by the quantization unit 46 is supplied to the variable-length encoding unit 48 and the inverse quantization unit 52.

An encoding PSNR calculation unit 68 calculates the encoding PSNR (peak signal-to-noise ratio) in the restructured image data output by the adder 56 and the video signal output by the block division unit 40, and outputs the calculated PSNR to the encoded data amount control unit 64. The PSNR expresses the ratio between the image signal and the noise (the S/N ratio). The encoding PSNR expresses encoding setting information (parameters) for the S/N ratio, and a higher value indicates better image quality.

A method for calculating the PSNR of an 8-bit video signal shall be described with reference to Equation 1. In Equation 1, Ci represents each pixel value in the video signal, and Di represents each pixel value in the restructured image. N is the number of pixel values for which the PSNR is calculated. In the present embodiment, the ratio between the pre-encoding video signal and the locally-decoded restructured image data is calculated, and thus the value of the encoding PSNR expresses the degree of degradation caused by encoding.

$$PSNR = 10 \log \left( \frac{255^2}{\sum_{i=0}^{N} (Ci - Di)^2 / N} \right). \quad \text{Equation 1}$$

Note that the pixel values of the video signal and the pixel values of the restructure image used in the calculation of the PSNR are assumed to be a luminosity signal, a color-difference signal, or both.

The encoded data amount control unit 64 controls the quantization scale of the quantization unit 46 so that the value of the encoding PSNR output by the encoding PSNR calculation unit 68 approaches an average target PSNR from the image quality determination unit 20. Through this, the degree of degradation caused by encoding changes, and thus the encoding PSNR changes.

Operations of the image quality determination unit 20 shall be described hereinafter in detail with reference to FIGS. 16, 24A to 24C, 25A to 25C, 26A to 26D, and 27.

As shown in FIG. 16, it is assumed that a user A has recorded a scene A using an image pickup apparatus 10A, whereas a user B has recorded a scene B using an image pickup apparatus 10B. The image pickup apparatuses 10A and B have the same configuration as that of the image pickup apparatus 10 of the present embodiment. The image pickup apparatuses 10A and B transmit and receive image quality information via a wireless communication network based on, for example, the IEEE 802.11g standard, through their respective image quality information transmitting/receiving units 22. In the present embodiment, the image quality information is the average target PSNR, but the image quality information is not limited thereto. For example, the difference in high-frequency region components between the video signal and the restructured image may be used instead.

Figure 24A:
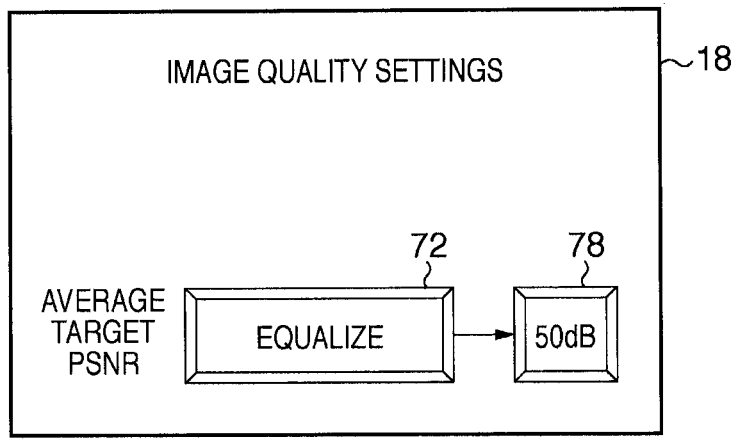
FIGS. 24A to 24C are diagrams illustrating examples of image quality settings.
Figure 24B:
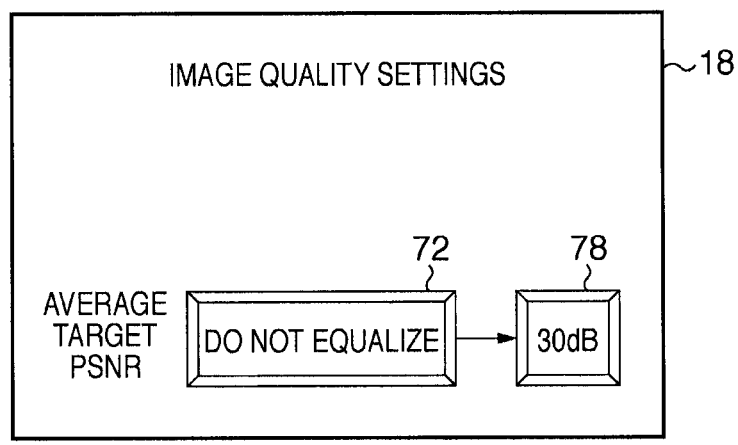
Figure 24C:
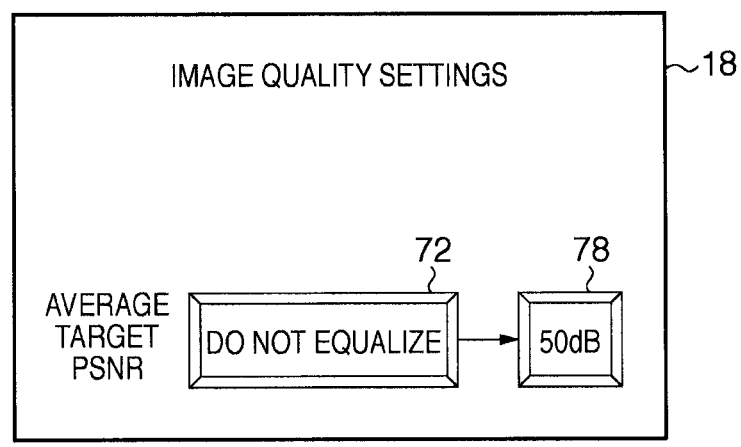

FIGS. 24A to 24C illustrate an example of an image quality setting menu screen displayed in the display unit 18. Prior to the start of group shooting, the users A and B first set the image quality (average target PSNR) using a menu screen such as that illustrated in FIGS. 24A to 24C. In the present embodiment, the image quality is the same for each image pickup apparatus during group shooting, but it is possible to select one of two operational modes, or a preset mode or dynamic setting mode, by selecting at what point in time to set a certain item to be the same (equalize).

In the preset mode, the average target PSNR is set, in advance, to the same value for all image pickup apparatuses belonging to the group.

In the dynamic setting mode, however, the average target PSNR can be freely set for each image pickup apparatus belonging to the group. However, the average target PSNR of each image pickup apparatus is dynamically set to the average target PSNR of another image pickup apparatus for a set period based on the start of shooting (start of recording) and end of shooting (end of recording) of another image pickup apparatus belonging to the group. For example, when a certain image pickup apparatus has already started shooting and another image pickup apparatus starts shooting thereafter, the average target PSNR of the image pickup apparatus that started shooting first is set to the average target PSNR of the other image pickup apparatus for a set period. Furthermore, when the other image pickup apparatus stops shooting, the image quality of the image pickup apparatus that remains shooting is set to the image quality of the image pickup apparatus that stopped shooting for a set period.

Whether or not to equalize the video information with other image pickup apparatuses belonging to the group is set using the equalization setting menu 72. This selects between the preset mode and the dynamic setting mode. An average target PSNR setting menu 78 sets the target value of the encoding PSNR in the encoding unit 26.

Meanwhile, in the case where the average target PSNR has been equalized using the equalization setting menu 72, the preset mode is set. For example, one of the image pickup apparatuses participating in the group shooting acts as the primary apparatus, after which the other image pickup apparatuses receive the image quality information of that primary image pickup apparatus and set image quality information identical to that image quality information. In this manner, all image pickup apparatuses participating in the group shooting can have the same image quality conditions set in advance. With respect to the time at which to equalize the image quality information, the equalization may occur when all image pickup apparatuses that are to participate in the group shooting have come together prior to the start of shooting, or, if a communication path can be secured, the equalization may occur individually for each image pickup apparatus prior to the start of shooting.

However, in the case where the average target PSNR has not been equalized using the equalization setting menu 72, the dynamic setting mode is set. In other words, the multiple image pickup apparatuses that participate in the group shooting can shoot using individually-set and generally different image quality information (in the present embodiment, the average target PSNRs differ). However, as described above, the average target PSNRs of the other image pickup apparatuses that are shooting are adjusted for a set period in response to the starting or stopping of shooting by an arbitrary image pickup apparatus within the group so as to dynamically match the average target PSNR of the image pickup apparatus that starts or stops shooting.

In the example shown in FIG. 24A, the average target PSNR is equalized throughout the shooting group, and is set to 50 dB. In the example shown in FIG. 24B, however, the average target PSNR is not equalized, and is set to 30 dB. Finally, in the example shown in FIG. 24C, the average target PSNR is not equalized, and is set to 50 dB.

In the preset mode, in which the average target PSNR is equalized, the image quality determination unit 20 determines the average target PSNR based on the equalized average target PSNR. The encoding unit 26 controls the quantization scale so that the encoding PSNR approaches that average target PSNR. However, in the dynamic setting mode, in which the average target PSNR is not equalized, the image quality determination unit 20 determines the average target PSNR based on the average target PSNR set for each image pickup apparatus, and the encoding unit 26 controls the quantization scale so that the encoding PSNR approaches that average target PSNR.

Operations performed for making the image quality the same among the image pickup apparatuses in the case where the preset mode has been selected shall now be described in detail. This refers to the preset mode being set in the example illustrated in FIG. 24A.

The image quality determination units 20 of the image pickup apparatuses that belong to the same shooting group each determine, prior to the start of shooting, whether or not the same value as is set for the image quality of their own image pickup apparatus is set for the other image pickup apparatuses in the shooting group. To be more specific, it is determined whether the settings regarding the average target PSNR made in advance through the setting screen are the same as those of the image quality information of the other image pickup apparatuses (average target PSNR) received by the image quality information transmitting/receiving unit 22.

If average target PSNR settings differ among the image pickup apparatuses participating in the group shooting, a warning message warning that the image quality settings differ is displayed in the display unit 18, prompting the user to change the image quality settings. At this time, it is favorable for the image quality settings of the shooting group to be displayed in the display unit 18 at the same time. For example in the case where one of the multiple image pickup apparatuses participating in the group shooting has its average target PSNR set to 30 dB, and the other image pickup apparatuses have their average target PSNRs set to 50 dB, the stated warning message and a prompt to set the average target PSNR to 50 dB is displayed in the display unit 18 of the image pickup apparatus whose average target PSNR is set to 30 dB.

Figure 25C:
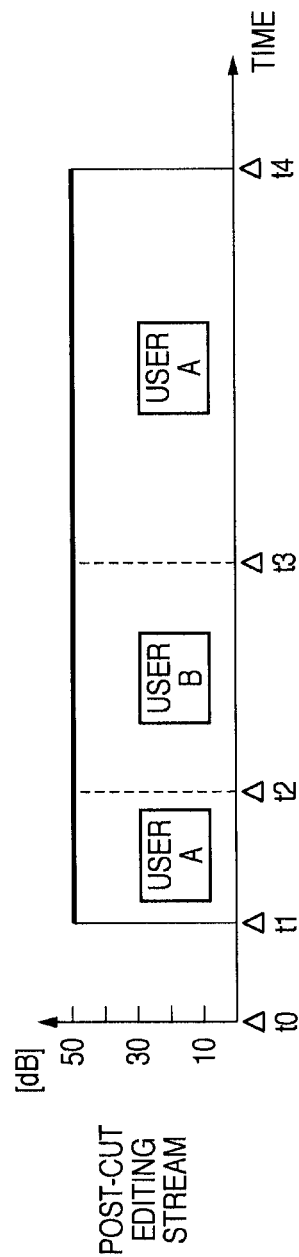

FIGS. 25A to 25C are schematic diagrams illustrating an example of the change in the average target PSNRs in scenes shot by the image pickup apparatuses 10A and B, which are in the preset mode, and scenes that have been spliced together. FIG. 25A indicates the shooting state of the image pickup apparatus 10A. FIG. 25B, meanwhile, indicates the shooting state of the image pickup apparatus 10B. Finally, FIG. 25C indicates the result of inserting the scene spanning from times t2 to t3, shot by the image pickup apparatus 10B, between the scenes spanning from times t1 to t2 and times t3 to t4, shot by the image pickup apparatus 10A. The horizontal axis expresses time, whereas the vertical axis expresses the average target PSNR. It is assumed here that, for example, the image pickup apparatuses 10A and B have shot the same object from a different direction or at a different rate of zoom, and those shot scenes are then to be spliced together on the same temporal axis.

Due to the equalization of the image quality information through the preset mode, both the image pickup apparatuses 10A and B are set, in advance, to recording at an average target PSNR of 50 dB. As shown in FIG. 25A, the image pickup apparatus 10A shoots at an average target PSNR of 50 dB from times t1 to t4. Meanwhile, as shown in FIG. 25B, the image pickup apparatus 10B shoots at an average target PSNR of 50 dB from times t2 to t3.

Because the average target PSNRs of the image pickup apparatuses 10A and B have the same settings, the image quality of the video shot by the image pickup apparatuses 10A and B is essentially the same. Therefore, as shown in FIG. 25C, the average target PSNR is flat even after the splice has taken place, and thus there is no apparent change in image quality at the transitions (immediately following times t2 and t4) during playback.

Next, operations performed for equalizing the image qualities in the image pickup apparatuses when setting the dynamic setting mode so as to achieve the settings shown in FIG. 24B or 24C shall be described.

In the dynamic setting mode, the users of each image pickup apparatus belonging to the shooting group can set his/her preferred average target PSNR in the image pickup apparatus. However, it is necessary for the image pickup apparatuses that belong to the shooting group to be within communication range of one another, and thus the following example of operations assumes that the image pickup apparatuses 10A and B shown in FIG. 16 are within communication range of each other.

Figure 26B:
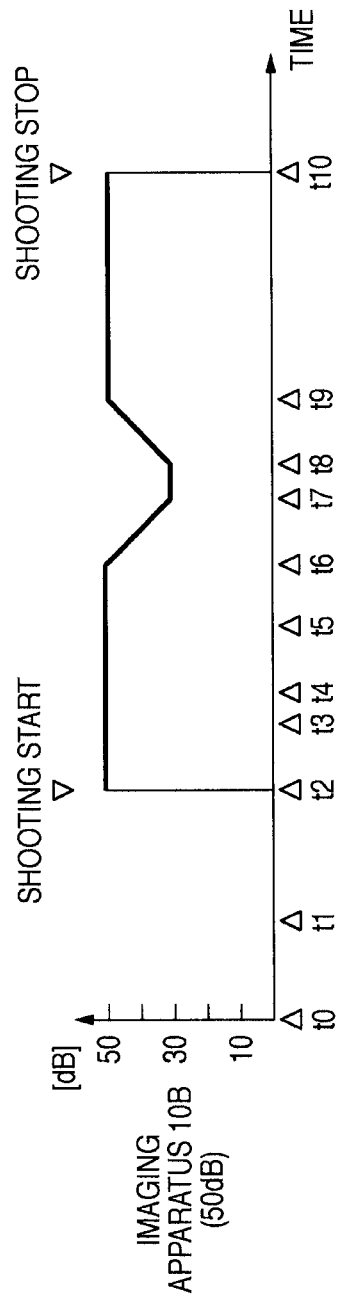

FIGS. 26A to 26D are schematic diagrams illustrating an example of the change in the average target PSNRs in scenes shot by the image pickup apparatuses 10A and B, which are in the dynamic setting mode, and scenes that have been spliced together. FIG. 26A indicates the shooting state of the image pickup apparatus 10A. FIG. 26B, meanwhile, indicates the shooting state of the image pickup apparatus 10B. FIG. 26C indicates a first example of cut editing performed on scenes shot by the image pickup apparatuses 10A and B, whereas FIG. 26D indicates a second example thereof. The horizontal axis represents time, whereas the vertical axis represents the average target encoding bitrate.

As shown in FIG. 24B, the image pickup apparatus 10A has its average target PSNR set to 30 dB. Meanwhile, as shown in FIG. 24C, the image pickup apparatus 10B has its average target PSNR set to 50 dB. As shown in FIG. 26A, the image pickup apparatus 10A starts shooting at time t1 and stops shooting at time t6. Meanwhile, as shown in FIG. 26B, the image pickup apparatus 10B starts shooting at time t2 and stops shooting at time t10.

In FIG. 26A, it is assumed that a user A has pressed the shooting start/stop button of the image pickup apparatus 10A at time t1. The image quality determination unit 20 of the image pickup apparatus 10A specifies an average target PSNR of 30 dB to the encoding unit 26, after which shooting starts.

In FIG. 26B, meanwhile, it is assumed that a user B has pressed the shooting start/stop button of the image pickup apparatus 10B at time t2. The image quality determination unit 20 of the image pickup apparatus 10B specifies an average target PSNR of 50 dB to the encoding unit 26, after which shooting starts. Furthermore, the image quality information transmitting/receiving unit 22 of the image pickup apparatus 10B transmits image quality information indicating an average target PSNR of 50 dB to the image pickup apparatuses of the same shooting group, which, in this case, consists of the image pickup apparatus 10A.

The image quality information transmitting/receiving unit 22 of the image pickup apparatus 10A receives the image quality information transmitted by the image pickup apparatus 10B and supplies that information to the image quality determination unit 20 (time t2 in FIG. 26A). The image quality determination unit 20 then gradually increases the average target PSNR from 30 dB to 50 dB so as to conform to the average target PSNR of the image pickup apparatus 10B. It is assumed that at time t3 in FIG. 26A, the average target PSNR in the image pickup apparatus 10A has reached 50 dB. Then, the image pickup apparatus 10A maintains an average target PSNR of 50 dB for a predetermined period, or in other words, from times t3 to t4 in FIG. 26A. During the period from times t3 to t4, the image pickup apparatus 10A is shooting at an average target PSNR of 50 dB, and thus the image quality of the video shot by the image pickup apparatuses 10A and B is the same.

After the period in which the average target PSNR is maintained (the period from times t3 to t4 in FIG. 26A) ends, the image quality determination unit 20 of the image pickup apparatus 10A gradually returns the average target PSNR to the original average target PSNR. In the example shown in FIG. 26A, the average target PSNR returns to the original average target PSNR of 30 dB at time t5. The periods from times t2 to t4 and t4 to t5 are moderation periods for reducing the apparentness of a change in image quality resulting from the change in the average target PSNR.

In FIG. 26A, it is assumed that the user A has pressed the shooting start/stop button of the image pickup apparatus 10A at time t6, thereby stopping shooting. In response to this, the image quality information transmitting/receiving unit 22 of the image pickup apparatus 10A transmits image quality information indicating the set average target PSNR (30 dB) to the image pickup apparatuses of the same shooting group, which, in this case, consists of the image pickup apparatus 10B. At time t6 in FIG. 26B, the image quality information transmitting/receiving unit 22 of the image pickup apparatus 10B receives the image quality information from the image pickup apparatus 10A and supplies that information to the image quality determination unit 20. The image quality determination unit 20 of the image pickup apparatus 10B then gradually reduces the average target PSNR from 50 dB to 30 dB so as to conform to the image quality of the image pickup apparatus 10B. It is assumed that at time t7 in FIG. 26B, the average target PSNR in the image pickup apparatus 10B has reached 30 dB. After this, the image pickup apparatus 10B maintains an average target PSNR of 30 dB for a predetermined period, or in other words, from times t7 to t8 in FIG. 26B. During the period from times t7 to t8, the image pickup apparatus 10B is shooting at an average target PSNR of 30 dB, and thus the image quality of the video shot by the image pickup apparatuses 10A and B is the same.

After the period in which the average target PSNR is maintained (the period from times t7 to t8 in FIG. 26B) ends, the image quality determination unit 20 of the image pickup apparatus 10B gradually returns the average target PSNR to the original average target PSNR. In the example shown in FIG. 26B, the average target PSNR returns to the original average target PSNR of 50 dB at time t9. The periods from times t6 to t7 and t8 to t9 can be called moderation periods for reducing the apparentness of a change in image quality resulting from the change in the average target PSNR, in the same manner as the periods from times t2 to t3 and t4 to t5.

As described thus far, in the present embodiment, when another image pickup apparatus within the shooting group starts/stops shooting (or starts/stops recording), a period in which the average target PSNR is maintained at the same average target PSNR as the other image pickup apparatus, and moderation periods before and after that period, are provided.

FIG. 26C illustrates a first example of cut editing performed on the shot scenes shown in FIGS. 26A and 26B. The horizontal axis expresses time, whereas the vertical axis expresses the average target PSNR. In the example shown in FIG. 26C, the scene shot by the image pickup apparatus 10A from times t1 to t3 in FIG. 26A has been spliced together with the scene shot by the image pickup apparatus 10B from times t3 to t10 in FIG. 26B. The image quality in the image pickup apparatuses 10A and B is the same at the transition between the scene shot by the image pickup apparatus 10A and the scene shot by the image pickup apparatus 10B, which occurs at time t3. Therefore, little difference in image quality arises near time t3.

FIG. 26D illustrates a second example of cut editing performed on the shot scenes shown in FIGS. 26A and 26B. The horizontal axis expresses time, whereas the vertical axis expresses the average target PSNR. In the example shown in FIG. 26D, the scene shot by the image pickup apparatus 10A from times t1 to t6 in FIG. 26A has been spliced together with the scene shot by the image pickup apparatus 10B from times t7 to t10 in FIG. 26B. At the transition, or times t6 and t7, between the end of the scene shot by the image pickup apparatus 10A (time t6) and the start of the scene shot by the image pickup apparatus 10B (time t7) the image quality is the same as a result of the image quality equalization operations described earlier. Therefore, little difference in image quality arises at the transition.

In this manner, taking the period from times t3 to t4 or the period from times t7 to t8, where the image quality of the two encoded bitstreams is the same, as the transition for cut editing reduces differences in the image quality at the transition in the edited encoded bitstream. This makes it possible to reduce a sense of unnaturalness on the part of the viewer during playback.

Figure 27:
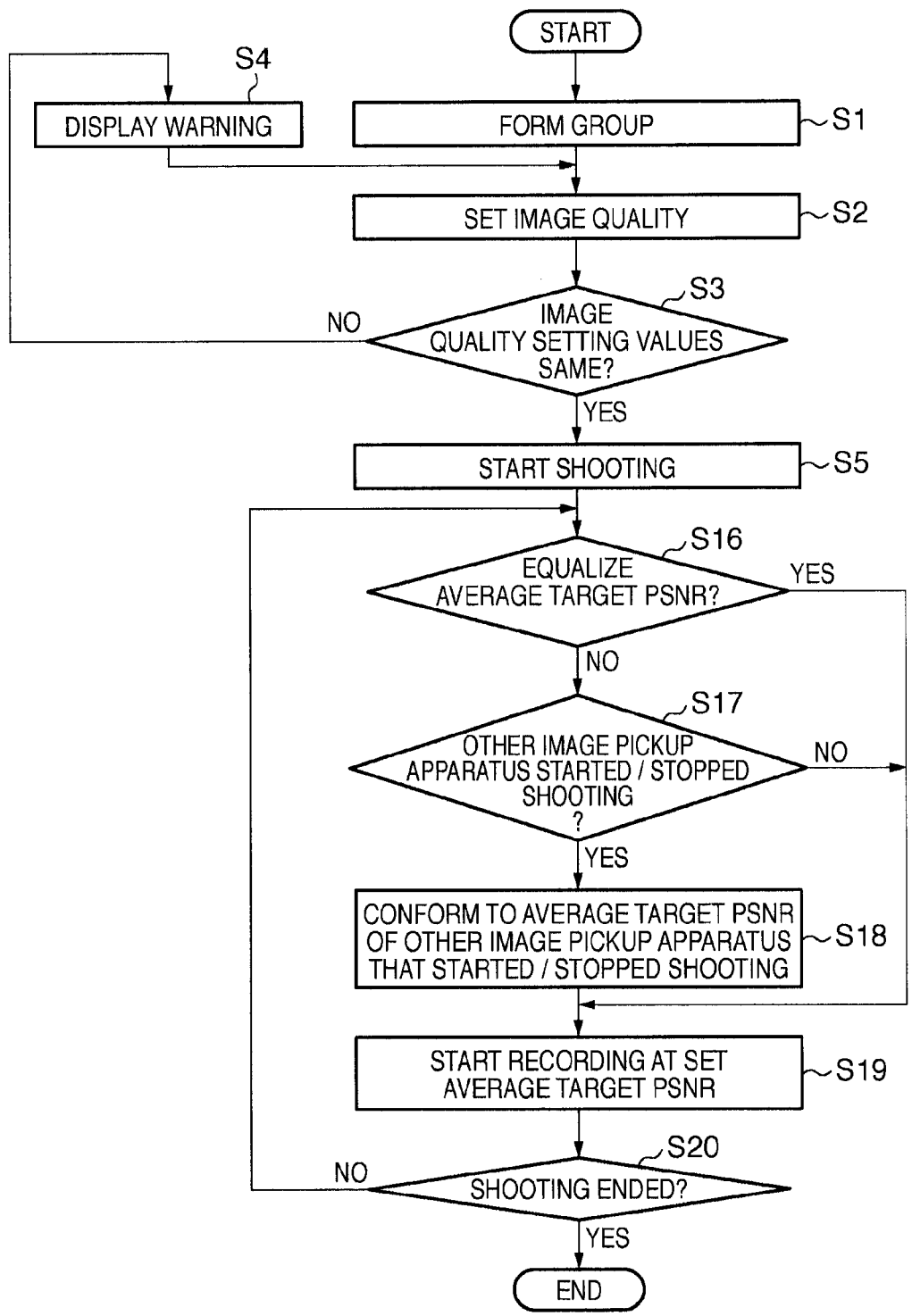
FIG. 27 is a flowchart illustrating an example of the operational procedure by which an image pickup apparatus equalizes the image quality according to the third embodiment of the present invention.

FIG. 27 is a flowchart illustrating an image quality equalization operation according to the present embodiment. In FIG. 27, steps identical to those in FIG. 20 (the second embodiment) are given the same reference numerals, and descriptions thereof shall be omitted. Note, however, that the image quality settings set in step S2 includes the average target PSNR.

After the start of shooting in step S5, the image quality determination unit 20 determines, in step S16, whether or not the average target PSNRs in the image quality settings have been set to be equalized. The case where the modes have been set to be equalized (Yes in step S16) is equivalent to the preset mode, and thus the image quality settings in the image pickup apparatuses belonging to the shooting group are the same. Therefore, in this case, the process moves to step S19, where, as described earlier, the various units in the image pickup apparatus 10 start recording video at the average target PSNR set in accordance with the set average target PSNR.

On the other hand, the case where the average target PSNRs in the image quality settings have not been set to be equalized (No in step S16) indicates that the dynamic setting mode has been selected. In this case, in step S17, the image quality determination unit 20 determines whether the other image pickup apparatus belonging to the shooting group has started or stopped shooting. In the case where it has been determined that the other image pickup apparatus belonging to the shooting group has started or stopped shooting (Yes in step S17), in step S18, the image quality determination unit 20 brings the average target PSNR of the encoding unit 26 into conformity with the average target PSNR of the other image pickup apparatus, as described earlier. Of course, moderation periods are provided before and after the period in which the average target PSNR is maintained. Then, in step S19, the various units of the image pickup apparatus 10 start recording video at the average target PSNR set in step S18. Note that if another image pickup apparatus belonging to the shooting group has neither started nor stopped shooting (No in step S17), the moderation periods are removed, and the various units of the image pickup apparatus 10 start recording video at the average target PSNR set in step S2 (step S19).

Then, in step S20, the image quality determination unit 20 determines whether or not shooting has ended. If it is determined that shooting has not ended (No in step S20), the process returns to step S16, and the aforementioned processes of steps S16 to S19 are repeated. However, if it is determined in step S20 that shooting has ended (Yes in step S20), the process simply ends.

According to the present embodiment, the image quality of an encoded bitstream can be equalized with the image quality of another moving image encoding apparatus, without a user having to make manual settings on an individual level. This has the effect of reducing differences in image quality in the periods before and after transitions in the video in the case where cut editing has been performed on the encoded bitstream.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Applications No. 2008-044921, filed on Feb. 26, 2008, and No. 2008-169788, filed on Jun. 30, 2008, which are hereby incorporated by reference herein in their entirety.

The invention claimed is:

1. An image capture apparatus comprising:
   an image capture unit which captures images;
   an encoding unit which uses an inter-frame prediction encoding to encode moving image data corresponding to the captured images;
   a generating unit which generates a first setting information if a first predetermined condition is satisfied; and
   a receiving unit which receives second setting information transmitted from another image capture apparatus,
   wherein the second setting information is generated in said another image capture apparatus if a second predetermined condition is satisfied in said another image capture apparatus, and
   wherein the encoding unit determines, based on the first setting information, which one of the captured images is encoded as a first IDR picture, and determines, based on the second setting information, which one of the captured images is encoded as a second IDR picture.

2. A method comprising:
   causing an image capture unit to capture images;
   using an inter-frame prediction encoding to encode moving image data corresponding to the captured images;
   generating a first setting information if a first predetermined condition is satisfied;
   causing a receiving unit to receive second setting information transmitted from another image capture apparatus, wherein the second setting information is generated in said another image capture apparatus if a second predetermined condition is satisfied in said another image capture apparatus;
   determining, based on the first setting information, which one of the captured images is encoded as a first IDR picture; and
   determining, based on the second setting information, which one of the captured images is encoded as a second IDR picture.

3. A non-transitory computer-readable storage medium that stores a program for causing a computer to execute a method, the method comprising:
   causing an image capture unit to capture images;
   using an inter-frame prediction encoding to encode moving image data corresponding to the captured images;
   generating a first setting information if a first predetermined condition is satisfied;
   causing a receiving unit to receive second setting information transmitted from another image capture apparatus, wherein the second setting information is generated in said another image capture apparatus if a second predetermined condition is satisfied in said another image capture apparatus;
   determining, based on the first setting information, which one of the captured images is encoded as a first IDR picture; and
   determining, based on the second setting information, which one of the captured images is encoded as a second IDR picture.

4. The image capture apparatus according to claim 1, wherein the inter-frame prediction encoding is based on H.264 standard.

5. The image capture apparatus according to claim 1, wherein the first IDR picture and the second IDR picture are based on H.264 standard.

6. The image capture apparatus according to claim 1, further comprising
   a transmitting unit which transmits the first setting information to said another image capture apparatus.

7. The image capture apparatus according to claim 1, further comprising
   a recording unit which records the encoded moving image data on a recording medium.

8. The method according to claim 2, wherein the inter-frame prediction encoding is based on H.264 standard.

9. The method according to claim 2, wherein the first IDR picture and the second IDR picture are based on 11.264 standard.

10. The method according to claim 2, further comprising
    causing a transmitting unit to transmit the first setting information to said another image capture apparatus.

11. The method according to claim 2, further comprising
    causing a recording unit to record the encoded moving image data on a recording medium.

12. The non-transitory computer-readable storage medium according to claim 3, wherein the inter-frame prediction encoding is based on H.264 standard.

13. The non-transitory computer-readable storage medium according to claim 3, wherein the first IDR picture and the second IDR picture are based on H.264 standard.

14. The non-transitory computer-readable storage medium according to claim 3, the method further comprising
    causing a transmitting unit to transmit the first setting information to said another image capture apparatus.

15. The non-transitory computer-readable storage medium according to claim 3, the method further comprising
    causing a recording unit to record the encoded moving image data on a recording medium.

16. The image capture apparatus according to claim 1, further comprising
    a determining unit that determines whether the first predetermined condition is satisfied or not based on whether a shooting condition is changed or not.

17. The image capture apparatus according to claim 1, further comprising
    a determining unit that determines whether the first predetermined condition is satisfied or not based on whether a scene change is detected or not.

18. The image capture apparatus according to claim 1, further comprising
    a determining unit that determines whether the first predetermined condition is satisfied or not based on whether a button is pressed or not.

19. The method according to claim 2, further comprising
    determining whether the first predetermined condition is satisfied or not based on whether a shooting condition is changed or not.

20. The method according to claim 2, further comprising
    determining whether the first predetermined condition is satisfied or not based on whether a scene change is detected or not.

21. The method according to claim 2, further comprising determining whether the first predetermined condition is satisfied or not based on whether a button is pressed or not.

22. An image capture apparatus comprising:

an image capture unit which captures images;

an encoding unit which uses an inter-frame prediction encoding to encode moving image data corresponding to the captured images;

a generating unit which generates a first setting information if a first predetermined condition is satisfied; and a receiving unit which receives second setting information transmitted from another image capture apparatus, wherein the second setting information is generated in said another image capture apparatus if a second predetermined condition is satisfied in said another image capture apparatus, wherein the encoding unit determines, based on the first setting information, which one of the captured images is encoded as a first picture, thereby a picture to be encoded after the first picture cannot refer to a picture encoded before the first picture, and wherein the encoding unit determines, based on the second setting information, which one of the captured images is encoded as a second picture, thereby a picture to be encoded after the second picture cannot refer to a picture encoded before the second picture.

23. The image capture apparatus according to claim 22, wherein the inter-frame prediction encoding is based on H.264 standard.

24. The image capture apparatus according to claim 22, wherein the first picture and the second picture are based on H.264 standard.

25. The image capture apparatus according to claim 22, further comprising
a transmitting unit which transmits the first setting information to said another image capture apparatus.

26. The image capture apparatus according to claim 22, further comprising
a recording unit which records the encoded moving image data on a recording medium.

27. The image capture apparatus according to claim 22, further comprising
a determining unit that determines whether the first predetermined condition is satisfied or not based on whether a shooting condition is changed or not.

28. The image capture apparatus according to claim 22, further comprising
a determining unit that determines whether the first predetermined condition is satisfied or not based on whether a scene change is detected or not.

29. The image capture apparatus according to claim 22, further comprising
a determining unit that determines whether the first predetermined condition is satisfied or not based on whether a button is pressed or not.

30. A method comprising:
causing an image capture unit to capture images;
using an inter-frame prediction encoding to encode moving image data corresponding to the captured images;
generating a first setting information if a first predetermined condition is satisfied;
causing a receiving unit to receive second setting information transmitted from another image capture apparatus, wherein the second setting information is generated in said another image capture apparatus if a second predetermined condition is satisfied in said another image capture apparatus;
determining, based on the first setting information, which one of the captured images is encoded as a first picture, thereby a picture to be encoded after the first picture cannot refer to a picture encoded before the first picture; and
determining, based on the second setting information, which one of the captured images is encoded as a second picture, thereby a picture to be encoded after the second picture cannot refer to a picture encoded before the second picture.

31. The method according to claim 30, wherein the inter-frame prediction encoding is based on H.264 standard.

32. The method according to claim 30, wherein the first picture and the second picture are based on H.264 standard.

33. The method according to claim 30, further comprising causing a transmitting unit to transmit the first setting information to said another image capture apparatus.

34. The method according to claim 30, further comprising causing a recording unit to record the encoded moving image data on a recording medium.

35. The method according to claim 30, further comprising determining whether the first predetermined condition is satisfied or not based on whether a shooting condition is changed or not.

36. The method according to claim 30, further comprising determining whether the first predetermined condition is satisfied or not based on whether a scene change is detected or not.

37. The method according to claim 30, further comprising determining whether the first predetermined condition is satisfied or not based on whether a button is pressed or not.

38. A non-transitory computer-readable storage medium that stores a program for causing a computer to execute a method, the method comprising:
causing an image capture unit to capture images;
using an inter-frame prediction encoding to encode moving image data corresponding to the captured images;
generating a first setting information if a first predetermined condition is satisfied;
causing a receiving unit to receive second setting information transmitted from another image capture apparatus, wherein the second setting information is generated in said another image capture apparatus if a second predetermined condition is satisfied in said another image capture apparatus;
determining, based on the first setting information, which one of the captured images is encoded as a first picture, thereby a picture to be encoded after the first picture cannot refer to a picture encoded before the first picture; and
determining, based on the second setting information, which one of the captured images is encoded as a second picture, thereby a picture to be encoded after the second picture cannot refer to a picture encoded before the second picture.

* * * * *